(12) United States Patent
McBride et al.

(10) Patent No.: US 8,506,244 B2
(45) Date of Patent: Aug. 13, 2013

(54) INSTREAM HYDRO POWER GENERATOR

(75) Inventors: George F McBride, Machiasport, ME (US); Lyle E McBride, Newport, NH (US)

(73) Assignee: George F. McBride, Machiasport, ME (US)

( * ) Notice: Subject to any disclaimer, the term of this patent is extended or adjusted under 35 U.S.C. 154(b) by 518 days.

(21) Appl. No.: 12/893,589

(22) Filed: Sep. 29, 2010

(65) Prior Publication Data
US 2012/0076648 A1   Mar. 29, 2012

(51) Int. Cl.
*F04D 29/22* (2006.01)

(52) U.S. Cl.
USPC .......................................... 415/204; 416/177

(58) Field of Classification Search
USPC ......... 415/204; 416/177, 189, 197 A, 197 R, 416/203, 187
See application file for complete search history.

(56) References Cited

U.S. PATENT DOCUMENTS

| 4,843 | A | 11/1846 | Rowand |
|---|---|---|---|
| 2,501,696 | A | 3/1950 | Souczek |
| 3,986,787 | A | 10/1976 | Mouton, Jr. et al. |
| 4,025,220 | A | 5/1977 | Thompson et al. |
| 4,026,587 | A | 5/1977 | Hultman et al. |
| 4,102,291 | A | 7/1978 | Sebald |
| 4,163,904 | A | 8/1979 | Skendrovic |
| 4,188,546 | A | 2/1980 | Kossler |
| 4,258,271 | A | 3/1981 | Chappell et al. |

(Continued)

FOREIGN PATENT DOCUMENTS

| CA | 2 489 946 | 7/2006 |
|---|---|---|
| WO | WO 2008/051455 | 5/2008 |

OTHER PUBLICATIONS

Brian Kirke, "Developments in ducted water current turbines", Sustainable Energy Centre, University of South Australia, originally dated and updated 2005, Mawson Lakes, Australia, 12 pages, www.cyberiad.net.

(Continued)

*Primary Examiner* — Edward Look
*Assistant Examiner* — Liam McDowell
(74) *Attorney, Agent, or Firm* — W. F. Fasse

(57) ABSTRACT

A turbine apparatus is immersed in an ambient stream of a flowing fluid, such as water, so as to encapture a portion of the flowing fluid and extract power therefrom, before returning it back into the ambient stream, which may be a tidal flow of ocean water, or a relative flow of water behind a boat. The apparatus includes a converging intake duct with an inlet opening that faces forward into the ambient stream flow, a spiral volute casing that redirects the fluid into a spiral flow, a rotor arranged coaxially on the spiral axis, and an exhaust duct that diverges and curves from an exhaust inlet coaxial with the spiral axis to an exhaust outlet that opens rearwardly into the ambient flow. The rotor has a peripheral rotor inlet around the circumference of a first stage thereof and an axial rotor outlet at one axial end thereof, and is arranged with its rotor axis coinciding with the spiral axis oriented transverse to the ambient stream flow. The rotor redirects the fluid from the spiral tangential and radial direction at the rotor inlet to the axial direction at the rotor outlet, while extracting power therefrom. Fluid flow channels are designed to achieve smooth acceleration, redirection, power transfer, and deceleration of the fluid preferably without turbulence and cavitation, and preferably using streamlines to develop the surface contours of complex channel components.

43 Claims, 24 Drawing Sheets

(56) References Cited

U.S. PATENT DOCUMENTS

| | | | |
|---|---|---|---|
| 4,295,783 A | 10/1981 | Lebost | |
| 4,441,029 A | 4/1984 | Kao | |
| 4,538,957 A | 9/1985 | Yamagata et al. | |
| 4,641,498 A | 2/1987 | Markovitch et al. | |
| 4,686,376 A | 8/1987 | Retz | |
| 4,722,665 A | 2/1988 | Tyson | |
| 5,139,391 A | 8/1992 | Carrouset | |
| 5,281,856 A | 1/1994 | Kenderi | |
| 5,314,310 A * | 5/1994 | Bachellier | 416/201 A |
| 5,659,205 A | 8/1997 | Weisser | |
| 5,780,935 A | 7/1998 | Kao | |
| 6,104,097 A | 8/2000 | Lehoczky | |
| 6,239,505 B1 | 5/2001 | Kao | |
| 6,472,768 B1 | 10/2002 | Salls | |
| 6,499,939 B2 | 12/2002 | Downing | |
| 6,508,191 B1 | 1/2003 | Spoljaric | |
| 6,800,955 B2 | 10/2004 | McDavid, Jr. | |
| 6,926,494 B2 | 8/2005 | Sabourin | |
| 6,948,910 B2 | 9/2005 | Polacsek | |
| 7,147,428 B2 | 12/2006 | Lamont | |
| 7,199,484 B2 | 4/2007 | Brashears | |
| 7,211,905 B1 | 5/2007 | McDavid, J | |
| 7,239,037 B2 | 7/2007 | Alstot et al. | |
| 7,279,803 B1 | 10/2007 | Bosley | |
| 7,318,700 B2 | 1/2008 | Sugg | |
| 7,341,424 B2 | 3/2008 | Dial | |
| 7,371,135 B1 | 5/2008 | Vanderhye et al. | |
| 7,438,521 B2 | 10/2008 | Enomoto et al. | |
| 7,456,514 B2 | 11/2008 | Ahmad | |
| 7,471,009 B2 | 12/2008 | Davis et al. | |
| 7,573,148 B2 | 8/2009 | Nica | |
| 2003/0099544 A1 * | 5/2003 | Brekke | 415/204 |
| 2007/0241566 A1 | 10/2007 | Kuehnle | |
| 2010/0166553 A1 * | 7/2010 | Haddjeri et al. | 415/211.2 |

OTHER PUBLICATIONS

"Hydrokinetic Turbine by TipoD", Brazil, http://www.youtube.com/watch?v=T_KiHWCo0C8 (publication date unknown).

Wikipedia entry for "Betz' Law", http://en.wikipedia.org/wiki/Betz%27_law (publication date unknown).

Listing of "Tidal Energy Concepts", "Tidal Devices", "Tidal Developers"; European Marine Energy Centre, Orkney, www.emec.org.uk/tidal_developers.asp (publication date unknown).

Zotloeterer company, Obergrafendorf Austria, "Water Vortex Power Plant", www.zotloeterer.com/our_company/water_vortex_generator_engineering/water_vortex_power, 12 pages, publication date unknown, earliest public use dated as Feb. 2006.

BorgWarner Turbo Systems, "Design and Function of a Turbocharger", http://www.turbodriven.com/en/turbofacts/designTurbine.aspx, © 2002-2013, 2 pages.

M. Abidat et al., "Design and Flow Analysis of Radial and Mixed Flow Turbine Volutes", European Conference on Computational Fluid Dynamics, ECCOMAS CFD 2006, P. Wesseling et al. editors, TU Delft, The Netherlands, 2006, 13 pages, http://proceedings.fyper.com/eccomascfd2006/documents/61.pdf.

* cited by examiner

INSTREAM HYDRO POWER GENERATOR

FIELD OF THE INVENTION

The invention relates to an apparatus deployed in a stream of flowing fluid for extracting power from the fluid into a rotating shaft, a rotor for use in such an apparatus, a method of processing a fluid to extract power therefrom using such an apparatus, and a method of designing such an apparatus.

BACKGROUND INFORMATION

For hundreds of years, efforts have been made to harness the power of flowing fluids, and especially the natural flow of streams of wind and water over the surface of the earth. In this regard, various designs of windmills and waterwheels have long been known. In the industrial revolution and thereafter, more sophisticated turbines were developed to improve the efficiency of the extraction of power from the flowing fluid. Turbines were also developed to extract power from steam and hot gases as the flowing fluid. Such turbine apparatuses all include a rotor or runner mounted on a rotatable shaft, and may include a housing around the rotor and/or ducts delivering the fluid to and away from the rotor. The fluid flow is directed into and through the rotor, sometimes using stationary guide vanes or movable control gates, and energy is extracted from the flowing fluid by the rotor so as to impart rotation to the rotor shaft. Thereby, the rotating shaft transmits mechanical power that has been extracted from the flowing fluid. The mechanical power of the rotating shaft can then be used to carry out mechanical work (such as driving a mill, a pump, or the like) or it can drive an electrical generator or alternator to convert the mechanical power to electrical power. The conventionally known turbine and rotor designs can be categorized based on the orientation of the rotor axis relative to the flow of fluid. Cross-flow turbines have the fluid flowing through the rotor generally transversely to the rotor axis, which may be oriented horizontally, for example as represented by an undershot or overshot waterwheel, or vertically, with foil-shaped blades extending parallel to the axis in the general configuration of an egg beater. Axial flow turbines have the fluid flowing through the rotor substantially parallel to the rotor axis, which may be oriented vertically or horizontally. Such turbines may have a rotor in the configuration of a propeller with foil-shaped blades, or a helical screw, or a runner with shorter helical blades, for example represented by the Kaplan turbine. A further category of turbine has the fluid flowing radially outwardly through the rotor, for example as represented by the Fourneyron turbine. A further development of the radial flow turbines is represented by the Francis turbine in which the fluid flows radially inwardly into the rotor, and the rotor then deflects the fluid flow into an axial direction in which the fluid is exhausted or ejected from the rotor.

The known turbine configurations suffer from various disadvantages. The simpler devices like old-fashioned windmills and waterwheels have a very low efficiency and require large rotor dimensions to extract any usable amount of power from the flowing wind or water. The more advanced turbine designs with a rotor housing and ducts typically need to use movable flow control members that are actively controlled and thereby increase the complexity of the apparatus and are subject to malfunction and breakdown. For example, the Kaplan axial flow turbine uses adjustable pitch rotor blades, and the radial-axial flow Francis turbine uses controllable feed gates or guide vanes on the inlet side of the rotor. Furthermore, the more advanced turbine rotor designs typically require a relatively high pressure head of the flowing fluid. Therefore, for example Kaplan and Francis turbines are typically fed water with a relatively high pressure head from a barrage or impoundment reservoir behind a dam, as is known for large scale hydro power generation stations. The high water column created by such a water impoundment dam produces a higher static pressure of the water at the inlet side of the turbine, while the outlet side of the turbine discharges or exhausts the water substantially to normal ambient atmospheric pressure. There is thus a relatively high static pressure drop across the turbine system, whereby the inlet static pressure is converted partially to an increased velocity pressure and associated kinetic energy, which in turn is partially harvested as the water flows through the turbine rotor. Because they rely on the static pressure drop across the turbine system, such turbine and rotor designs, however, are not suitable for very low head applications, especially instream deployment of a turbine for extracting power from a fluid flow without barrage or impoundment of the fluid. In such instream applications, there can be no static pressure drop across the turbine system, because the fluid is taken from and returned to the ambient flowing stream at the ambient static pressure thereof.

It is becoming increasingly important to harness energy from a flowing fluid such as water or wind with a turbine apparatus that is deployed in the stream of the flowing fluid, without impounding the fluid behind a dam or the like. Such instream applications include harnessing wind power, ocean tidal power, or the power of a flowing river or stream, without damming the wind, the tidal flow or the stream flow. The damming of a stream or river destroys the river ecosystem upstream of the dam while potentially flooding large areas of previously existing upland, and can disrupt the natural habitat and spawning of fish and other wildlife in the river. Similarly, tidal barrage of the natural ebb and flow of the changing tides behind a dam in an estuary or sound, disrupts the natural marine ecosystem. Most of the commercially viable tidal power installations to this date involve such an estuary dam or tidal barrage. The tide flow is blocked, contained in one or more basins, and then released through turbines on the changing tide, thereby generating electrical power as the water flows out of the tidal barrage or basin. The side effects of such a tidal barrage have been environmentally undesirable or unacceptable, however.

Various turbine installations have also been developed for instream power generation, without the use of a dam. Instead, a turbine apparatus is installed underwater in the flowing stream, for example being fixably mounted on the seabed, or tethered to a pile in the seabed, or moored as a floating structure, or using hydrofoil-induced downforces to hold the device in the flowing stream of water. A portion of the kinetic energy of the water stream flowing through the blades of the turbine is then extracted or harvested by the rotating blades. Such instream turbines for harvesting tidal power include axial-flow horizontal or vertical axis turbines with a helical screw rotor (U.S. Pat. Nos. 7,147,428, 4,258,271) or a propeller-type or fan-type rotor (U.S. Pat. Nos. 7,471,009, 5,281, 856, 4,258,271 4,163,904, US 2007/0241566), cross-flow vertical axis turbines with vertically extending hydrofoil blades or paddles (U.S. Pat. No. 6,499,939) or in which the water flows radially and tangentially into the rotor and axially out of the rotor (U.S. Pat. No. 4,686,376), cross-flow horizontal axis turbines in which the water flows radially and tangentially into the rotor and axially out of the rotor (U.S. Pat. No. 4,258,271), oscillating hydrofoils, and other designs. In such known turbine apparatuses, the rotor may be freely exposed to the ocean tidal current without any housing around the rotor (U.S. Pat. Nos. 7,199,484, 6,104,097, 4,026,587

2,501,696), or housed in a Venturi effect duct including a converging intake funnel leading to a constricted throat in which the rotor is arranged, and/or a diverging diffuser or exhaust outlet at the downstream end of the duct (U.S. Pat. Nos. 7,471,009, 7,147,428, 6,472,768, 4,258,271, 4,163,904, 3,986,787, US 2007/0241566). The converging and then diverging duct accelerates the water flow encaptured in the duct from its initial ambient flow speed to a higher speed at which it is directed through the rotor, and then decelerates the encaptured water to a discharge speed at or especially below the ambient flow speed. The reduction in the flow speed of the water represents the loss of kinetic energy, which was taken up or extracted by the rotor or lost in turbulence. The static pressure of the discharged water is equal to the ambient static pressure of the surrounding ambient stream.

Such instream power generating turbines suffer various disadvantages. For example, such instream turbines typically cannot extract power from all of the water that flows through them, because some of the water slips through the spaces between the turbine blades without doing any useful work. Furthermore, the most common instream turbines typically spin at a low rotational speed and therefore require expensive and complicated gearing arrangements to generate electrical power. The turbine blades must also be rather large, i.e. long, with a large swept area, in order to extract a useful amount of power from the low-speed low-head tidal water flow. The larger the turbine, the more difficult it is to develop a high rotational speed, because the tip speeds of the blades become extremely high even at a low rotational speed. For example, a turbine with 25 foot long blades spinning at only 50 rpm has a blade tip speed of 89 miles per hour. Such a turbine deployed instream in a tidal waterway represents a significant hazard to underwater life, including human swimmers or divers, as well as potential hazard or disruption to other commercial activities because shipping and fishing vessels must be kept far away from the turbine installation.

Various efforts have been made in the prior art to improve the instream turbine systems so as to avoid or ameliorate some of the above disadvantages. For example, as mentioned above, it is known to encapture the flowing fluid (e.g. water) in a duct or channel that includes a converging intake duct leading to the turbine and a diverging exhaust duct leading away from the turbine, so as to concentrate and accelerate the water flow through the turbine. Such ducts or channel housings make use of a Venturi effect to increase the speed and kinetic energy while reducing the static pressure of the flowing fluid, thereby increasing the efficiency of the turbine which harnesses some of the kinetic energy. As a result, such a ducted turbine can have a rotor of reduced size. Also, it is known that the duct outlet can have a larger cross-sectional area than the duct inlet, to correspond to the reduced flow velocity of the fluid at the outlet relative to the inlet (due to the extraction of kinetic energy from the fluid), further in consideration of the Betz limit.

Another known instream application for extracting power from a relative flow of water is to produce electrical power for use onboard a boat. Various turbine-driven generator devices are known, to be towed behind or beneath a boat as the boat sails or motors through the water (U.S. Pat. Nos. 6,508,191, 4,102,291). The relative motion between the boat (and thus the towed turbine) and the water causes the water to flow through the turbine, whereby some of the energy is extracted from the flowing water and powers the generator, so as to produce electricity for use onboard the boat. Such an application requires a much smaller size of turbine than the instream tidal power installations mentioned above, but the goal is nonetheless to achieve high efficiency in a smaller turbine apparatus arranged instream in a water flow. As mentioned above, in the prior art devices, it has been difficult to achieve high efficiency and high effectiveness with a small size turbine deployed instream in a fluid flow.

A major problem that has undermined the efficiency and effectiveness of all of the prior art instream devices, is that apparently no coherent and consistent design strategy has been applied to the entire apparatus from the intake inlet to the exhaust outlet, and especially to the design of the intake channel, the rotor channels and the exhaust channel to smoothly accelerate, redirect, and decelerate the water flow throughout its encapture, without causing power losses by turbulence and cavitation. Particularly, prior art turbines are subject to turbulence, cavitation and inefficient flow of the fluid through the channels and especially the rotor. Furthermore, prior art instream turbine arrangements have often required a large physical size of the rotor, which leads to a high cost because of the high demands on the material and the physical construction of the rotor. As also discussed above, such a large size generally leads to a slow rotational speed, which is not ideal for generating electricity, the most common goal of such instream power generation devices. Still further, the conventional turbine arrangements often use movable parts such as control vanes or gates, variable pitch rotor blades, pivotable paddles, pivotable hydrofoils, and the like. Such moving parts increase the complexity, the cost, and the need for maintenance and repair of the turbine installation.

SUMMARY OF THE INVENTION

In view of the above, it is an object of the present invention to provide a turbine apparatus with an intake channel, a rotor, and an exhaust channel designed to smoothly accelerate, redirect and decelerate the fluid flowing through it, while reducing or minimizing (and preferably avoiding) cavitation and turbulence in the flowing fluid, and increasing or maximizing the transfer of power from the flowing fluid to the turbine rotor. Another object of the invention is to provide a configuration of a rotor for such an apparatus, that is designed with rotor channel walls thereof configured along preferably idealized fluid flow streamlines through the rotor channels. It is a further object of the invention to provide a suitable configuration of the intake channel, rotor channels, and exhaust channel of such an instream turbine apparatus deployed in a stream of flowing fluid, so as to increase the kinetic energy of the encaptured fluid, extract power from it, and then regain the static pressure of the fluid that is exhausted or discharged back into the flowing stream at the ambient pressure of the freely flowing stream. Another object of the invention is to provide a relatively small-diameter rotor that rotates at a relatively high rotational speed, to maximize the power transfer from the fluid to the rotor, and from the rotor shaft to an electrical generator, alternator, pump, motor, or the like. It is a further object of the present invention to provide a turbine rotor that has a relatively small diameter and thus a relatively low tip speed despite operating at a relatively high rpm, in comparison to prior art fluid-driven turbines. Yet another object of the invention is to avoid the use of active movable control gates, guide vanes, variable pitch blades, and other movable elements, such that the rotor on a shaft is the only moving component of the turbine apparatus (other than the power output device), while still being useful for generating power from a stream flow with a variable flow velocity. Furthermore, the invention aims to provide a method of accelerating, redirecting and decelerating a flow of fluid while extracting power therefrom. Still further, the invention aims to provide a method of designing such an apparatus as well as a rotor for such an apparatus. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a turbine apparatus for instream deployment, a rotor for the turbine, an operating method, and a design method for designing the configuration of flow passages of the apparatus, based on the general principle of managing the fluid flow as to its direction and speed throughout its encapture in the apparatus so as to minimize the turbulence and maximize the energy harvested. This is achieved preferably by designing all of the flow channels or at least the complex flow channels of the apparatus using idealized streamlines and/or velocity curves of the flowing fluid through the channels, so as to smoothly accelerate, redirect and decelerate the fluid flow. The particular features or aspects of the invention developed in this manner will be discussed below. While the present invention is applicable to any flowing fluid such as water, air (wind) or steam, the invention will be discussed herein primarily with reference to water as the flowing fluid, because the primary applications of the invention are as an instream tidal power generating system and as a power generator to be towed behind a boat. Nonetheless, it should be understood that any discussion referring to water as the flowing fluid shall not be taken as a limitation of the invention, but rather it shall be understood that the inventive apparatuses and methods are applicable to any sort or form of flowing fluid. Also, dimensions discussed herein are merely presently preferred examples, and the dimensions of the device can be scaled-up or scaled-down as necessary for different applications, limited only by material strength properties and concerns of cavitation and tip speed.

The channels through the apparatus are configured to shape and control the fluid flow throughout the apparatus. More particularly, the channel configurations are designed in consideration of the following further basic principles. The mass flow of the fluid is conserved, i.e. maintained constant throughout its encapture in the apparatus. For an incompressible fluid such as water, the volume flow of the fluid is also conserved, i.e. maintained constant throughout the apparatus. The encaptured fluid must be decelerated as an overall net result, in order to extract energy from it, because it must be returned to the ambient stream with the same ambient static pressure, so that only the velocity pressure (and therewith the kinetic energy) can be reduced for extracting energy from the encaptured fluid flow. The overall deceleration ratio from the apparatus intake inlet to the apparatus exhaust outlet is designed in consideration of the Betz limit, to achieve the most efficient operation. Furthermore, despite the overall or net deceleration of the fluid flow, the encaptured fluid is to be accelerated into the rotor. The configuration of the successive channels is designed in view of the fact that the speed of an incompressible fluid through the channel will be inversely proportional to the cross-sectional area of the channel through which it flows. Furthermore, the acceleration and the total velocity is to be limited so as to avoid cavitation, dependent on the local ambient pressure of the fluid stream in which the apparatus is immersed. The local ambient pressure of the fluid stream is equal to its static pressure plus its velocity pressure, and cavitation can be expected to occur at any point in the channeled flow where its designed velocity would require a greater drop in static pressure than the local ambient stream can provide (with adjustment for vapor pressure of the vaporized fluid).

Channel sections of the apparatus are further designed to produce smooth fluid flow with minimized turbulence and cavitation, with converging or diverging cross-sectional areas based on desired velocity curves of the flowing fluid and/or based on streamline modeling of the desired fluid flow. The apparatus includes in series, a converging intake duct defining the intake channel therein, a spiral volute housing defining a spiral channel therein, a rotor that is arranged coaxially in the spiral volute housing and that defines therein rotor channels extending from a peripheral rotor inlet to an axial rotor outlet, and a diverging exhaust duct defining the exhaust channel therein. The inlet of the intake duct faces forward into the ambient flow of fluid. The rotor axis extends transversely to the ambient flow of fluid. The outlet of the exhaust duct faces rearward into the ambient flow of fluid.

Preferably, the adjoining channel sections have identical shapes and sizes where they join, the intake duct maintains a constant proportion of length to width throughout its longitudinal extent, the intake duct is configured according to the designed flow velocity curve thereof, the spiral channel has flat planar sidewalls and a spiral wall that has a radius diminishing linearly with increasing angle away from the inlet of the spiral channel such that the spiral channel has a rectangular open cross-section with a constant axial length and a diminishing radial width along its circumferential extent, the rotor channels are configured according to the designed streamline model thereof, and the exhaust duct is configured according to the designed streamline model and velocity curve thereof.

More particularly, the above objects have been achieved according to the invention in a turbine rotor adapted and configured to be rotationally driven about a rotation axis, which extends in an axial direction, by a flowing fluid. The rotor comprises a rotor core and a plurality of rotor vanes uniformly circumferentially distributed about the rotor core. The rotor has a configuration bounded by a peripheral envelope configured as a surface of revolution about the rotation axis, and has an axial length extending along the rotation axis from a base end of the rotor to an outlet end of the rotor. The rotor includes a first rotor stage being a first portion of the rotor adjoining the base end and extending along the rotation axis along a first portion of the axial length, and a second rotor stage being a second portion of the rotor adjoining the outlet end and extending along the rotation axis along a second portion of the axial length. Bounding surfaces of the rotor core and of the plurality of the rotor vanes define and bound a corresponding plurality of open rotor channels that each respectively communicate from a respective rotor channel inlet on the peripheral envelope to a respective rotor channel outlet on the outlet end of the rotor. All of the respective rotor channel inlets together form a rotor inlet, and all of the respective rotor channel outlets together form a rotor outlet. The bounding surface of the rotor core is defined as a further surface of revolution about the rotation axis, with a radius that diminishes continuously along a curve throughout the first portion of the axial length in the first rotor stage from a maximum radius at the base end to a minimum radius at a downstream end of the first rotor stage. The rotor core radius preferably remains approximately constant at the minimum radius throughout the second portion of the axial length in the second rotor stage. The rotor channels preferably have a cross-sectional area perpendicular to the axis, which increases successively on successive section planes perpendicular to the axis successively along the axis in the first rotor stage.

The bounding surfaces of the rotor core and of the rotor vanes are configured to define and follow smoothly along a respective rank of transformed streamlines extending along the bounding surfaces respectively in each one of the rotor channels from the respective rotor channel inlet to the respective rotor channel outlet thereof. As will be described further below, the transformed streamlines are derived by "twisting" stationary streamlines that define a desired water flow path shape through the stationary space that is enclosed by the bounding surfaces of a rotating rotor, so that the transformed streamlines will define rotor channel surfaces that provide passageways for that desired water flow path when the rotor is rotating at its designed rotational peripheral speed, which is determined as a ratio relative to the velocity of inflowing water. To achieve this desired water flow path through the rotor, the stationary streamlines and the transformed streamlines preferably have the following features. All of the stationary streamlines respectively have the same length from inlet ends thereof at the rotor inlet to outlet ends thereof at the rotor outlet. Respective inlet ends of the stationary and transformed streamlines are spaced uniformly from one another in the axial direction along a radially outer free edge of each respective one of the rotor vanes at the rotor inlet adjacent to the peripheral envelope. Respective outlet ends of the stationary and transformed streamlines terminate in respective annular rings of equal cross-sectional area normal to the rotation axis at the outlet end of the rotor. The stationary streamlines that define a desired water flow path shape through stationary space, and then the transformed streamlines that define rotor channel surfaces (for a rotor rotating at the target rotational peripheral speed ratio) are shaped so that the water flow along the streamlines will follow a water flow path that makes a smooth banked rolling turn through a respective one of the rotor channels from the rotor channel inlet to the rotor channel outlet of the respective rotor channel, whereby the inlet end of a first one of the transformed streamlines is located adjacent to the base end of the rotor, the inlet end of a last one of the transformed streamlines is located adjacent to the downstream end of the first rotor stage, the outlet end of the first one of the transformed streamlines is located on a radially innermost first one of the annular rings of equal cross-sectional area, and the outlet end of the last one of the transformed streamlines is located on a radially outermost last one of the annular rings of equal cross-sectional area. Each one of the transformed streamlines considered individually progresses from the inlet end thereof to the outlet end thereof with a radial position of the respective streamline monotonically non-decreasing or monotonically non-increasing from the inlet end to the outlet end thereof. In a particular preferred embodiment, all of the streamlines will have a radius that is monotonically non-increasing from the inlet end to the outlet end thereof, but in other embodiments (e.g. when the rotor has a larger outlet radius than its base end inlet radius or average inlet radius) some streamlines have a monotonically decreasing radius while other streamlines have a monotonically increasing radius from the inlet end to the outlet end thereof.

Further preferably, embodiments of the rotor according to the invention have the following additional preferred features. The rotor is configured and adapted to rotate at a target rotational peripheral speed ratio that is defined from and directly proportional to the speed of ambient flow, in an operational rotation direction about the rotation axis, with the fluid flowing from the rotor inlet to the rotor outlet at a target fluid flow rate that also is defined from and directly proportional to the speed of ambient flow, through the rotor channels. The transformed streamlines are based on a rotational transformation of a rank of stationary streamlines into a rotating reference system for rotation of the rotor at the target rotational peripheral speed ratio by helically twisting the stationary streamlines about the rotation axis in a twist direction opposite the operational rotation direction of the rotor by twist angles that increase progressively from a zero twist at the base end to a maximum twist at the outlet end corresponding to a rotation angle through which the rotor will rotate at the target rotational peripheral speed ratio when the fluid flows from the rotor inlet to the rotor outlet at the target fluid flow rate through the rotor channels. The outlet ends of the stationary streamlines each respectively exit the rotor outlet parallel to the rotation axis. The outlet ends of the transformed streamlines each respectively exit the rotor outlet at an exit angle corresponding to the maximum twist angle relative to a radial plane along the rotation axis. The transformed streamlines model, in the rotating rotor, the same flow path as the stationary streamlines do in a stationary frame of reference, but only when they (the transformed streamlines) are rotating at the rotor's target rotational peripheral speed ratio.

Preferably, the first transformed streamline has the most axial travel distance and the most radial travel distance and the least circumferential travel distance of all of the transformed streamlines from the rotor inlet to the rotor outlet, and the last transformed streamline has the least axial travel distance and the least radial travel distance and the most circumferential travel distance of all of the transformed streamlines from the rotor inlet to the rotor outlet. The last transformed streamline remains at a near constant radial distance relative to the rotation axis from near the inlet end thereof within the rotor channel inlet of the respective rotor channel to the outlet end thereof at the rotor channel outlet of the respective rotor channel. The last transformed streamline undergoes all of the circumferential travel distance thereof within about a first two-thirds of the axial travel distance thereof from the inlet end to the outlet end thereof, and the first transformed streamline undergoes all of the radial travel distance thereof within about a first two-thirds of the axial travel distance thereof from the inlet end to the outlet end thereof.

The above objects have further been achieved according to the invention in a turbine apparatus comprising the inventive turbine rotor, and adapted to be immersed instream in a flowing stream of the flowing fluid so as to capture and direct a portion of the flowing fluid through the turbine rotor to rotationally drive the turbine rotor and extract power from the portion of the flowing fluid. The turbine apparatus further comprises an intake duct, a spiral volute casing, and an exhaust duct. The intake duct has an intake duct inlet and an intake duct outlet, and bounds in the intake duct an intake channel which converges continuously and smoothly from the intake duct inlet to the intake duct outlet. The spiral volute casing has a rectangular volute casing inlet connected to the intake duct outlet, and bounds in the spiral volute casing a spiral channel. At least the first stage, and preferably only the first stage, of the rotor is received in the spiral channel with the rotation axis of the rotor coinciding with a spiral axis of a spiral shape of the spiral channel. The spiral channel has on any radial plane a rectangular open cross-section with a constant uniform axial length and a radial width bounded between the spiral volute casing and the peripheral envelope of the rotor. The radial width diminishes continuously around the spiral axis from a maximum radial width at the volute inlet to essentially zero, where the spiral radius is equal to the radius of the peripheral envelope of the rotor plus any necessary clearance, after about (+/−5%) one spiral revolution around the spiral axis from the volute casing inlet. The spiral volute casing has a circular volute casing outlet that is located coaxially on the spiral axis and receives the second rotor stage and/or the rotor outlet end coaxially therein. The exhaust duct has a circular exhaust duct inlet connected to the volute casing outlet and an exhaust duct outlet, and bounds in the exhaust duct an exhaust channel which diverges continuously and smoothly from the exhaust duct inlet to the exhaust duct outlet. An overall exhaust/intake area ratio of a cross-sectional area of the exhaust duct outlet relative to a cross-sectional area of the intake duct inlet is in a range from 2:1 to 10:1. An intake acceleration ratio of the cross-sectional area of the intake duct inlet relative to a cross-sectional area of the intake duct outlet is in a range from 1:1 to 72:1. An effective rotor inlet area with respect to an inward spiraling flow of the fluid entering the rotor inlet is approximately (+/−5%) equal to the cross-sectional area of the intake duct outlet. The intake duct has four duct walls bounding a rectangular cross-section of the intake channel, and all of the duct walls converge smoothly and continuously toward a longitudinal intake axis of the intake channel from the intake duct inlet to the intake duct outlet. The rotation axis and the spiral axis extend transverse and offset relative to the longitudinal intake axis of the intake channel. The exhaust duct inlet is coaxial with the spiral axis. The exhaust duct outlet diverges about an exhaust outlet axis that is parallel to the longitudinal intake axis. The exhaust duct further includes an exhaust elbow arrangement that curves from the spiral axis to the exhaust outlet axis and that has a cross-section which diverges smoothly and continuously throughout the exhaust elbow arrangement and transitions from a circular shape of the exhaust duct inlet to a different shape of the exhaust duct outlet.

Still further, the above objects have been achieved according to the invention, in a method of designing a turbine apparatus adapted to be immersed instream in a flowing stream of a flowing fluid so as to capture an encaptured portion of the flowing fluid, extract power therefrom, and then exhaust the encaptured portion of the flowing fluid back into the flowing stream of the flowing fluid, wherein the turbine apparatus comprises an intake duct that converges from an intake duct inlet to an intake duct outlet thereof, a spiral volute casing having a volute casing inlet connected to the intake duct outlet of the intake duct, a rotor that is received at least partly within the spiral volute casing, and that is arranged with a rotor rotation axis of the rotor coaxial with a spiral axis of the spiral volute casing, and that has a peripheral rotor inlet about at least a portion of a circumferential periphery thereof, and has an axial rotor outlet at an axial end thereof, and has plural rotor vanes extending from the rotor inlet to the rotor outlet, and an exhaust duct that has an exhaust duct inlet thereof connected to the spiral volute casing coaxially about the spiral axis and adjoining the axial rotor outlet and that has an exhaust duct outlet facing opposite the intake duct inlet. The method comprises the following steps. A step a) involves determining a target ambient flow velocity and a target ambient static pressure of the flowing stream of the flowing fluid in which the turbine apparatus is to be immersed. A step b) involves specifying a target output power that is to be extracted by the rotor from the encaptured portion of the flowing fluid. A step c) involves specifying an overall deceleration ratio of the encaptured portion of the flowing fluid from the intake duct inlet to the exhaust duct outlet as a ratio of the target ambient flow velocity to a target exhaust flow velocity at which the encaptured portion of the fluid is to be exhausted from the exhaust duct outlet back into the flowing stream of the flowing fluid. A step d) involves specifying an accelerated flow velocity of the encaptured portion of the flowing fluid at or below an upper flow velocity limit at which cavitation of the fluid would occur dependent on the target ambient static pressure and dependent on a composition of the fluid. A step e) involves specifying an intake acceleration ratio of the encaptured portion of the flowing fluid from the intake duct inlet to the intake duct outlet as a ratio of the accelerated flow velocity to the target ambient flow velocity. A step f) involves specifying an intake area of the intake duct inlet based on and dependent on the target ambient flow velocity and the target output power. A step g) involves specifying an exhaust area of the exhaust duct outlet based on a selected first ratio of the exhaust area relative to the intake area of the intake duct inlet, wherein the selected first ratio is equal to the overall deceleration ratio. A step h) involves specifying an intake duct outlet area of the intake duct outlet based on a selected second ratio of the intake area of the intake duct inlet relative to the intake duct outlet area, wherein the selected second ratio is equal to the intake acceleration ratio. A step I) involves specifying a configuration of the intake duct to have a rectangular cross-section that converges smoothly, non-linearly, and monotonically, while maintaining a constant proportion of a width and a length thereof, from the intake duct inlet having the intake area to the intake duct outlet having the intake duct outlet area. A step j) involves specifying a configuration of the spiral volute casing to bound between the spiral volute casing and the peripheral rotor inlet a spiral channel having a rectangular cross-section with a constant axial length parallel to the spiral axis and a radial width that diminishes linearly with increasing polar angle around the spiral axis beginning from the volute casing inlet, which matches the intake duct outlet, wherein the radial width at the volute casing inlet relative to the axial length defines a selected fifth ratio. A step k) involves specifying a configuration of the rotor by specifying a rotor outlet area of the rotor outlet based on a selected third ratio of the intake duct outlet area relative to the rotor outlet area, specifying a rotor inlet radius of the peripheral rotor inlet about the rotor rotation axis based on a selected fourth ratio of the rotor inlet radius relative to a rotor outlet radius of the rotor outlet, specifying a rotor target rotational peripheral speed ratio based on a selected sixth ratio of the rotor target rotational peripheral speed relative to the accelerated flow velocity, defining a configuration of the rotor vanes and of a rotor core from which the rotor vanes extend such that bounding surfaces thereof follow smoothly along a respective rank of transformed streamlines in a respective rotor channel bounded by a respective adjacent pair of the rotor vanes from a respective rotor channel inlet thereof at the rotor inlet to a respective rotor channel outlet thereof at the rotor outlet, wherein the transformed streamlines are defined as discussed above and are determined by the rotational transformation of stationary streamlines as discussed above. A step l) involves specifying a configuration of the exhaust duct such that the exhaust duct inlet has a round shape and size that matches the rotor outlet and is arranged coaxially about the rotor rotation axis, the exhaust duct outlet has the exhaust area and is oriented facing opposite the intake duct inlet, and the exhaust duct curves and diverges smoothly and continuously along fair banking streamlines from the exhaust duct inlet to the exhaust duct outlet.

According to further preferred features of the inventive method, the selected first ratio is in a range from 2:1 to 10:1, the selected second ratio is in a range from 1:1 to 72:1, the selected third ratio is in a range from 0.5:1 to 1.67:1, the selected fourth ratio is in a range from 0.77:1 to 1.4:1, the selected fifth ratio is in a range from 0.5:1 to 2:1, and the selected sixth ratio is in a range from 0.3:1 to 4:1.

Further details and advantages of the invention are evident from the following detailed description and the appended claims.

BRIEF DESCRIPTION OF THE DRAWINGS

In order that the invention may be clearly understood, it will now be described in connection with an example embodiment thereof, with reference to the accompanying drawings, wherein.

Figure 1:
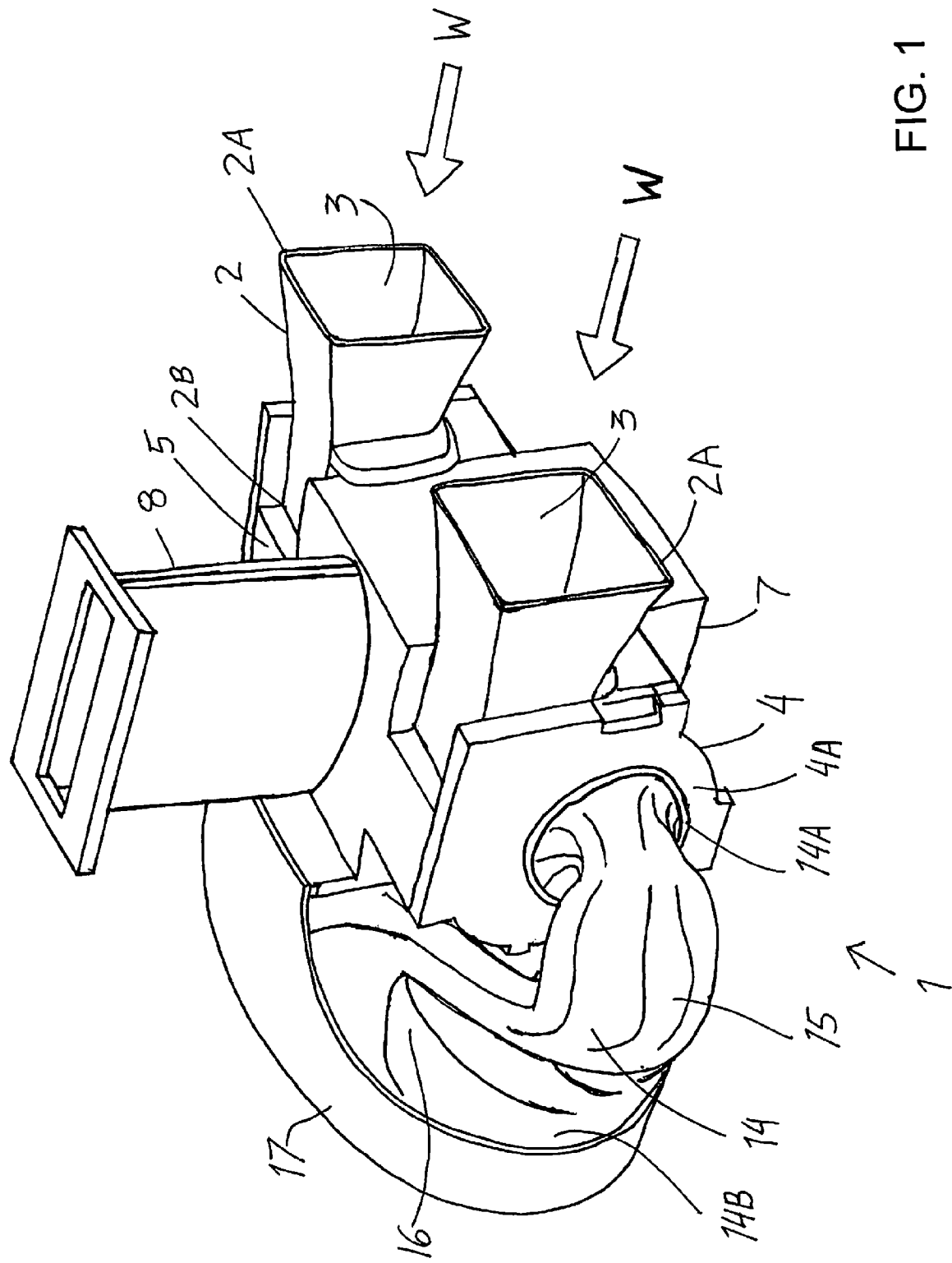
FIG. 1 is a schematic perspective view of an instream hydro power generator apparatus according to an example embodiment of the invention.

DETAILED DESCRIPTION OF A PREFERRED EXAMPLE EMBODIMENT AND BEST MODE OF THE INVENTION

FIGS. 1 to 5 schematically show the overall construction of an example embodiment of an instream hydro power generator apparatus 1 according to the present invention, which has been built as a prototype. The apparatus 1 is especially adapted and designed to be arranged instream, i.e. immersed in a flowing stream of water W, so as to encapture a portion of the flowing water and extract mechanical power from the encaptured flowing water. However, the invention is not limited to the use of flowing water as the fluid medium from which power is extracted, but rather the inventive teachings can also be applied to a turbine apparatus for extracting power from wind or steam or other flowing fluid media.

An example of such an instream installation involves the hydro power generator apparatus 1 being secured on a base or pedestal on the seabed in a location where the apparatus will be exposed to tidal flow of ocean water. Alternatively, the instream installation may involve the apparatus 1 tethered by one or more cables from the seabed and/or a floating platform in the ocean, or from a piling secured in the sea floor. As a further alternative, the apparatus 1 may be tethered in a floating or neutrally buoyant configuration from a floating platform or buoy. Another type of instream installation involves the apparatus 1 being similarly mounted or tethered in a flowing water stream of a river or the like. In most pertinent instream installations, a common feature is that the apparatus 1 itself is immersed in the stream of water W, such that the water intake inlets and the water exhaust outlets are both immersed in the water, and the apparatus is oriented so that the water intake inlets face directly upstream into the incident or oncoming flow of water.

The proper design of the apparatus must take the instream installation into account, especially because the ambient static pressure of the water being returned into the flowing stream at the exhaust outlets of the apparatus must match the ambient static pressure of the flowing water at the inlets and all around the apparatus. Thus, the installation depth of the apparatus determines the ambient static pressure of the water, and will influence the design as discussed below. Furthermore, the instream application has a rather low pressure head across the device, produced only by the velocity pressure of the water as determined by the stream flow velocity, because the ambient static pressure is the same at the inlet and the outlet, so that there is no net static pressure drop across the device. Furthermore, the instream applications preferred for the present apparatus will operate in stream flows of relatively low water speed, e.g. from 1 knot (or even less) up to about 20 knots, and especially in the range of 1 knot to 10 knots, which produces a relatively low velocity pressure and thus a relatively low pressure head. This is a significant distinction relative to hydroelectric power generation turbine installations that operate with a high pressure head of water from an impounded or barraged reservoir of water behind a dam or the like, and which use the high static pressure of the feed water for at least partial conversion to increased velocity pressure and kinetic energy of the water, so that this energy can be extracted, before discharging the water at a lower ambient static pressure below.

Yet another instream application of the inventive apparatus is to be tethered and towed behind a boat such as a sailboat, or mounted below the waterline on the boat, so that the apparatus is exposed to the relative flow of water as the boat travels through the water. The apparatus can then extract power from the encaptured flowing water, to generate electricity or to purify water for use onboard the boat.

Most basically, the apparatus 1 includes a pair of intake ducts 2, a pair of rotor housings 4, a pair of exhaust ducts 14, and a respective rotor 9 rotatably supported in each one of the rotor housings 4. The rotors 9 are not visible in the external views of FIGS. 1 to 5, but will be discussed below in further detail in connection with subsequent figures. While this embodiment includes respective pairs of the components 2, 4, 9 and 14 arranged mirror symmetrically about a vertical center plane, a varied embodiment of the inventive apparatus could include only one set of the intake duct 2, the rotor housing 4, the rotor 9 and the exhaust duct 14. The preferred apparatus, however, includes mirror symmetrically paired components as shown and described herein. While most of the present description will refer to only one intake duct 2, one rotor housing 4, one exhaust duct 14, etc., it should be understood that the description similarly applies to the mirror symmetrical arrangement of such components on the other side of the apparatus 1.

These basic components of the apparatus 1, namely the intake duct 2, the rotor housing 4, the rotor 9 arranged within the rotor housing 4, and the exhaust duct 14, form a water flow channel through the apparatus, which accelerates, redirects and decelerates the encaptured flow of water in a smooth and carefully designed and controlled manner throughout the system, in order to be able to extract a high percentage of the available power from the water, without creating superfluous turbulence and cavitation in the flow. The particular design of these basic components will be discussed in detail below. The operation of these components will also be discussed further below.

In this regard, the intake duct 2 has a forwardly directed open intake duct inlet 2A and a rearwardly directed open intake duct outlet 2B. The intake duct 2 defines and bounds therein an intake channel 3 that converges smoothly from the intake duct inlet 2A to the intake duct outlet 2B. Thereby, the water entering the inlet 2A is smoothly accelerated to an increased velocity at the outlet 2B. There, the water enters a spiral channel 6 bounded within a spiral volute casing 5 and two parallel planar side plates 4A of the rotor housing 4. Due to the fixed constant spacing between the parallel planar side plates 4A, and a decreasing radius of the spiral volute casing 5 about a spiral axis as the spiral progresses angularly in the circumferential direction from the spiral channel inlet, the spiral channel has a rectangular open channel cross-section (on a radial plane) with a constant axial length and with a radial width that diminishes with increasing angular position from the spiral channel inlet. Thereby, the water in the spiral channel is progressively accelerated and redirected into a tangential circumferential flow direction with a radial inward component flowing into the rotor channels 10 of the rotor 9 (see the further discussion regarding FIG. 6 below). The rotor channels 10 redirect the water flow from the tangential and radially inward direction into an axial direction parallel to the axis A of the rotor 9, to then discharge the water in the axial direction into the exhaust channel 18 bounded and defined within the exhaust duct 14. In this regard, the exhaust duct 14 includes an exhaust duct inlet 14A connected to the rotor housing 4 and receiving the water flow in the axial direction, an exhaust duct elbow 15 turning the water flow from the axial direction generally rearwardly, and an exhaust diffuser bell that further decelerates the water flow along the diverging exhaust channel 18 and then exhausts the decelerated water flow through the exhaust duct outlet 14B back into the ambient surrounding stream flow of water.

For reference, the end of the apparatus 1 facing upstream into the flow of water W is considered to be the front or forward end, while the opposite end is the rear or aft end. Thus, the intake duct inlets 2A face toward the front, while the exhaust duct outlets 14B face toward the rear. In this orientation relative to the stream flow of water W, the sides of the apparatus will be referred to as the starboard and port sides, with the typical nautical meaning thereof, to avoid any ambiguity of directional references. Namely, the directions are understood relative to the forward direction facing into the incident stream flow of water W.

In addition to the above basic components of the apparatus 1, the apparatus further includes several auxiliary components as follows. Between the two rotor housings 4, a gear case 7 is arranged centered on the center plane of the apparatus. A rotor shaft 13 (see FIGS. 6 and 8) on which the two rotors 9 are mounted extends horizontally through the gear case 7 along the rotor axis A. The rotor shaft may be a single shaft or may be split into two half-shafts. The gear case 7 houses any conventionally known or future developed power transmission arrangement (not shown). For example, the power transmission arrangement may comprise one or more gear wheels forming a gear train, or a sprocket and chain, or a pulley and a V-belt or a toothed belt, in order to transmit the power from the rotating rotor shaft 13 out of the apparatus 1. Alternatively, the power transmission arrangement may involve a hydraulic pump for transmitting the mechanical power of the rotating shaft 13 into a pressurized pumped hydraulic fluid that is then conveyed out of the apparatus. Still further, the power transmission arrangement may comprise an electrical generator or alternator for converting the mechanical power of the rotating shaft 13 into electrical power which is then transmitted through appropriate conductors out of the apparatus 1. The rotor shaft 13 is rotatably supported in any suitable bearings, for example mounted on the sidewalls of the gear case 7. If the gear case 7 houses an electrical generator or alternator, then the gear case shall preferably be sealed in a water-tight manner, and the bearings must then also be watertight. Otherwise, if the gear case 7 merely houses mechanical components such as gears, sprockets, pulleys with the associated belts, chains or the like, or a hydraulic pump, then the gear case does not need to be water-tight, and the bearings also do not need to be water-tight, but instead the gear case may be a wet gear case that allows permeation of water.

Further in this regard, the apparatus 1 may additionally comprise a standpipe 8 extending upwardly from the gear case 7, and forming a passage through which the power transmitting chain, belt, gear train, shaft, hydraulic hoses, or electrical conductors can be extended vertically upwardly from the apparatus 1 to a mounting platform to which the apparatus is mounted, or to a boat, or any other structure above or out of the water stream in which the apparatus is arranged. The standpipe 8 is preferably faired or configured with a foil shape in order to present a minimum flow resistance and disturbance of the ambient water flow around it. The configuration and even the use of such a standpipe is, however, not a significant feature of the present invention, and it can be omitted from the apparatus as desired. It merely represents a convenient manner of securing the underwater apparatus to a support platform above and transmitting the harvested power out.

The apparatus 1 preferably further includes an exhaust housing 17, which preferably has an elliptical shape, and which extends around, houses and structurally supports the exhaust duct outlets 14B, i.e. the rear or aft ends of the two half-elliptical D-shaped exhaust diffuser bells 16 of the two exhaust ducts 14. The structure and outer configuration of the apparatus are mainly provided by the gear case 7, the intake ducts 2, the rotor housings 4, the exhaust ducts 14, and the exhaust housing 17. In the example embodiment and prototype as built according to present FIGS. 1 to 5, all of these components are externally exposed, and have an exterior configuration that is largely determined by the required interior configurations of the water flow channels. The exterior shape of the apparatus is not of functional concern in fixed or stationary instream installations, such as for tidal or river power generation, because the drag imposed by the apparatus in the flowing water stream is not of paramount concern. Namely, the apparatus is simply mounted or tethered to the sea floor or river bottom or the like, as discussed above, so that the drag of the exterior shape of the apparatus does not impose an operating penalty. On the other hand, for the application of the apparatus being towed below or behind a boat, it is desirable to provide a streamlined outer configuration, for example by providing additional exterior fairings around the gear case 7, rotor housings 4, and exhaust ducts 14.

Figure 2:
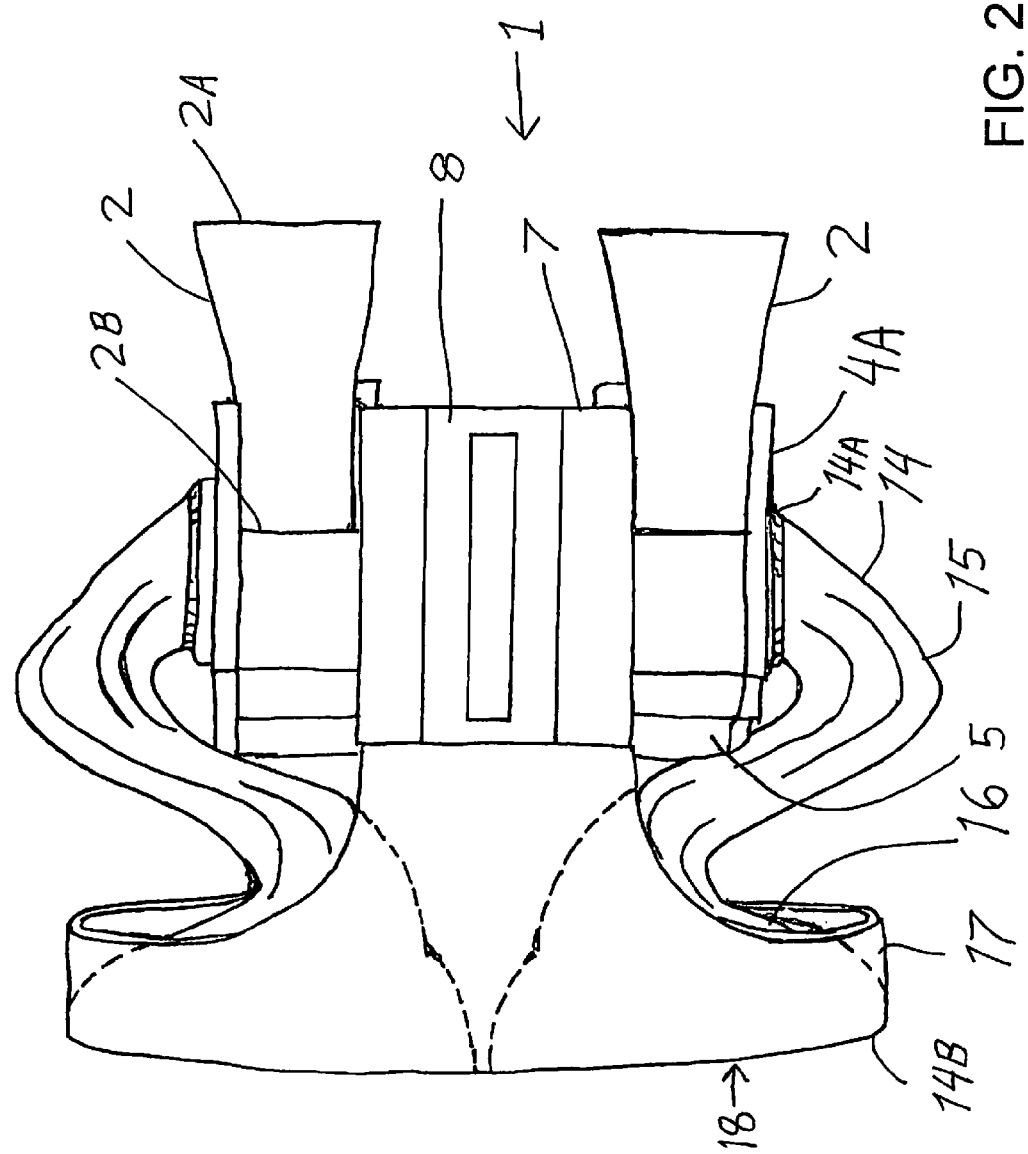
FIG. 2 is a top plan view of the apparatus of FIG. 1.
Figure 3:
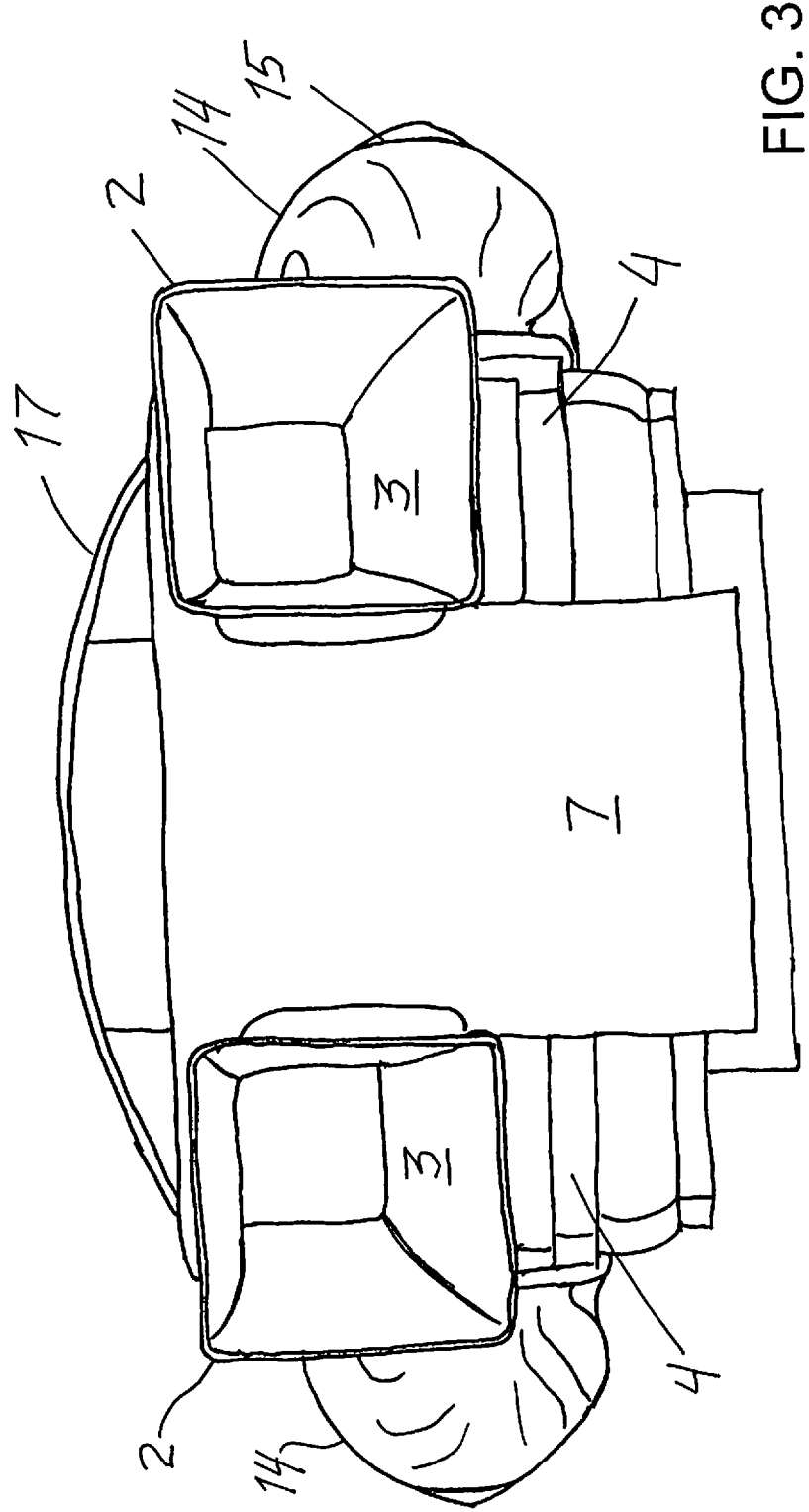
FIG. 3 is a front elevation view of the apparatus of FIG. 1, except omitting a standpipe component thereof.
Figure 4:
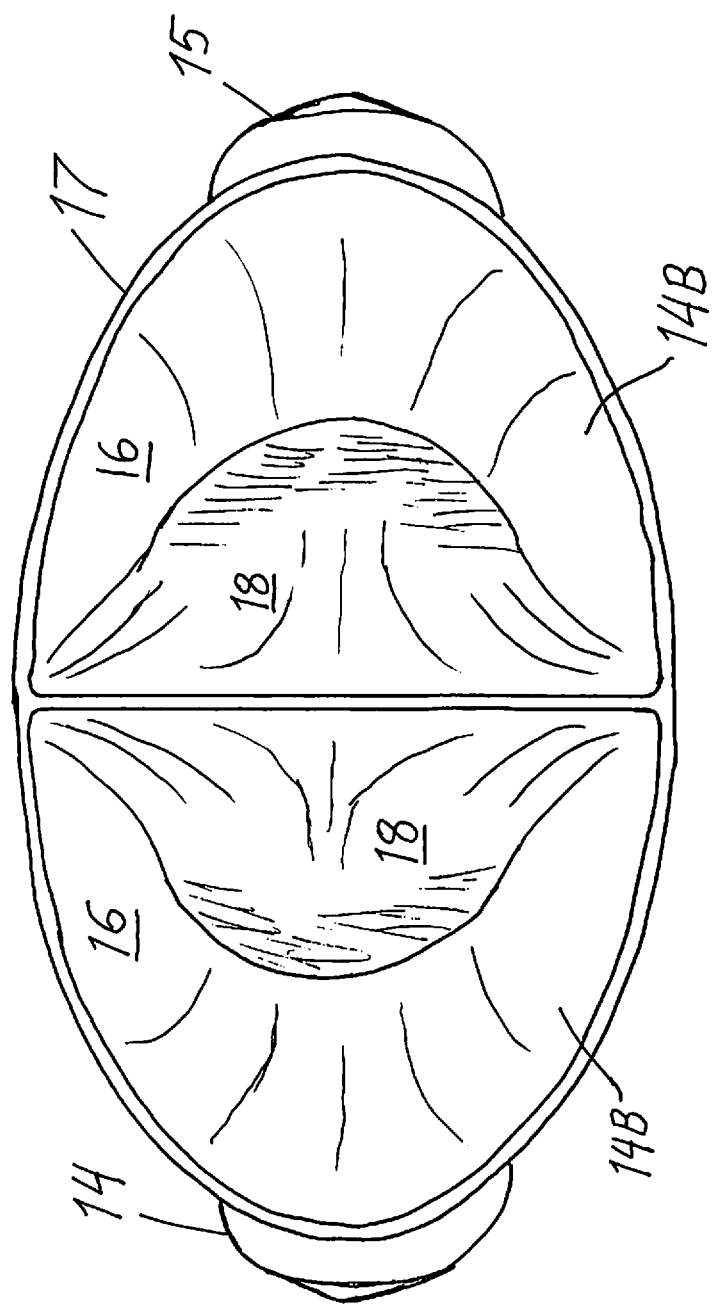
FIG. 4 is a schematic rear elevation view of the apparatus of FIG. 3.

In the top plan view of FIG. 2, the diverging or expanding width of the exhaust channel 18 as defined by the shape of the exhaust duct 14 and especially the exhaust diffuser bell 16 can be seen. Dashed ghost lines represent the contour of the exhaust diffuser bell 16 hidden within the exhaust housing 17. The diverging or expanding shape of the exhaust duct 14 and especially the exhaust diffuser bell 16 in the vertical or height direction can be seen in the side elevation view of FIG. 5. The rear elevation view of FIG. 4 shows the shape of the exhaust duct outlet 14B of each one of the two exhaust ducts 14, and particularly of the exhaust diffuser bells 16 of the two exhaust ducts 14. Each exhaust duct outlet 14B has a so-called D-shape, which is substantially half of an ellipse. Thus, the two water flows exiting the two exhaust ducts 14 through the exhaust duct outlets 14B merge together at the downstream or aft end of the apparatus to form an elliptical water flow that is reintroduced and merged back into the surrounding ambient water stream.

Figure 5:
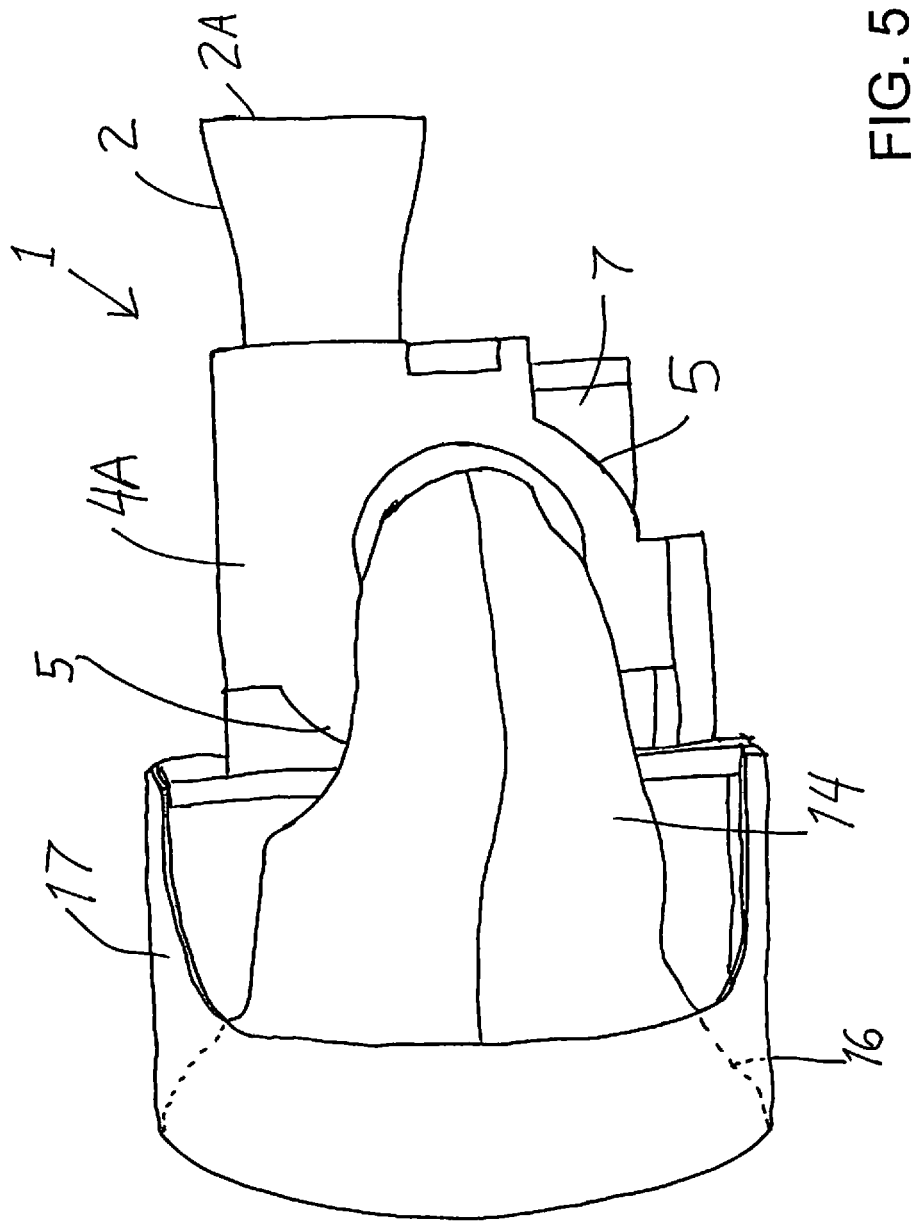
FIG. 5 is a right or starboard side elevation view of the apparatus of FIG. 3.

FIGS. 2 and 5 also show the smoothly converging shape of the water intake channels 3 defined inside the intake ducts 2. The intake ducts 2 preferably have a rectangular cross-sectional shape, as will be discussed further below. Each duct 2 converges symmetrically about its longitudinal center line from the larger inlet area of the intake duct inlet 2A to the smaller outlet area of the intake duct outlet 2B. As can be seen in these FIGS. 1 to 5, neither the intake ducts 2 nor the exhaust ducts 14 use linear or planar surfaces to bound and define the water channels therein. Rather, the surfaces are all smoothly curved in at least one, two or three dimensions, for appropriately controlling, accelerating, and decelerating the water flow according to the principles of the present invention. Preferably, the only channel bounding surfaces that are flat planar surfaces are the side plates 4A of the rotor housing 4 bounding the sides of the spiral channel 6, and the apparatus includes no other flat planar surfaces that bound the water flow channel or passage.

Figure 6:
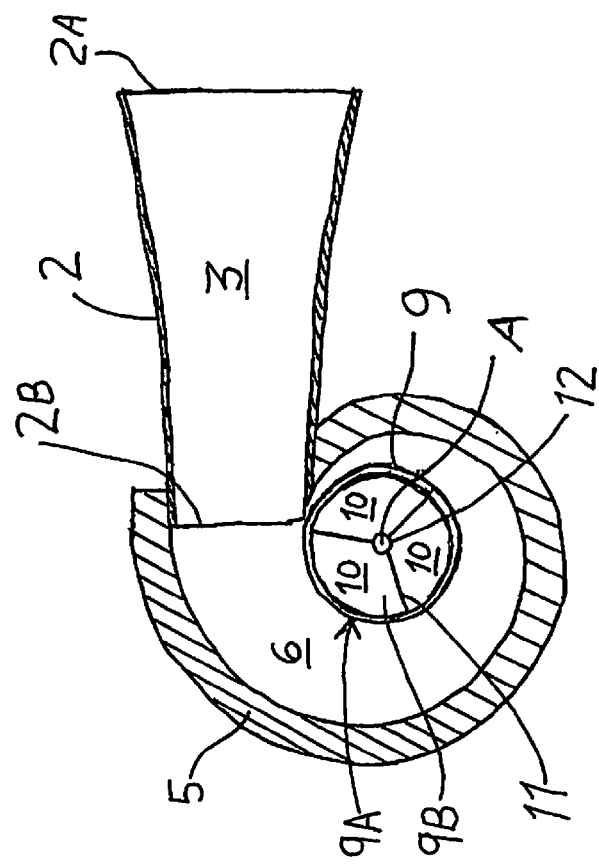
FIG. 6 is a schematic sectional view along a vertical section plane, of a spiral volute casing, a rotor, and an intake duct of the apparatus of FIG. 1.

FIG. 6 shows further details of the configuration of one of the intake ducts 2 and one of the spiral volute casings 5 of one of the rotor housings 4, as well as the arrangement of one of the rotors 9 within the spiral volute casing 5. FIG. 6 is a cross-sectional view taken on a vertical section plane that extends normal to the axis A of the rotor shaft 13 of the rotor 9. It can be seen that the intake channel 3 defined and bounded within the intake duct 2 converges smoothly, monotonically and non-linearly from the intake duct inlet 2A to the intake duct outlet 2B. The intake channel 3 has a rectangular cross-section normal to its longitudinal extension, and the proportions of the transverse length (parallel to the axis A) and vertical width of the cross-sectional shape are maintained throughout the longitudinal extent of the intake channel. The intake duct outlet 2B transitions directly (without change of shape or dimensions) into the spiral channel inlet at the inlet end of the spiral channel 6 bounded and defined within the spiral volute casing 5. The spiral channel 6 has a rectangular cross-section along any plane extending radially and axially relative to the axis A of the rotor shaft 13. At the intake duct outlet 2B, the spiral channel entry preferably has a rectangular cross-section with a shape, length and width matching those of the intake duct outlet 2B, so that the water flows smoothly from the intake channel 3 into the spiral channel 6. The axial length of the spiral channel 6 extending in the direction of the axis A remains constant throughout the entire spiral channel 6. The radial dimension or width of the spiral channel 6, however, diminishes as the spiral progresses in a counterclockwise direction around the axis A of the rotor shaft 13 in the view of FIG. 6. Therefore, in the spiral channel 6, the water flowing in from the intake channel 3 is progressively accelerated and redirected or "squeezed" by the radially inwardly converging spiral channel into a radially inwardly converging spiral flow, with a tangential component around the circumferential periphery of the rotor 9 and a radially inward directed component into the peripheral rotor inlet 9A. The spiral channel 6 is particularly configured so that its cross-sectional area diminishes to essentially zero around one complete 360° spiral progressing angularly around the rotor axis A (coinciding with the spiral axis) from the spiral channel inlet, i.e. the intake duct outlet 2B.

Thereby, all of the water flowing in the spiral channel 6 is squeezed or redirected radially inwardly into the rotor 9 around the course of one 360° turn of the spiral. A small clearance still exists between the periphery of the rotor 9 and the radially inner tail end of the spiral volute casing 5, to ensure that there is no collision or rubbing friction of the rotor 9 with the spiral volute casing 5. In this manner, with all of the water flowing from the spiral channel 6 into the peripheral rotor inlet 9A of the rotor 9 around one 360° turn of the spiral, the water enters the rotor inlet 9A at an inflow angle that for purposes of ascertaining the inward component of flow at the peripheral rotor inlet is taken to be the same as that of the diminishing spiral shape where it meets the radius of the peripheral envelope of the rotor. Preferably that angle is 15.0° relative to the tangent to the circumferential periphery of the rotor 9, or 75.0° relative to a radial line, as considered in a stationary (non-rotating) coordinate system. This inflow angle of the water into the rotor is significant, and is taken into account, in the design of the rotor as will be discussed below. As will also be discussed below, the rotor 9 then redirects the water flow from its inflow direction (with a radial component and a tangential component), into the axial direction to the rotor outlet 9B at the outboard axial end of the rotor.

The rectangular cross-sectional shape of the spiral channel 6, and thus also the rectangular cross-sectional shape of the intake channel 3, is preferred because it is the best shape for smoothly feeding the water into the circumferential peripheral rotor inlet 9A of the cylindrical rotor 9. Namely, by simply reducing the radial width of the rectangular spiral channel 6 as the spiral progresses angularly in the counter-clockwise direction in FIG. 6, the water can be smoothly squeezed or redirected radially inwardly into the rotor inlet 9A, without requiring any re-shaping of the water flow as would be required if the spiral channel 6 had a circular or oval or elliptical cross-sectional shape. Thus, the diminishing rectangular cross-section of the intake channel 3 feeds the water smoothly into the diminishing rectangular cross-section of the spiral channel 6, which in turn feeds the water smoothly into the circumferential peripheral rotor inlet 9A of the rotor 9, which also has a rectangular shape in circumferential development thereof.

It is also significant according to the invention, as can be seen especially in FIG. 6, that the inventive apparatus includes no active movable control gates and no stator vanes to direct the water flow into the rotor. Instead, the spiral channel 6 formed by the spiral volute casing 5 is a fixed passive element that naturally directs the water radially into the rotor inlet 9A as the water progresses around one revolution of the spiral. Avoiding active control gates and stator vanes reduces the cost and complexity of the apparatus, reduces the chance of malfunction or breakdown, reduces the need for maintenance, avoids the need for active water flow regulation, and avoids superfluous drag, turbulence and cavitation that is potentially caused by such elements. As will also be apparent in FIG. 8 discussed below, the rotor itself is a fixed unit, without variable pitch blades or the like. Throughout the entire water flow channel, the only moving part is the rotor 9, which moves as one solid unit. Thus, the apparatus is very simple and robust, yet by its design very efficient and effective.

Figure 7:
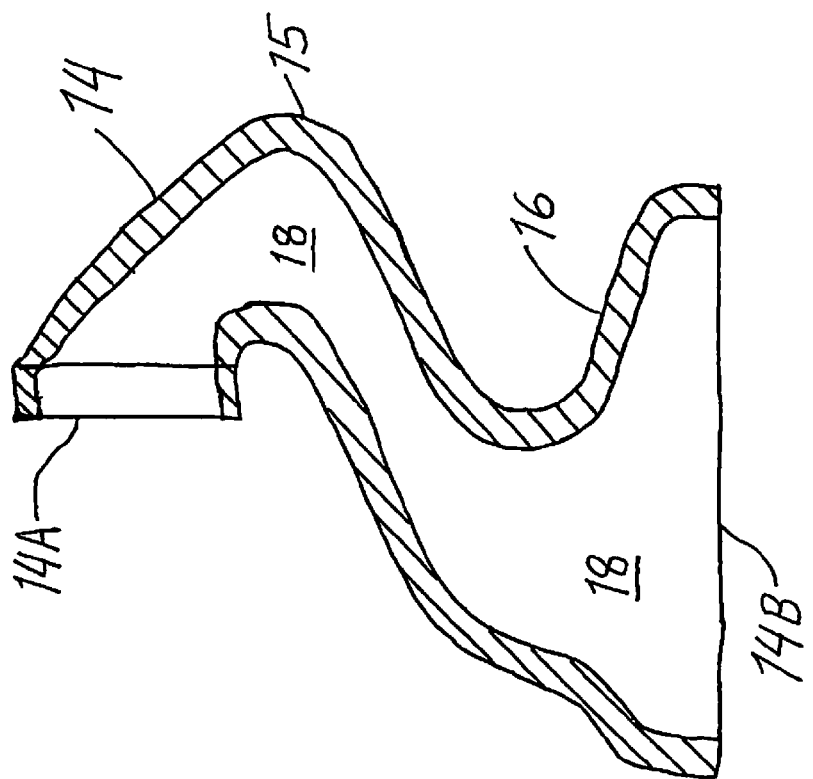
FIG. 7 is a schematic sectional view on a horizontal section plane, of an exhaust duct of the apparatus of FIG. 1.

FIG. 7 shows a cross-section of one of the exhaust ducts 14 along a horizontal section plane. The exhaust channel 18 defined and bounded within the exhaust duct 14 diverges or expands smoothly in cross-sectional area perpendicular to the water flow direction, as it progresses from the exhaust duct inlet 14A to the exhaust duct outlet 14B. Some of the expansion of the cross-sectional area is in the horizontal direction as can be seen in FIG. 7, and some of the expansion is in the vertical direction as can be seen in FIG. 5. The exhaust channel 18 also transitions from the circular shape at the exhaust duct inlet 14A to the half-elliptical D-shape at the exhaust duct outlet 14B. This transition is achieved smoothly, gradually and continuously along the flow length of the exhaust channel 18. Because the water is to be decelerated substantially linearly from the inlet 14A to the outlet 14B, therefore the cross-sectional area must increase linearly at the same rate, i.e. by the same ratio from the inlet 14A to the outlet 14B as the intended deceleration ratio through the exhaust channel 18. Furthermore, the exhaust channel 18 defined in the exhaust duct 14 redirects the water flow from an axial direction along the rotor axis A (transverse to the ambient external water flow direction W) at the exhaust duct inlet 14A, to a discharge direction parallel to and facing downstream into the ambient external water flow direction W at the exhaust duct outlet 14B. The shape of the exhaust channel 18 is particularly designed to avoid introducing losses of turbulence and cavitation by configuring the exhaust duct 14 along smoothly banking and fairly diverging streamlines, as will be discussed below.

A special feature of the design, i.e. configuration and dimensioning, of the exhaust duct 14 is that it achieves a smooth uniform deceleration of the water flowing through it, due to a smooth uniform increase of the cross-sectional area of the bounded exhaust channel 18 normal to the water flow direction at every point, along the water flow travel path distance. The shape of the exhaust duct 14 achieves this while also turning the course of the exhaust channel 18 from the axial direction along the rotor axis A, i.e. transverse to the ambient water stream flow W, rearwardly to the exhaust direction which is parallel to and oriented in the same direction as the ambient stream flow direction W. Thus, as seen in the top view in FIG. 2, the exhaust duct 14 has a Z-shape or S-shape, while expanding the cross-sectional area thereof. It can be seen that the exhaust duct elbow 15 of the exhaust duct 14 has an elbow angle of less than 90° while still expanding the cross-sectional area of the duct perpendicular to the direction of water flow throughout the elbow 15.

The cross-sectional hatching in FIGS. 6 and 7 is not intended to be lined for any particular material for constructing the components. All of the components can be constructed of any suitable known or future-developed material, such as wood, plastic, fiber reinforced composite, metal, etc. Preferably, the intake duct 2, the spiral volute casing 5, and the exhaust duct 14 are each constructed of a suitable fiber reinforced composite, such as fiberglass reinforced polyester or epoxy resin, optionally over wooden cores, because such composite materials are strong, rigid, lightweight, and easy to fabricate in smoothly contoured curves, for example by typical molding or lay-up methods. The rotor 9 for most applications is also preferably fabricated of a fiber reinforced composite, such as fiberglass reinforced resin, which may be formed over a wooden core or molded. However, for rotors designed to operate at higher rotational speeds, in an apparatus designed for immersion at great depth so that higher internal flow velocities can be tolerated without cavitation, the rotors would be fabricated of metal, for example cast or machined from a high strength metal alloy.

Figure 9A:
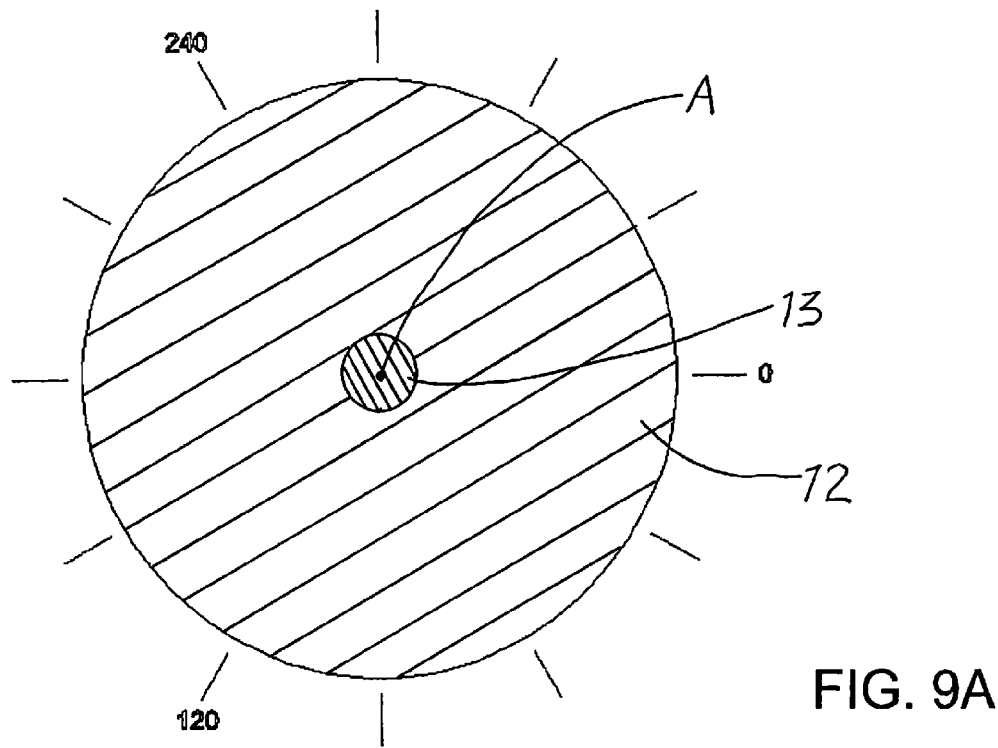
FIGS. 9A to 9V are successive sectional views or "slices" through the rotor of FIG. 8, respectively along successive radial section planes that each extend normal to the rotation axis of the rotor, respectively at successive equal spacings in the axial direction along the rotor from the shaft end to the output end thereof, with a view direction from the starboard side toward the apparatus along the rotor rotation axis.
Figure 9B:
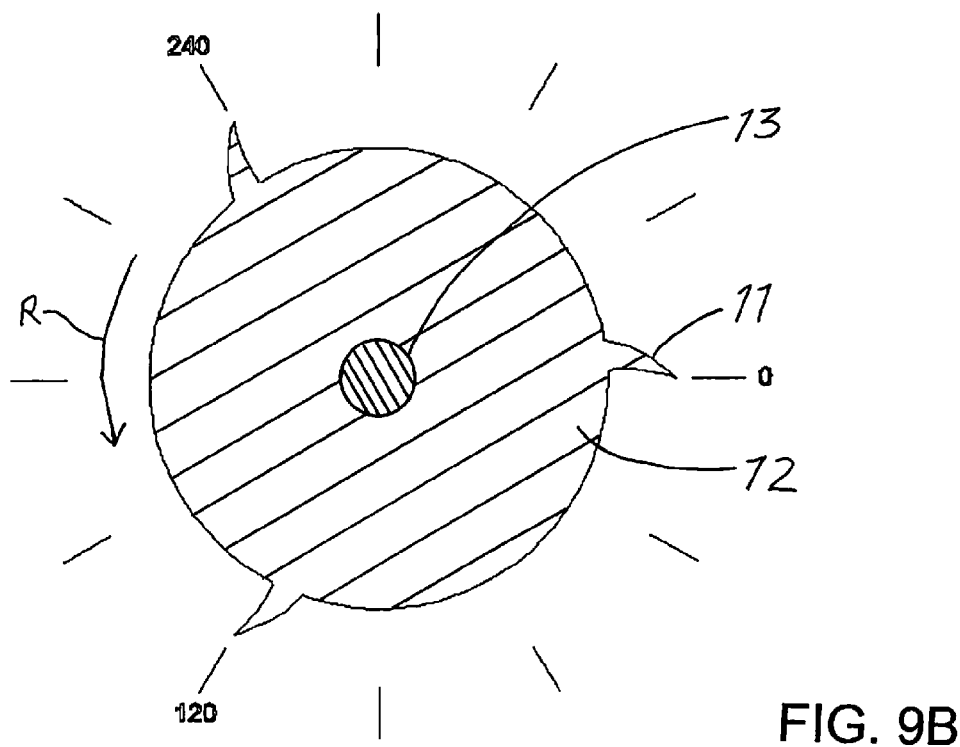
Figure 9C:
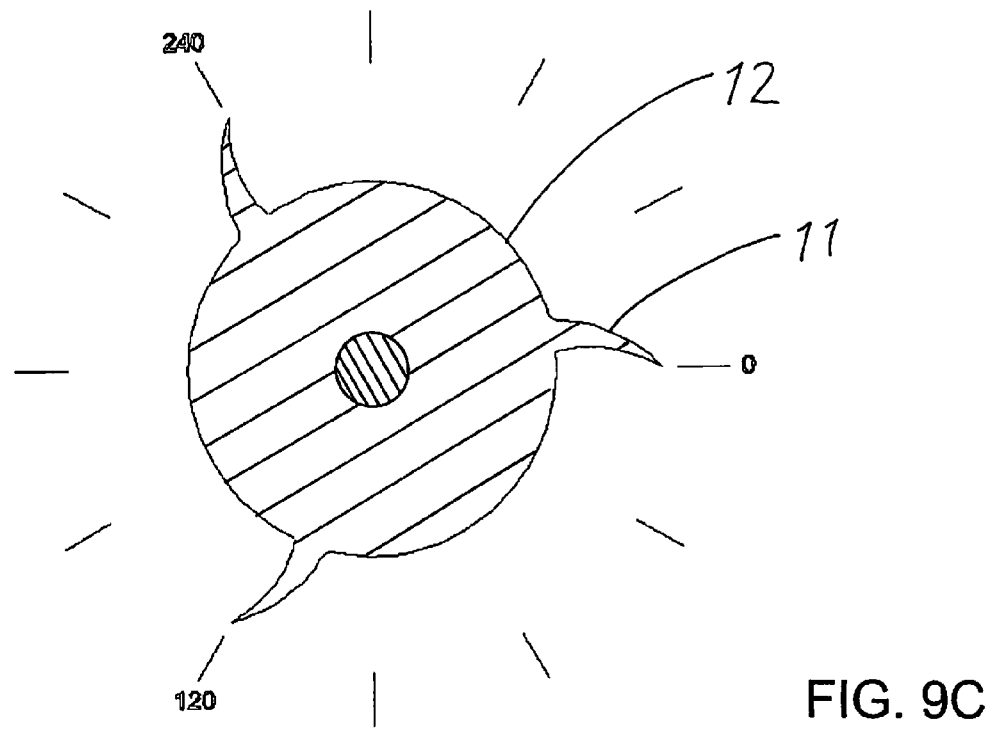
Figure 9D:
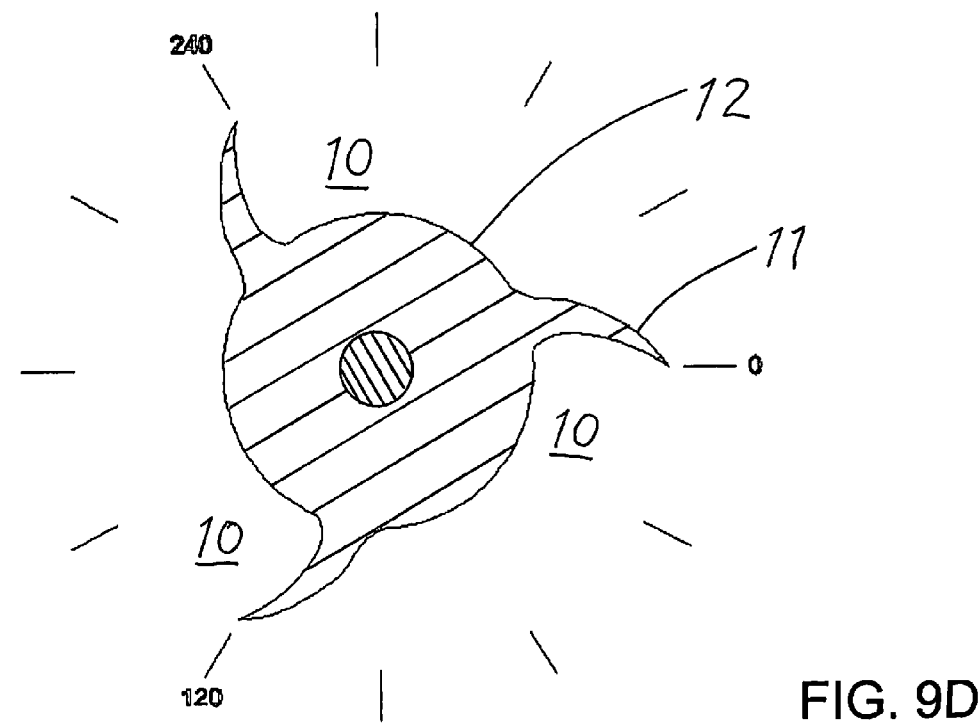
Figure 9E:
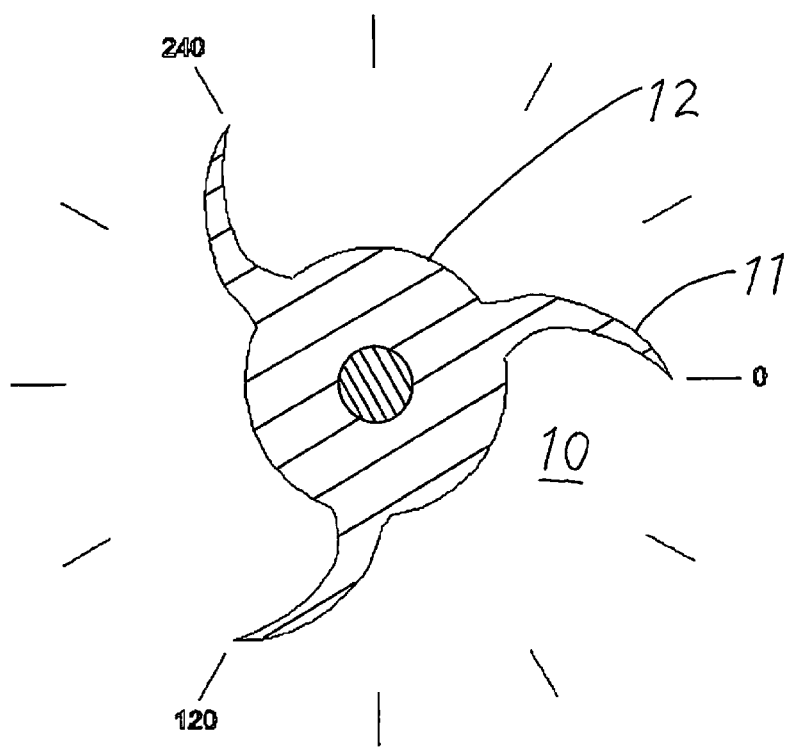
Figure 9F:
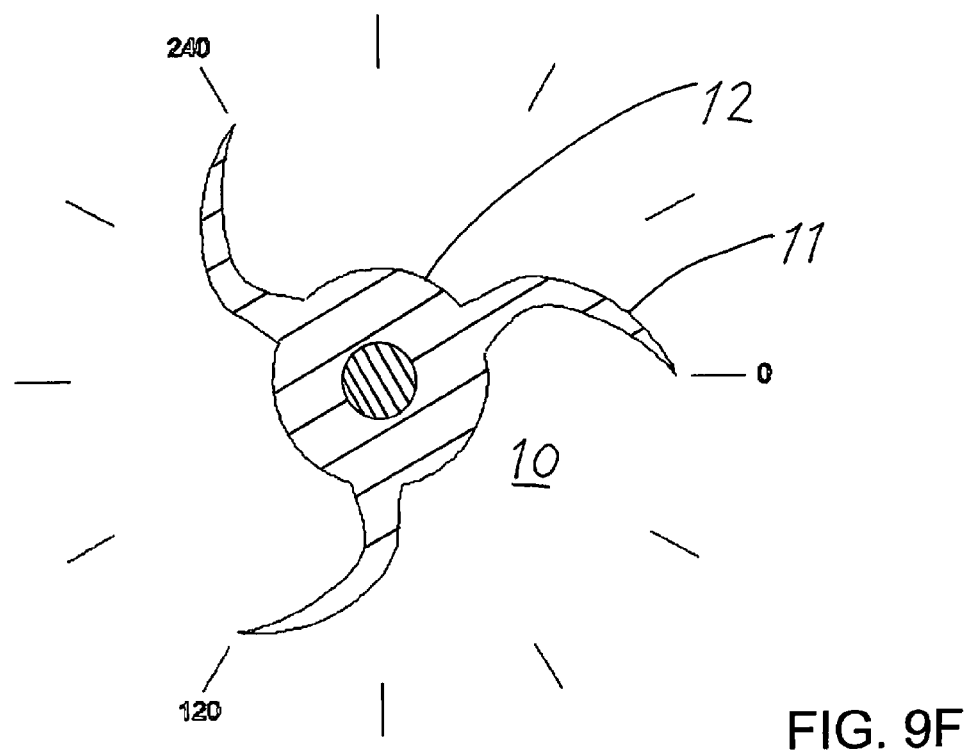
Figure 9G:
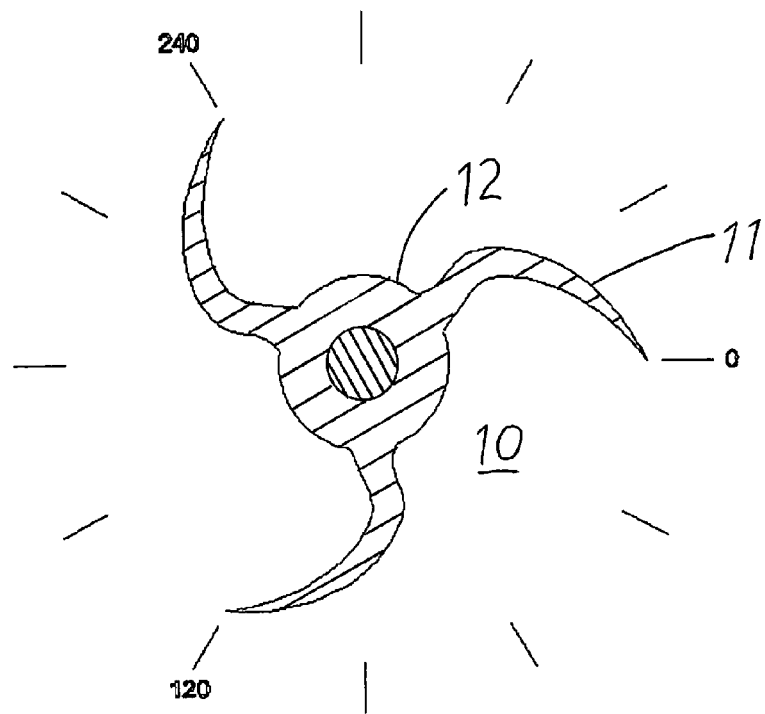
Figure 9H:
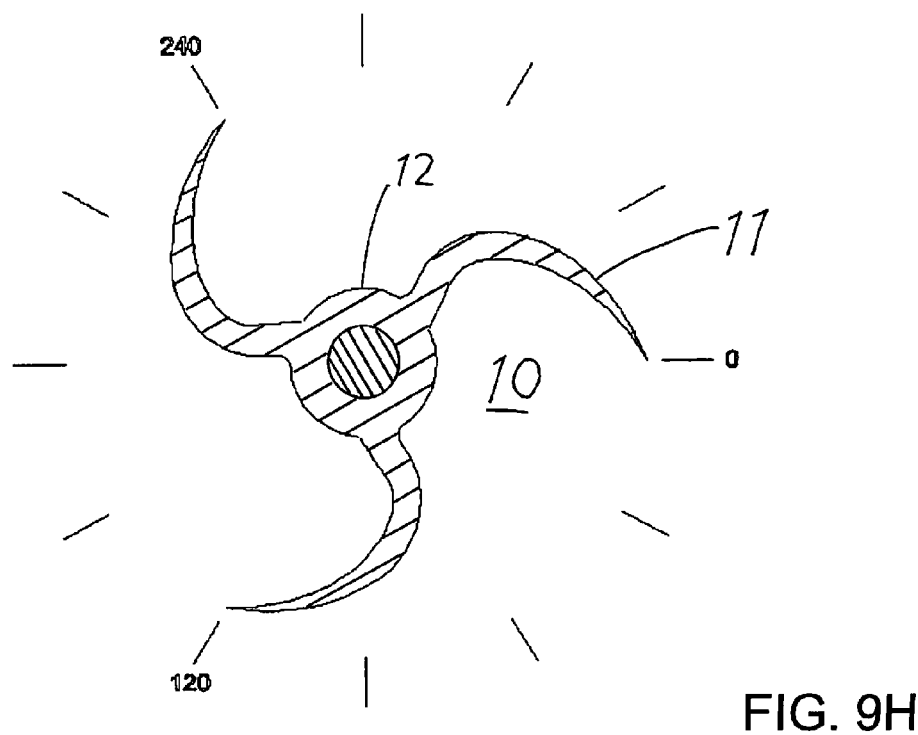
Figure 9I:
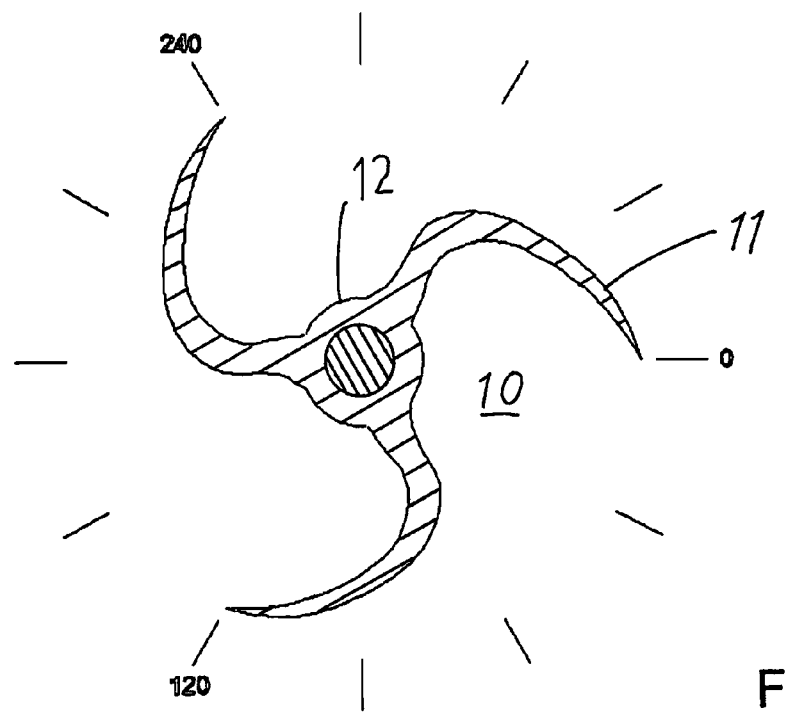
Figure 9J:
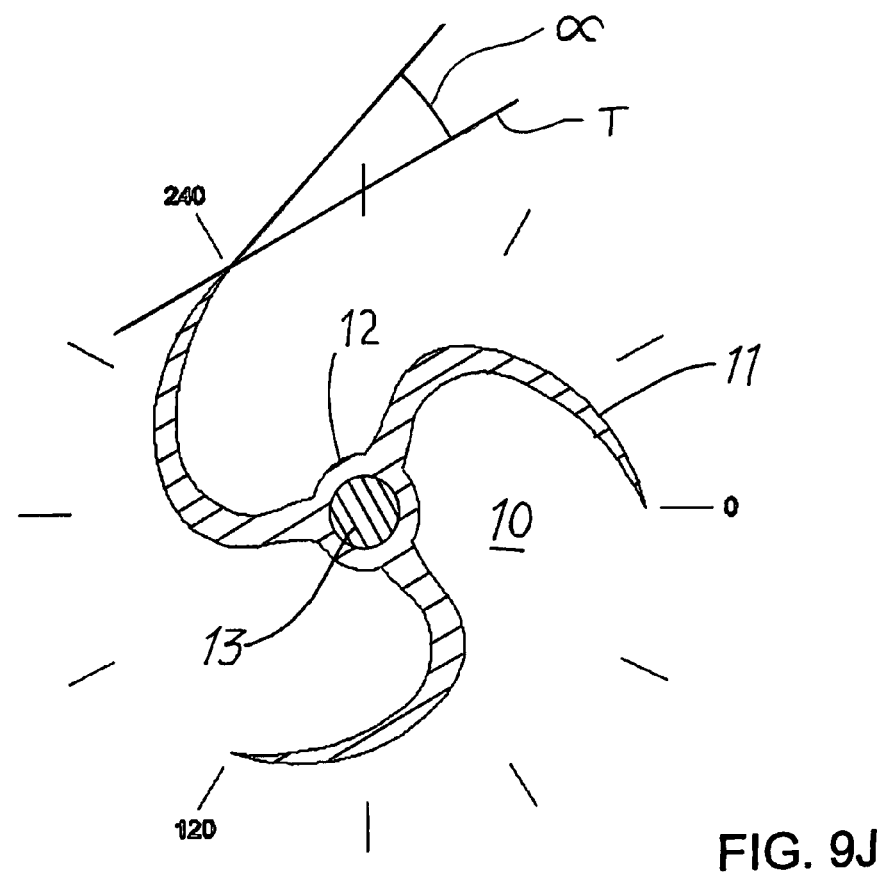
Figure 9K:
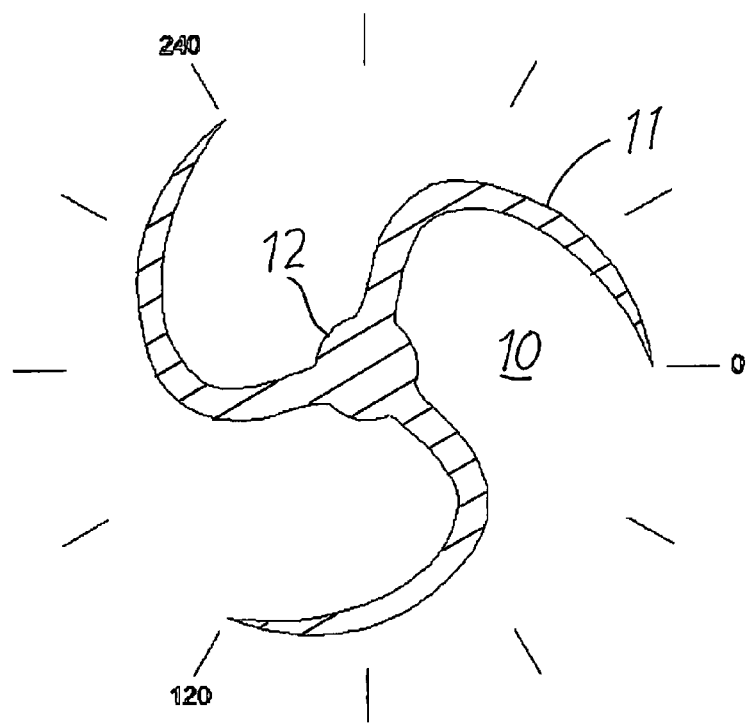
Figure 9L:
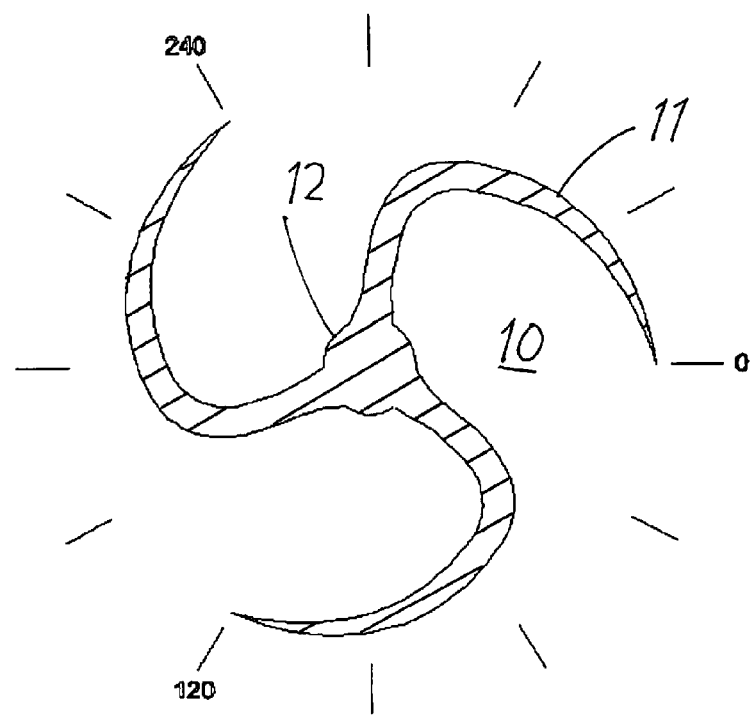
Figure 9M:
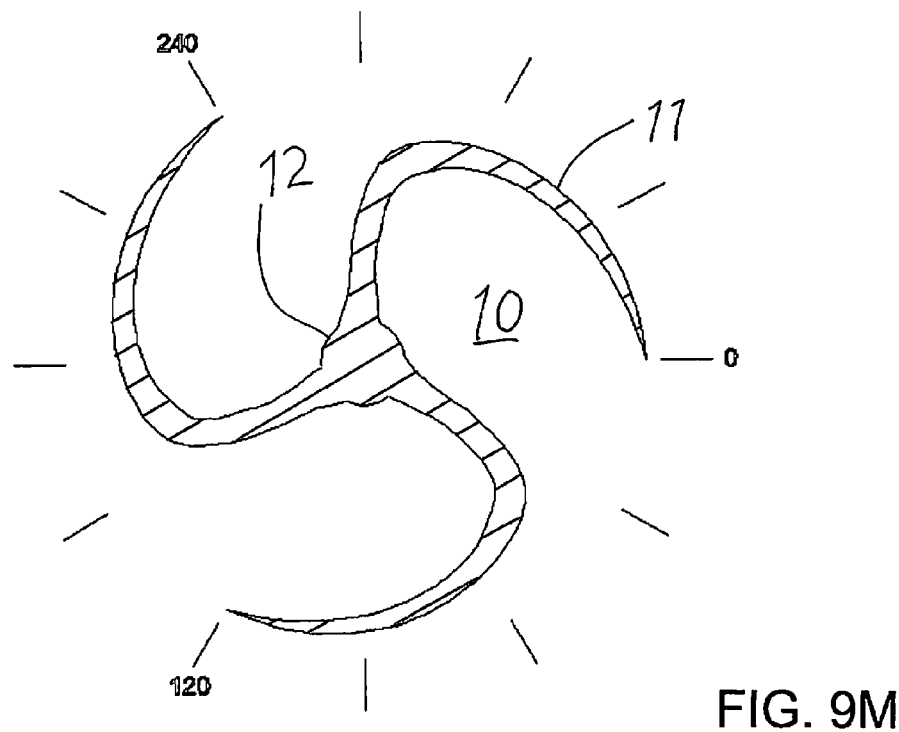
Figure 9N:
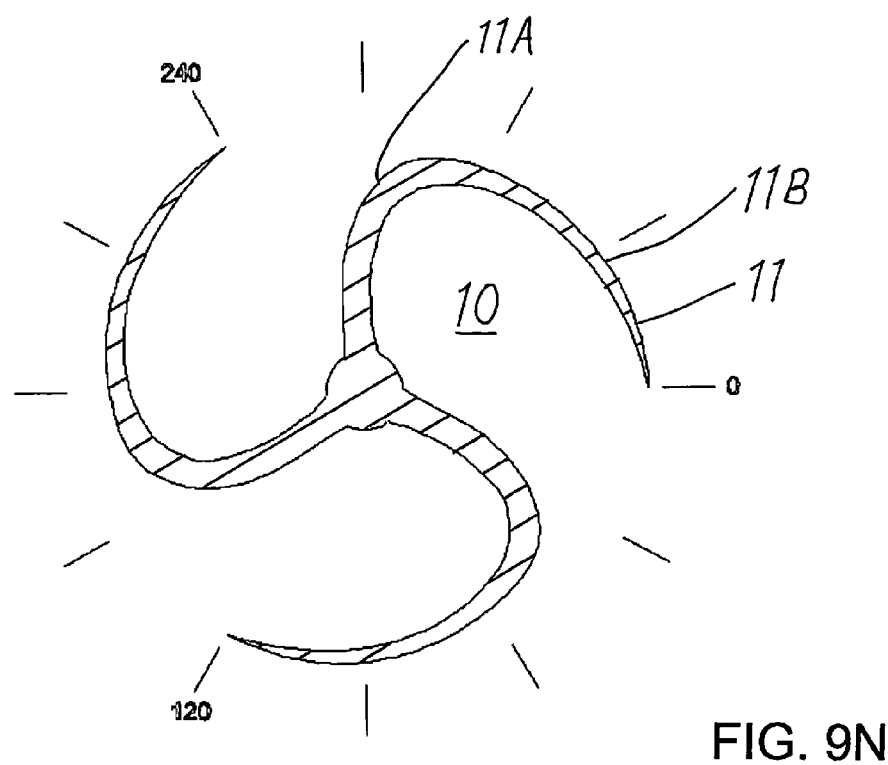
Figure 9O:
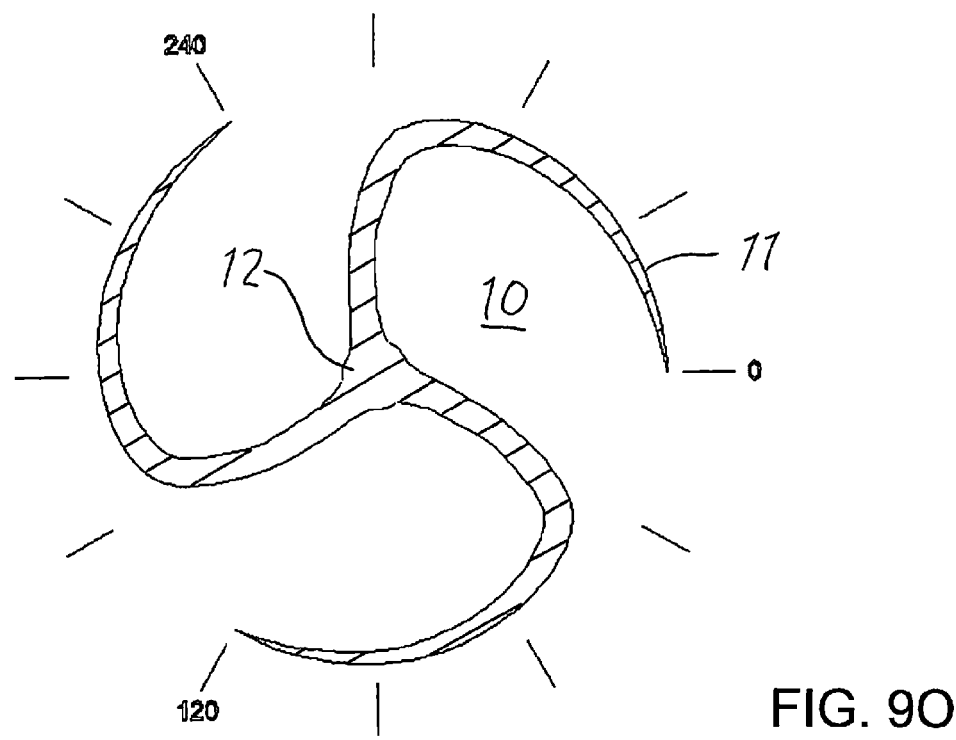
Figure 9P:
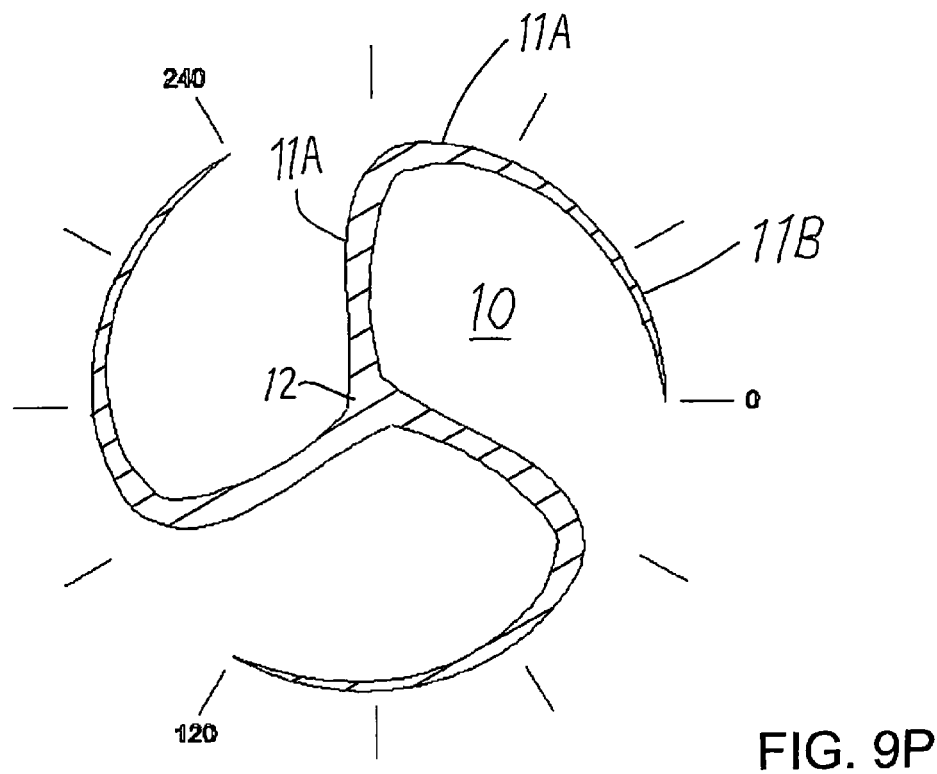
Figure 9Q:
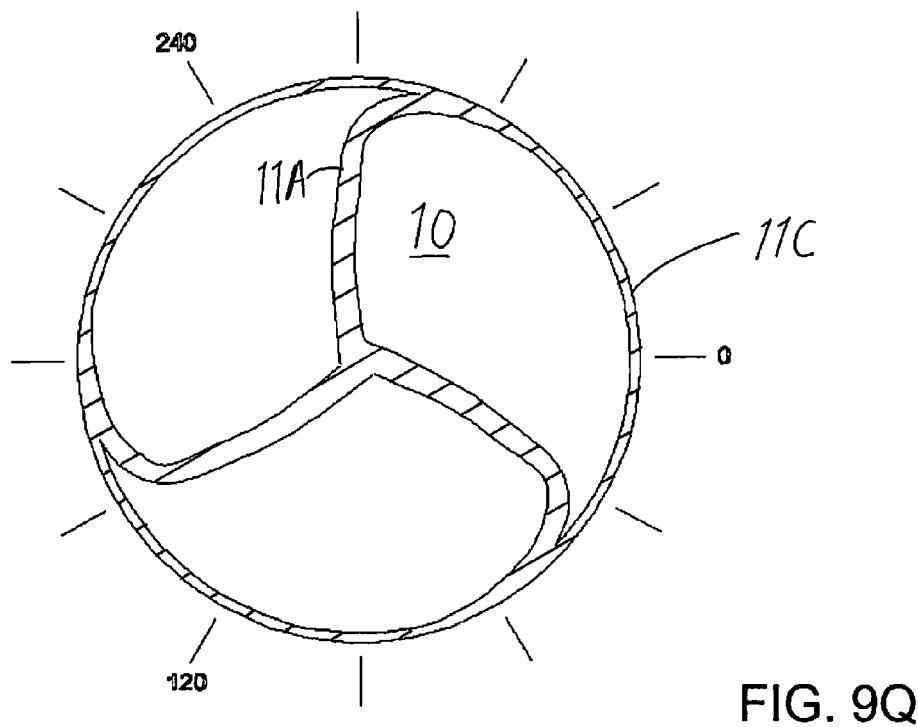
Figure 9R:
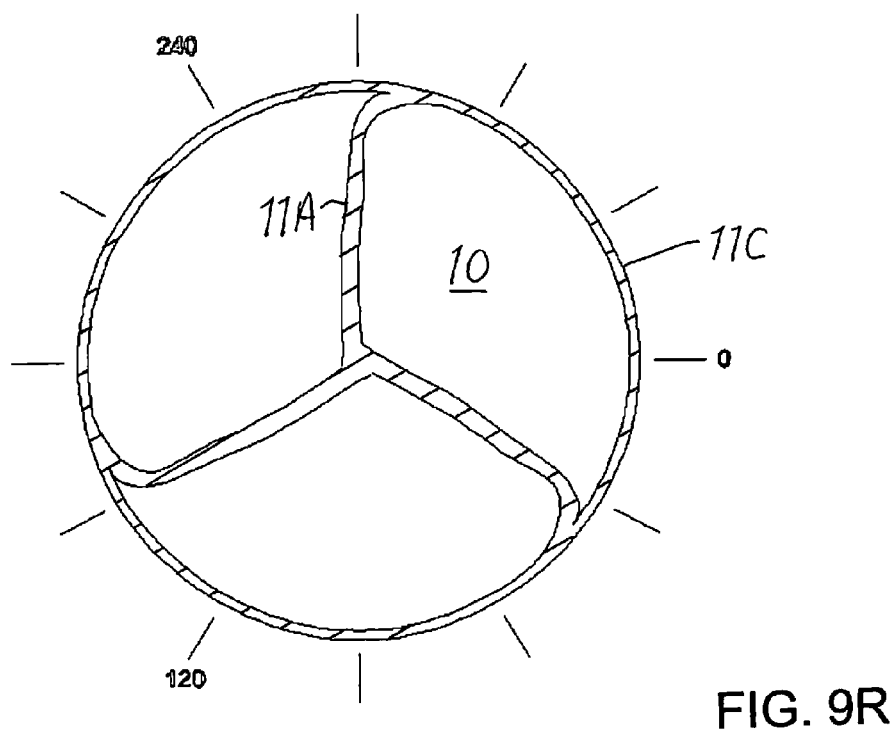
Figure 9S:
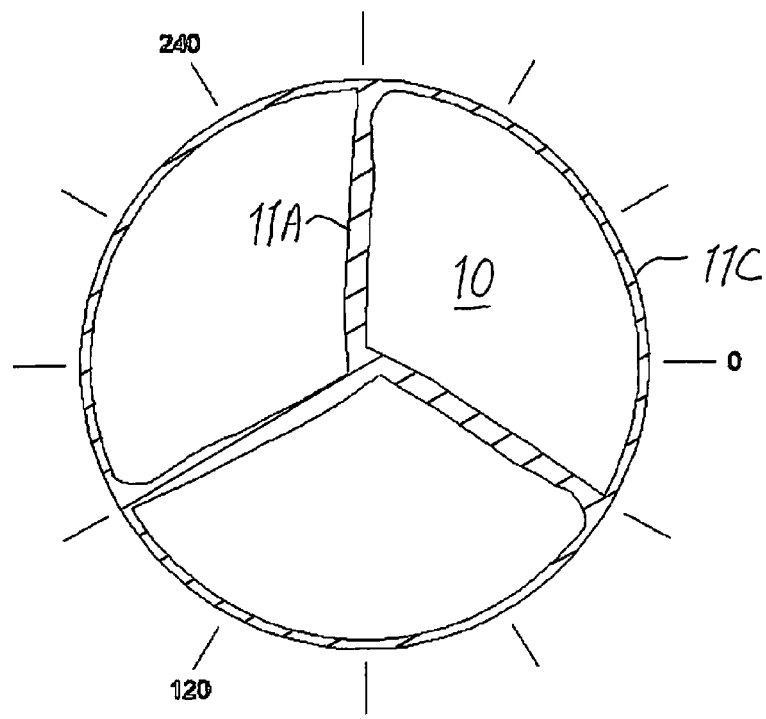
Figure 9T:
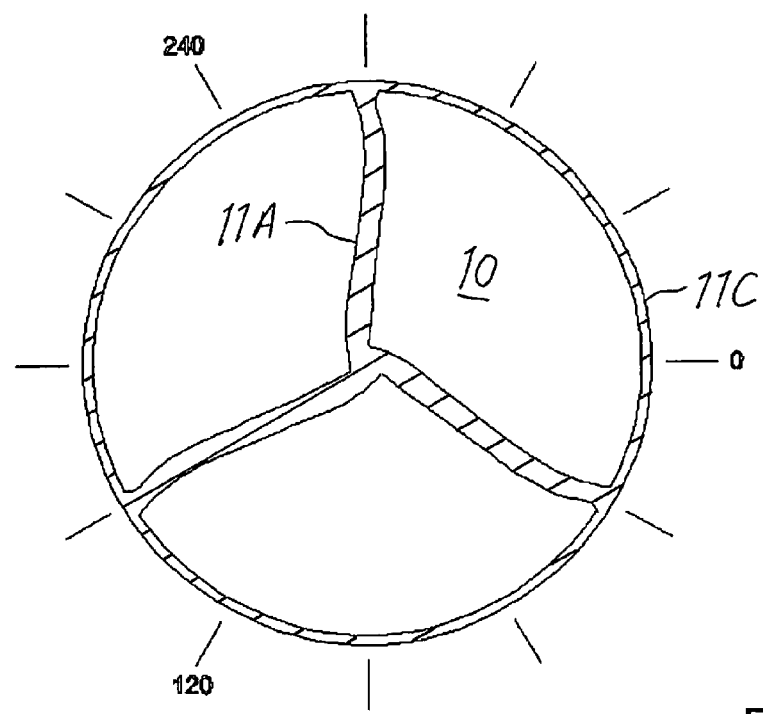
Figure 9U:
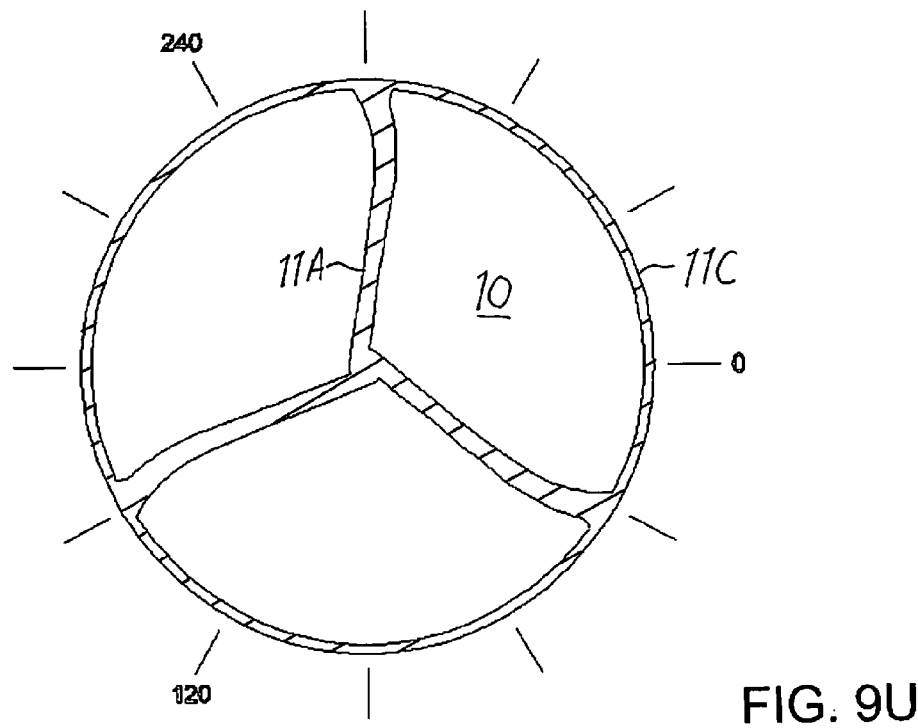
Figure 9V:
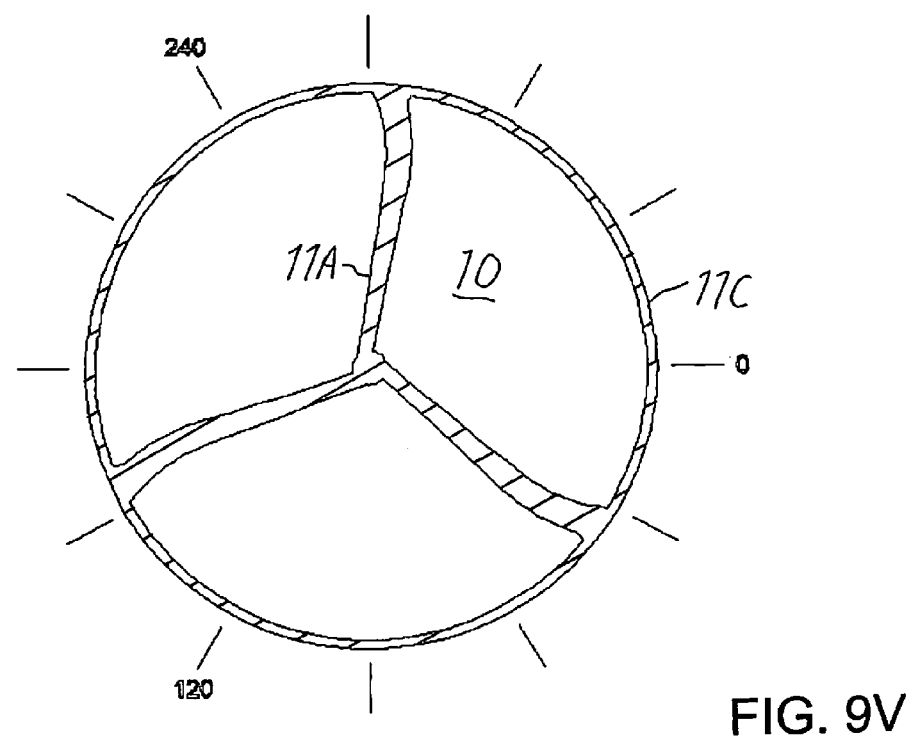

Prototypes of the rotors (in different configurations) have each been fabricated as a stack of plywood disks that have been cut to the appropriate shape at successive stations or cross-sections along the rotor axis A (for example see FIGS. 9A to 9V). The plywood disks were stacked and adhesively bonded to one another, then machined and filled to form smooth rotor channel surfaces, and then covered partly with fiberglass impregnated or saturated with epoxy resin and partly with epoxy resin and thickener without fiberglass reinforcement, to form strong smooth surfaces. Similarly, the spiral volute casing 5 has been constructed with a stack of plywood disks or spirals that were stacked and bonded to one another along the axial direction to form the spiral core, which then was further machined and filled with epoxy resin and thickener without fiberglass reinforcement, to form smooth spiral channel surfaces. The exhaust ducts 14 have been constructed by laying-up and molding fiberglass saturated or impregnated with resin, onto a core mold in the shape of the desired exhaust channel 18. The core mold was fabricated with stacked disks and wedges of wood, which were then machined and filled for surface contouring and smoothing. The side cover plates of the rotor housing 4, the gear case 7, the standpipe 8, and various other structural support plates and members were to constructed of wood and plywood pieces, but could alternatively be fabricated of plastic, fiber reinforced composite, or metal as indicated above. The elliptical exhaust housing 17 was constructed of fiberglass reinforced resin over a wood strip core.

Figure 8:
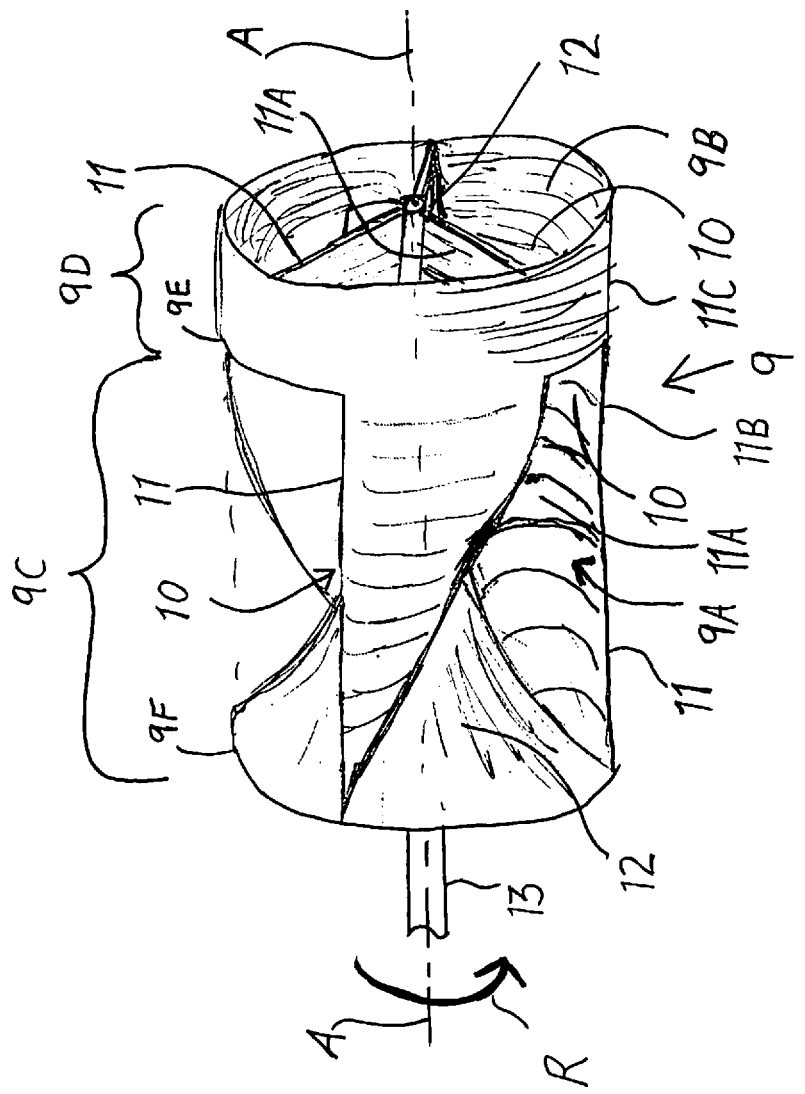
FIG. 8 is a schematic perspective view of the starboard side rotor of the apparatus of FIG. 1.

FIG. 8 is a perspective view of the starboard side rotor 9, with a view direction from the starboard rear quadrant. The rotor 9 has been removed from, or is shown without, the rotor housing 4 in which the rotor is rotatably received and supported. For example, see FIG. 6. The rotor 9 is fixedly mounted on the rotor shaft 13. For example, the rotor 9 has a central axial bore extending along part of its axial length through the rotor core 12, and a cotter pin or the like passes through the rotor core 12 and the shaft 13 to secure the rotor on the shaft. In this regard also see FIGS. 9A to 9J showing the rotor shaft 13 passing through the first ten "slices" of the rotor beginning from the inboard end thereof and progressing toward the outboard or outlet end thereof. The rotor shaft 13 is rotatably supported in bearings at the sidewall 4A of the rotor housing 4 and/or gear case 7, so that the rotor 9 and shaft 13 are freely rotatable about the shaft axis A.

The illustrated embodiment of the rotor 9 includes three rotor vanes 11, but a rotor according to the present invention may have any number of vanes, e.g. from 2 to 30 vanes, but the embodiment with three vanes is presently considered to be the best balance between simplicity and effectiveness, and preferably the number of rotor vanes does not exceed five in order to achieve a simple device. The rotor vanes 11 serve to redirect the water flow from the tangential and radial direction entering the peripheral rotor inlet 9A, to the axial direction exiting the rotor outlet 9B. Also, while redirecting the water flow in this manner, the vanes 11 take up some of the energy of the flowing water and thereby impart rotation to the rotor 9 in the rotation direction R on the shaft 13 about the axis A.

The rotor core 12 and the rotor vanes 11 are specially configured according to the present invention, in order to pass a smooth, non-turbulent and non-cavitating flow of the water through the rotor channels 10 leading from the circumferential peripheral rotor inlet 9A to the axial rotor outlet 9B, while also smoothly turning or redirecting the water from the tangential and radial inflow direction at the rotor inlet 9A to the axial outflow direction at the rotor outlet 9B, and while also causing the rotor to rotate. The shape of the rotor core 12 and the rotor vanes 11 can be seen in three-dimensional perspective in FIG. 8, and as successive cross-sectional "slices" normal to the axis A in FIGS. 9A to 9V. The preferred example embodiment of the rotor 9 has an axial length of 5¼", and FIGS. 9A to 9V represent successive cross-sectional slices perpendicular to the axis A at successive stations one quarter inch apart from one another along the axis A beginning from the inboard or base end of the rotor 9 (the left end in FIG. 8) and progressing toward the outboard or outlet end of the rotor 9 (the right end in FIG. 8). The rotor core 12 and the rotor vanes 11 are shaped to ensure water flow and power uptake according to the following principles. The water flows into the rotor inlet 9A, i.e. into the successive inlet openings of the three rotor channels 10 defined between the successive vanes 11, from the spiral channel 6 defined in the spiral volute casing 5. The diminishing radius of the spiral accelerates and redirects the water into the rotor inlet with a radial inward motion component, in addition to the circumferential or peripheral motion component flowing around the rotor 9. Particularly, the water is directed into the rotor inlet 9A at an inflow angle that for purposes of ascertaining the radial inward component of flow at the peripheral rotor inlet is taken to be the same as that of the diminishing spiral shape where it meets the radius of the peripheral envelope of the rotor. Preferably that angle is 15.0° relative to the tangent to the circumferential periphery of the rotor 9, or 75.0° relative to a stationary (not rotating) radial line. At this point, the water entering the rotor has no axial flow component, but rather only the above described radial and tangential or circumferential components. The surfaces of the rotor core 12 and the rotor vanes 11 are shaped to smoothly and gradually redirect the water into the axial direction, and also to distribute some of the water radially inwardly toward the rotor axis A. While being redirected by the surfaces of the rotor in this manner, the water gives up some of its energy to the rotor surfaces, which causes the rotation R of the rotor 9 on the shaft 13 about the axis A.

FIG. 9J shows an angle α relative to a tangent line T that extends tangent to the periphery of one of the rotor vanes 11 of the rotor 9. As discussed in the preceding paragraph, the angle α can be seen as representing the local inflow angle of the water into the rotor channel 10. Furthermore, because the water flows into the rotor along streamlines, as will be discussed below, the angle α also represents the local entry angle of a waterflow streamline into the rotor channel 10. Still further, because the rotor vane 11 is configured with reference to the streamlines, as will be discussed below, the angle α also represents the local vane angle of the edge of the rotor vane 11 at the rotor inlet. In the illustrated embodiment as shown in FIGS. 9A to 9P, it can be seen that this angle α starts with the highest value near the base end 9F of the rotor 9 (see FIG. 9B for example) and decreases for successive "slices" of the rotor 9 progressing in the axial direction toward the outboard end 9E of the open rotor inlet (see successive FIGS. 9B to 9P). Also see the discussion of FIG. 17 below.

To take up power from a stream of flowing water, it is necessary basically to put an obstruction in the way or path of the water. Thus, the rotor core 12 and the rotor vanes 11 of the rotor 9 must present an obstruction to the water's flow (if the rotor is not turning at speed). Such an obstruction to the water flow is also necessary to redirect the water. On the other hand, the object is to transfer as much as possible of the theoretically available energy from the flowing water to the rotor surfaces, so that it is important to avoid any obstruction to the water flow that is not directly productive for transferring energy from the water to the rotor. The inventive rotor is specially designed to take this into account. Particularly, as will be described in further detail below, the rotor shape is designed so that when the rotor is rotating at its rated design speed that is defined from and directly proportional to the speed of ambient flow, the rotor channels 10 will have an idealized channel shape for redirecting the incoming water flow from the tangential and radial inward direction to the axial outflow direction, without causing undue turbulence, or cavitation, and without presenting an is obstruction to the water flow other than the obstruction that has transferred energy from the water flow to the rotor causing the rotor to rotate at its rated design speed (and obstruction that redirected the water into the axial direction). So, when the rotor turns slower than its rated design speed, or so-called "synchronous speed", then it is obstructing the flow of water, so that the water will push ahead on the rotor vanes and thereby transfer energy from the water to the rotor. Once the rotor reaches its rated synchronous speed, then the flowing water will not "see" any further obstruction and will not transfer additional energy into the rotation of the rotor. In other words, when the rotor is rotating at its rated design speed, the resulting effective shape of the rotor channels relative to the water flow will be optimized to present the minimum obstruction to the flow of water therethrough. Thus, the water experiences the minimum impediment to its flow when the rotor is rotating at its rated design speed. Therefore, the rotor is self-regulating or self-limiting to its rated design synchronous speed, at which speed the water flows smoothly through the rotating rotor channels 10 without undue turbulence, or cavitation, or further power transfer. When the rotor is rotating slower than its rated synchronous speed, then the rotor will present an ever greater obstruction to the flow, and experience an ever greater turning force (torque) from the water, the slower it rotates below the synchronous speed. It will take up power from the water as the product of the water's turning force (torque)

multiplied by the rotor's rotational speed. The synchronous speed represents a "free wheeling" or "free running" speed without any load applied to the rotor, because of the minimum power transfer from the water to the rotor at the synchronous speed. As a load is applied, e.g. power is taken out of the rotor by an electrical generator producing an electric current, the rotor's rotation will slow down until it reaches the speed at which the resulting effective shape of the rotor channels as encountered by the flowing water will present the degree of obstruction and achieve the degree of turning force (torque) from the water as makes the power of the rotor match the power of the load. Power in this context equals torque times rotational velocity, and its value is affected by increasing turbulence and decreasing volume flow as the rotor's rotational velocity drops below synchronous speed. On the other hand, the rotor will never rotate at a speed much higher than the rated synchronous speed, because above the synchronous speed the walls of the rotor vanes would be racing "ahead" of the flowing water following its optimal path through the rotor, and the spiraling inward directed water would no longer "push" ahead on the rotor vane walls to make its axial turn, but would also push back on the following surfaces in equal or greater amount to resist the forward rotation and slow the rotor back to synchronous speed. This theory of the operation of the rotor has been supported by tests conducted by the inventors, but is still regarded as merely an operating theory rather than a proven fact. As such, this operating theory is not a limitation on the invention unless expressly claimed as such.

A further feature of the operating theory of the rotor relates to the modes of energy transfer. A first mode of energy transfer involves water being directed from the outer periphery of the rotor 9 radially inwardly toward the axis A as it flows along the surfaces of the rotor core 12 and the rotor vanes 11. As the water proceeds radially inwardly, it continues to flow or spiral around the axis A as well. Therefore, as its revolution radius becomes smaller, it would tend to revolve or spiral faster around the axis in order to maintain its angular momentum. But the surfaces of the rotor core 12 and rotor vanes 11 are "in the way" as they "hold back" the representative particle of water from traveling faster in the rotational direction, and also redirect the particle of water in the axial direction. Therefore, this particle of water, as it flows radially inwardly, impinges on the obstructing surfaces of the rotor core 12 and/or the rotor vane 11, and thereby imparts energy to the rotor. A second mode of energy transfer involves the redirection of the water from the circumferential or peripheral direction to the axial direction, because similarly this redirecting of a water particle into the axial direction is achieved by the obstruction presented by the surface of the rotor core 12 and/or rotor vane 11, so that the water particle thereby imparts energy to the rotor.

The shape of the rotor core 12 and rotor vanes 11, and thereby the shape of the rotor channels 10, is designed so that a particle of water entering the rotor near the inboard base end thereof will flow radially inwardly along the rotor surfaces to exit close along the axis A from the rotor outlet 9B. On the other hand, a particle of water entering the rotor inlet 9A close to the outboard or outlet end thereof remains near the radially outer periphery for all of its travel, while being strongly redirected into the axial direction, to be discharged from the rotor near the radially outer periphery of the rotor outlet 9B. Thus, the water particle entering the rotor inlet 9A near the outboard end thereof undergoes an energy transfer to the rotor mostly by the above mentioned second mode of energy transfer due to its being redirected into the axial direction, without much or any radial inward flow. On the other hand, the water particle entering the rotor inlet 9A near the inboard base end thereof has a significant amount of energy transferred to the rotor by the abovementioned first mode of energy transfer due to its radial inward flow along the rotor surfaces, and also a significant amount of energy transfer by the second mode due to its being redirected into the axial direction.

Also, the design, i.e. shape and dimensioning, of the rotor channel 10 bounded by the rotor core 12 and the rotor vanes 11 is such that when the rotor is rotating at synchronous speed, each particle of water entering the rotor inlet 9A travels the same distance to reach the rotor outlet 9B, for all entry points into the rotor inlet 9A. Namely, a water particle that enters the rotor inlet 9A near the inboard base end 9F of the rotor 9 travels the same distance to its exit point near the axis A at the rotor outlet 9B, as the travel distance of a water particle that enters the rotor inlet 9A at the outboard end 9E of the first stage 9C close to the peripheral band 11C and exits the rotor outlet 9B at the outer periphery thereof. To achieve this, the latter water particle travels a significant distance in the circumferential direction, essentially zero distance in the radial direction, and a relatively small distance in the axial direction, while the former water particle travels the full length of the rotor in the axial direction, the full radial depth of the rotor in the radial direction, and only a very short distance in the circumferential direction. Water particles entering at any point along the axial extent of the rotor inlet 9A travel a path suitably ranked between the extreme paths described above, to still end up with the same total travel distance through the rotor. Thereby, the sheet of water entering the rotor inlet 9A describes a smooth banked rolling turn through the respective rotor channel, in the manner of a wing of an aircraft making a smooth banked rolling turn. This is necessary for the smooth redirection and channeling of the water while maintaining the same uniform flow speed and conserving mass and volume flow, without introducing avoidable turbulence by superfluous impediment to the path of the water flow.

The structure of the rotor 9 is differentiated into two stages: a first stage 9C that involves both the first and second modes of the energy transfer, and a second stage 9D that involves only (or essentially only) the second mode of energy transfer. Namely, in the first stage 9C, the water is redirected both radially inwardly and in the axial direction, while in the second stage 9D the water is redirected only in the axial direction while maintaining its respective radial position or distance from the axis A. The rotor inlet 9A extends axially over the axial range of the first stage 9C, while the circumferential periphery of the second stage 9D is closed by a continuous peripheral band 11C. This peripheral band 11C ensures that no additional water is flowing into the rotor in the second stage 9D, so that the water already in the rotor channels 10 upon entering the second stage 9D is not pushed farther radially inwardly but rather continues to flow at the same radial distance from the axis A while being deflected into the axial direction. It also contains the channeled water and prevents it from escaping radially outward under centrifugal force. On the other hand, in the first stage 9C, water flows into the peripheral rotor inlet 9A and thus into the rotor channels 10 over the entire axial length of the first stage 9C, so that the accumulated amount of water in the respective rotor channel 10 continuously increases in the axial direction beginning from the inboard base end 9F of the rotor 9 and progressing axially toward the outboard or downstream end 9E of the first stage 9C of the rotor 9. The first stage 9C of the rotor 9 is received within the spiral channel 6, the outboard end 9E of the first stage 9C is located on the plane of the inner surface of the planar side plate 4A of the rotor housing that bounds the outboard side of the spiral channel 6, and the second stage 9D of the rotor extends outwardly through the planar side plate 4A and protrudes axially outwardly beyond the plate 4A in a collar.

In this regard, the rotor core 12 and the rotor vanes 11 are configured and dimensioned to produce an ever-increasing cross-sectional area of each respective rotor channel 10 while progressing in the axial direction from the rotor base end 9F to the first stage outboard or downstream end 9E. Preferably, the cross-sectional area of the rotor channel 10 increases in the axial direction in concert with the increasing volume of water flow as additional water enters the rotor channel all along the axial extent of the first stage 9C. In other words, the rotor core 12 and the rotor vanes 11 are preferably configured and dimensioned so that the cross-sectional area perpendicular to the flow of water increases in the axial direction at the same rate as the increasing volume of water that has entered the respective rotor channel 10 over the axial range thereof in the first stage 9C. Therefore, the rotor is preferably designed so that the water flow speed is preferably maintained essentially constant throughout its entire passage through the rotor channels 10 of the rotor 9 and particularly at the inlet and the outlet thereof, and especially this means that the effective rotor inlet area as to the inward spiraling water flow into the rotor inlet 9A is preferably about equal to (+/−7%) the area of the rotor outlet 9B. This effective rotor inlet area may be calculated as the product of the developed cylindrical peripheral area of the rotor inlet 9A multiplied by the sine of the angle, radial with respect to tangent, at which the water flow is considered to enter into the peripheral envelope of the rotor, i.e. that of the diminishing spiral shape where it meets the radius of the peripheral envelope of the rotor. Thus, with the equal effective areas of the rotor inlet and the rotor outlet, and conservation of mass flow, the water will exhibit a slight drop in static pressure as it maintains its speed and imparts kinetic energy to the rotation of the rotor.

In the present example embodiment operating with an ambient flow rate of 4 knots with a velocity pressure of 0.216 meters of water where the encaptured stream enters the intake duct inlet and a discharge flow rate of 1 knot with a velocity pressure of 0.014 meters of water where the spent stream exits the exhaust duct outlet, encapturing the flow and extracting power from it will have caused a total pressure reduction of 0.202 meters of water, equal to the difference of the two values above. In the same example embodiment, under the same listed conditions, the water at the rotor inlet 9A will have an inward spiraling flow speed of 16.6 knots with a velocity pressure of 3.723 meters of water, and at the rotor outlet 9B an axial speed of 16.5 knots with a velocity pressure of 3.671 meters of water, representing a change in velocity pressure of (−)0.052 meters of water as it flows from rotor inlet to rotor outlet. As the rotor is harvesting power even while approximately maintaining velocity, the static pressure across the rotor will decrease by the sum of whatever part of the velocity pressure in the ambient flow it is that actually provides rotational energy to the rotor plus whatever change in velocity pressure the water exhibits as it passes through the rotor plus whatever is required to make up losses due to turbulence or cavitation. In the present example embodiment the first term of the above sum might be taken as 0.120 meters of water, which is the product of the decrease in velocity pressure overall between intake duct inlet and exhaust duct outlet, 0.202 meters of water, times the Betz limit, (59.3%), that according to theory limits the amount of kinetic energy usefully extractable by the rotor, and the second term as (−)0.052 meters of water, per the previous calculation, so that the drop in static pressure exhibited in the water flow from rotor inlet to rotor outlet might then be taken as 0.068 meters of water, the sum of these first two terms, plus whatever further reduction is called for to make up losses due to turbulence and/or cavitation.

Details of the configuration of the rotor 9 can be understood further in connection with FIGS. 9A to 9V. In FIGS. 9A to 9P it can be seen that the cross-sectional area of the rotor core 12 becomes progressively smaller, progressing axially along the rotor axis A, thereby providing a progressively larger open cross-sectional area for the rotor channels 10, for receiving the progressively increasing volume of water flow as discussed above. At the outboard end 9E of the first stage 9C, the rotor core 12 has diminished to its minimum size, or has tapered to essentially zero, and the three vanes 11 are simply joined to one another along the axis A. Throughout the axial range of the second stage 9D, i.e. in FIGS. 9Q to 9V, there is no additional water flowing into the rotor inlet, because the periphery is closed by the peripheral band 11C, so that the cross-sectional area of the channels 10 no longer increases in the preferred embodiment. The transition from FIG. 9P to 9Q represents the transition from the first stage 9C to the second stage 9D at the outboard end 9E of the first stage 9C. It can be seen that the cross-sectional area of the channels 10 has been maximized and no longer increases from FIG. 9Q to FIG. 9V.

The rotor core 12 has a curved tapering conical shape as can be understood from FIGS. 8 and 9A to 9P, while the vanes 11 each have a progressively deeper bucket shape to capture the increasing volume of flowing water, as can be seen in FIGS. 9A to 9P as well. While the free edge or tip of each vane remains at a consistent circumferential or polar position throughout the entire axial length of the first stage 9C, the radially outwardly extending arm or blade of each vane progresses further rotationally or circumferentially, i.e. an increasing polar angle in the direction of rotation R along the axial length of the first stage 9C, as can also be seen in FIGS. 9A to 9P. This curve of the blades or vanes 11 along the axial direction redirects the radial and tangential flow of the water into the axial direction, while also taking up energy and imparting rotation to the rotor. Particularly, note that the free tip or edge of each vane 11 ends at 0°, 120°, or 240° respectively for the three vanes, in each of the cross-sections of FIGS. 9A to 9P, while the radially extending arm or blade of each vane 11 progresses farther counterclockwise in each progressive cross-section of FIGS. 9A to 9P.

Then, in the final cross-sections of the vanes 11 in the second stage 9D toward the rotor outlet 9B, the radially extending arms or blades of the vanes 11 actually curve back in the opposite rotation direction, i.e. in the clockwise direction progressing from FIG. 9Q to FIG. 9V. This slight return curve toward the outlet edge of each rotor vane 11 at the rotor outlet 9B achieves a final redirection of the water into the axial direction (when the rotor is rotating at its rated design speed), and extracts a final portion of energy from the water deflecting along this portion of the vanes.

As the bucket-shape of the vanes 11 becomes more pronounced, for example in FIGS. 9I to 9P, it can be seen that each vane 11 includes a predominantly radial obstruction portion 11A and a predominantly circumferential obstruction portion 11B. The circumferential obstruction portion 11B is that portion of each vane 11 that has predominately a circumferential surface component presented to the water flow. As the water flows along this surface, this circumferential obstruction portion 11B takes up energy from the water predominately by radially redirecting the water flow, the aforesaid first mode of energy transfer, as it does not substantially redirect the course of the water flow to the axial direction. The radial obstruction portion 11A of each vane 11 is the portion that has predominately a radial extension surface component, and therefore presents an obstruction to the water flowing in the circumferential direction, and also serves to redirect the water into the axial direction. It is the radial "lever arm" of the power uptake portion 11A about the axis A that allows the water to transfer angular momentum to the rotor 9 predominately by axially redirecting the water flow, the aforesaid second mode of energy transfer.

Because of the obstruction presented to the water flow by the radial obstruction portions 11A and the circumferential obstruction portions 11B of the vanes 11, energy is transferred from the water to the rotor 9, which causes the rotor 9 to rotate. As the rotor rotates, this effectively changes the shape of the rotor surfaces encountered by the water flow. Particularly, the effective shape of the rotor, in a stationary frame of reference, becomes progressively twisted further in the rotation direction as one progresses axially along the rotor from the base end 9F to the outlet end at 9B thereof. When the rotor reaches its rated design rotational speed, the target rotational peripheral speed ratio that is defined from and directly proportional to the speed of ambient flow, the effective shape of the rotor as it is encountered by the water flow becomes the ideal shape to channel the water with minimum further obstruction, minimum turbulence, and minimum cavitation from the rotor inlet 9A to the rotor outlet 9B. The water thus flows smoothly and uniformly from the rotor inlet 9A to the rotor outlet 9B, where the water is discharged in the axial direction.

While it is a goal of the present invention to minimize or eliminate turbulence imposed on the water, and to avoid cavitation, it is expected that some turbulence will necessarily still exist in the flow. Thus, the claimed invention is not limited to the total avoidance of turbulence and cavitation but rather embodiments of the invention generally aim to avoid or reduce turbulence and cavitation through controlling parameters of design.

Now that the basic structure and construction of the apparatus has been described above in connection with drawing FIGS. 1 to 8, a special method according to the invention for designing such an apparatus will now be described in connection with FIGS. 10, 11A, 11B, 12, 13A, 13B, 14A and 14B. Basically, the object of the inventive design method is to design the entire water flow channel through the apparatus, from the intake duct inlet 2A to the exhaust duct outlet 14B so as to shape and control the water flow throughout its entire passage through the apparatus, for smoothly accelerating the water, redirecting the water while extracting energy therefrom, and then decelerating and redirecting the water flow so as to regain the ambient static pressure of the water stream in which the apparatus is immersed, for returning the exhausted water flow back into the ambient water stream at the same static pressure. While doing this, the acceleration, redirection and deceleration of the water is to be achieved smoothly while avoiding as much as possible turbulence or cavitation. In the context of the inventive design method, however, not all turbulence can be avoided. For example there is unavoidable turbulence (reverse curl) in the spiral housing, and wherever water makes a channel turn. There is unavoidable turbulence in a power-loaded rotor that rotates below synchronous speed. There is unavoidable turbulence in the exhaust channel that facilitates water flow into the turn at the elbow. There is unavoidable turbulence due to friction at the internal surfaces of the channels.

As described above, the total water channel basically includes the intake channel 3, the spiral channel 6, the rotor channels 10, and the exhaust channel 18, with a mirror symmetrical second set of these channels on the opposite (e.g. port) side of the apparatus. Each one of these channel portions is designed based on a set of principles according to the invention. Namely, the method is to design an apparatus for harvesting energy from a stream of flowing fluid by encapturing a portion of the fluid stream flow, shaping, directing and accelerating the captured flow, extracting some of its kinetic energy into a rotating shaft, and finally decelerating and returning the captured flow back into the ambient stream flow, all without introducing superfluous obstructions, bottle necks, or other sources of perturbation or cavitation in the captured fluid flow. This results in an overall tuned system that achieves a nearly constant coefficient of harvested power over varying ambient stream velocity conditions, but does not use any adjusting mechanisms such as control gates to limit the fluid flow, or accelerate it or otherwise adjust and direct the internal fluid flow. The basic design principles involve the conservation of mass flow throughout the system, and accordingly the conservation of volume flow for an incompressible fluid such as water. The acceleration and deceleration are achieved smoothly in consideration of the basic principle that the cross-sectional area of the flow channel normal to the flow direction at any point is inversely proportional to the speed of the flow passing through that cross-sectional area, for a given constant volume flow. The flow is kept smooth and uniform while being smoothly accelerated, redirected and decelerated without unnecessary perturbation, according to the principle of streamlines of constant length representing flow paths of constant mass or volume units of water flowing through the system.

Figure 10:
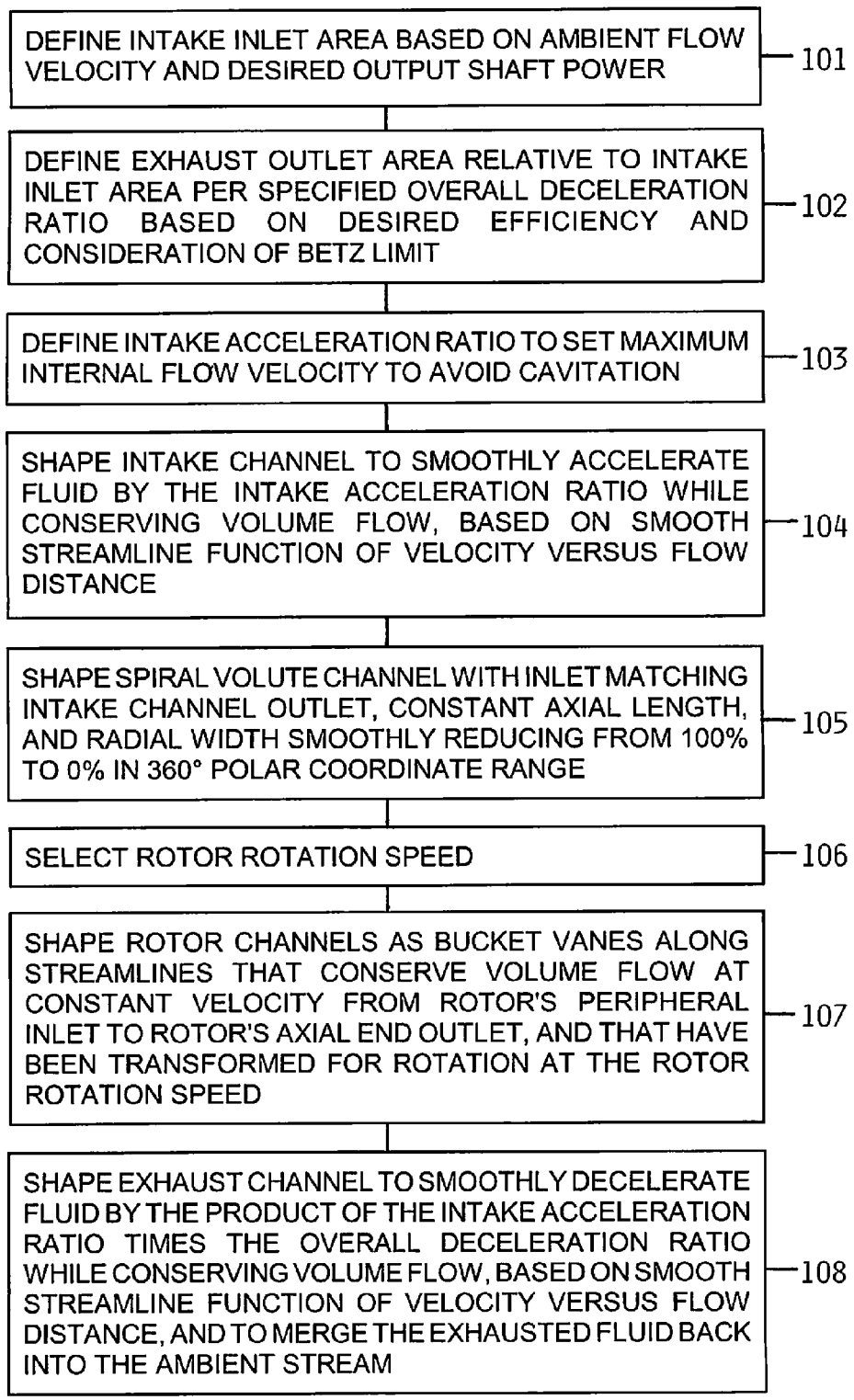
FIG. 10 is a schematic process flow diagram of steps involved in a method of designing the inventive turbine apparatus.

Particular steps of an example embodiment of an inventive design method are represented in FIG. 10. The steps 101, 102, 103, 104, 105, 106, 107, 108 do not have to be carried out successively one after another in the sequence as indicated. It will be clear that some steps logically need to precede other steps, but several of the steps can be carried out in a sequence different from the one shown. A basic first step 101 involves defining the intake inlet area of the intake duct inlet or inlets 2A, based on the expected target ambient flow velocity of the incident water stream W, and the desired output power of the rotor shaft 13. The output power target is set by the requirements of any particular application, and this determines the required intake inlet area based on the known or expected flow velocity of the ambient water stream taking into consideration the power available varying with the cube of the speed of a varying ambient water stream. The intake inlet area multiplied by the ambient flow velocity determines the volume flow and mass flow of water entering the water channel or channels. This volume or mass flow rate of water also determines the amount of power available in the water processed through the system in a given unit time. If this is multiplied by the known or determined efficiency of the turbine rotor at extracting the available power, this determines the output power of the rotating rotor shaft.

Once the intake inlet area for a given application has been defined in step 101, then the exhaust outlet area is determined in a step 102, as a multiple of, or relative to, the intake inlet area. Particularly, the ratio of the exhaust outlet area relative to the intake inlet area defines or is determined according to the targeted overall deceleration ratio. It is expected that this ratio should preferably be about 3:1, i.e. the intake inlet area should be about one third of the exhaust outlet area, in consideration of the Betz limit. The Betz limit is a theoretical limit on the maximum attainable power that can be extracted by an axial flow turbine arranged instream in a fluid flow. While the Betz limit was originally determined for axial flow wind turbines, it is also considered and expected to be applicable to the present turbine rotor design for use with water or any other fluid. Also, the original Betz limit determination did not allow for intake and exhaust ducts to accelerate the fluid so as to increase the power density available to the turbine rotor, but in the present invention, the ducts are designed purposely to work in accordance with the flow of fluid through the turbine rotor with Betz limit behavior. Particularly, the Betz limit indicates that a turbine can extract at most 59.3% of the available energy from a flow of fluid that passes through the plane of the rotor, and this maximum is achieved when the effective inlet area for the fluid feeding into the rotor is about one third of the effective outlet area of the fluid exhausted downstream from the rotor. In any event, even without consideration of the Betz limit, the exhaust outlet area is defined relative to the intake inlet area with regard to the desired or specified overall deceleration ratio. This is linked to the achievable efficiency or power harvesting ratio, because the fluid must be decelerated in order to extract some of its initial kinetic energy, while still discharging the water with the same ambient static pressure as the ambient fluid stream in which the apparatus is immersed.

After the intake inlet area has been specified in step 101, step 103 involves defining or specifying the desired intake acceleration ratio to establish the (e.g. maximum) internal flow velocity at the intake duct outlet 2B. This internal flow velocity must be limited to avoid cavitation. Cavitation will occur whenever the velocity pressure exceeds the total pressure available, which for a flowing liquid is equal to its ambient static pressure plus its ambient velocity pressure, less its vapor pressure, which for water, under typical conditions of expected use is less than 0.05 atmosphere. Because the ambient static pressure is influenced by the water depth at which the apparatus is deployed in the water stream, the maximum internal flow velocity is limited depending on the instream deployment depth. Namely, at greater depths, greater maximum internal flow velocities can be accommodated without causing cavitation. By accelerating the water flow before it reaches the rotor, the kinetic energy and the power density of the water per cross-sectional area is increased, which allows a smaller turbine rotor to be used, which is another benefit of the invention. Basically, the intake acceleration ratio is given by the ratio of the area of the intake duct inlet 2A relative to the area of the intake duct outlet 2B, because the flow speed of the constant mass and volume flow of water flowing through the intake duct will be increased in proportion to the ratio of the decrease of the cross-sectional area of the duct.

Figure 11A:
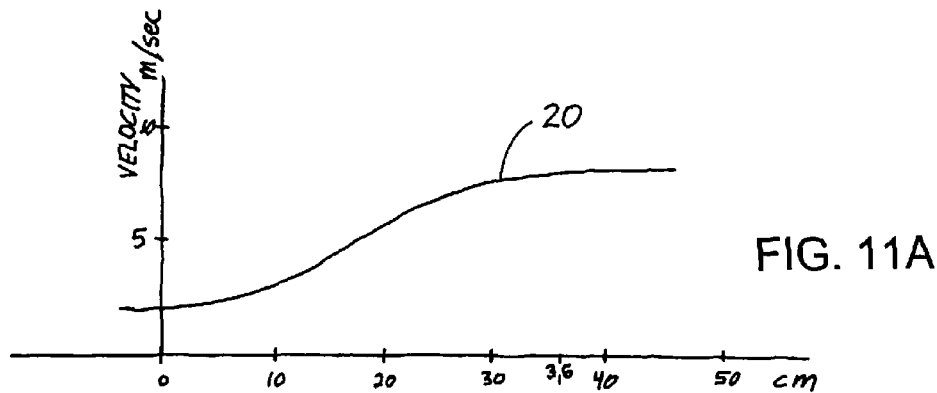
FIG. 11A is a graph showing an idealized curve or function of the velocity of water flow into and through the intake duct of the apparatus of FIG. 1, relative to the longitudinal distance traveled.
Figure 11B:
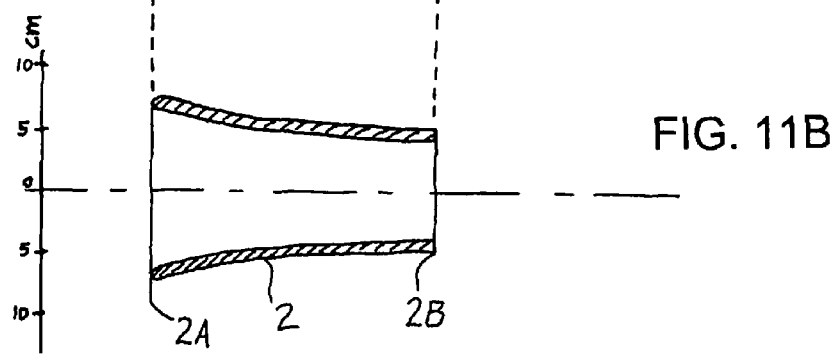
FIG. 11B is a schematic sectional view of the configuration of the intake duct so as to produce the velocity function shown in FIG. 11A for the water flowing into and through the intake duct.

Once the inlet and outlet areas of the intake duct are specified, the shape of the intake duct is determined with a rectangular cross-section that maintains the same proportions of length (parallel to the rotor axis A) and width (in the height direction in FIG. 6) throughout its longitudinal extent and diminishes smoothly according to the desired acceleration curve 20, for example as shown in FIGS. 11A and 11B. FIG. 11A shows a curve 20 or function of the flow velocity of water entering, flowing through and exiting the intake duct 2. The horizontal axis of FIG. 11A represents the longitudinal travel distance along the intake duct 2 given in centimeters, while the vertical axis of FIG. 11A represents the example desired flow velocity in meters per second. In the illustrated example embodiment, the ambient stream flow has a velocity of 4 knots or about 2.1 meters per second. For an intake acceleration ratio of 4:1, the velocity of water flowing out of the intake duct 2 shall be about 16 knots or about 8.2 meters per second. A maximum acceleration is selected, which determines the maximum slope or pitch of the velocity curve, and then a smooth curved transition of the velocity is established from the inlet velocity to the outlet velocity, with the maximum slope or acceleration occurring near the longitudinal center of the curve 20. In the example embodiment of the apparatus that has been constructed as a prototype, the intake duct 2 has been truncated to extend longitudinally only between the 10 cm and 36 cm positions along the velocity curve of FIG. 11A. The further increase of velocity beyond the 36 cm position is so minimal, that it can essentially be ignored in the structural design of the intake duct. On the inlet end, it is expected that the intake duct inlet 2A will draw or "suck" in a larger cross-sectional area of the water in front of it to feed enough water into the system to satisfy the flow through the decelerating exhaust duct. In any event, the initial acceleration of the water from the 0 cm reference line to the 10 cm position is minimal and can be ignored for the structural design of the intake duct 2, in order to make the intake duct more compact and sturdy.

Using the inlet area and outlet area determined in steps 101 and 103, and the desire to use a square cross-section, and in view of the principle that the cross-sectional area varies inversely with the velocity, it is a simple matter to design the smooth, curved tapering configuration of the intake duct 2 as shown in FIG. 11B, according to the specified velocity curve as shown in FIG. 11A. This design of the intake duct that bounds and defines the intake channel represents step 104 in FIG. 10. The inner bounding walls of the intake channel follow along streamlines that represent the smooth accelerating flow through the intake duct. Additional ranks of streamlines can be defined extending from the inlet 2A to the outlet 2B, with a consistent, fair, or smoothly converging ranked spacing distance between adjacent streamlines. Thus, the shape of the intake duct derives from the smooth or fair plot of velocity versus the longitudinal position along the duct, with application of the physical principle of conservation of volume flow for an incompressible fluid to define its cross-sectional areas. In view of the rather simple streamline pattern, it is not necessary to actually carry out streamline modeling for the design of the intake duct.

Once the outlet shape and size of the intake duct outlet 2B have been determined, it is then necessary to determine the shape and size of the spiral volute casing 5 bounding the spiral channel 6 therein, as represented in step 105 in FIG. 10. The inlet of the spiral channel matches the outlet of the intake duct as to size and shape. Thus the inlet of the spiral channel has a rectangular cross-section with the radial dimension as its width and axial dimension as its length. The spiral channel is then preferably designed to maintain a constant axial length while the radial width thereof smoothly and continuously diminishes from 100% of its initial size to essentially 0% around one spiral turn of 360° polar angle about the spiral axis or rotor axis A. This radial width refers to the clear open width of the spiral channel 6 in the radial direction, radially outwardly from the rotor 9, as can be seen in FIG. 6. At the smallest or tightest part of the spiral volute casing 5, there is a small clearance gap remaining relative to the rotor 9, to ensure that the rotor 9 can turn freely, without colliding or binding with the inner wall of the spiral volute casing. The side walls 4A bounding the spiral channel are preferably flat, planar, parallel to one another, and normal to the axis A.

This converging spiral shape of the spiral channel 6 redirects the water flow from the intake channel 3 into a circumferential flow direction around the rotor 9, while also progressively accelerating and directing a portion of the water radially inwardly into the peripheral rotor inlet 9A as discussed above. Based on this single-turn spiral shape, the water is directed into the rotor inlet 9A at an inflow angle that for purposes of ascertaining the radial inward component of flow at the peripheral rotor inlet is taken to be the same as that of the diminishing spiral shape where it meets the radius of the peripheral envelope of the rotor. Preferably that angle is 15.0° relative to the tangent to the circumferential periphery of the rotor 9, or 75.0° relative to a radial line, in the stationary coordinate system of the spiral housing, or 28.2° relative to the tangent to the circumferential periphery of the rotor 9, or 61.8° relative to a radial line, in the rotating coordinate system of the rotating rotor at its designed, synchronous speed, so that the water entering the rotor inlet 9A has a circumferential flow component in the counterclockwise direction in FIG. 6, and a radially inward directed flow component.

As a further preferred choice in the design, the effective area of the rotor inlet 9A perpendicular to the water flow into the rotor, i.e. as to the inward spiraling flow of water into the rotor inlet, is preferably the same as the area of the rotor outlet, or e.g. within +/−10%, or better within +/−7%, and those areas are preferably selected equal, within the same limits of variation, to the inlet area of the spiral channel, which is equal to the outlet area of the intake duct. Thereby the spiral channel 6 and the rotor channels 10 of the rotor 9 are not designed to contribute substantially to the acceleration or deceleration of the water, which instead is intended to be achieved in the intake duct and the exhaust duct respectively. However, the redirection of flow in the spiral housing is expected to further accelerate the water to some degree. For example, in the present embodiment of the inventive apparatus, the 4 knot ambient stream velocity is accelerated through the intake duct 2 to a speed of 16 knots, and then to about 16.6 knots on average as it flows through the spiral channel 6 and into the rotor channels 10 via the peripheral rotor inlet 9A. This is the resultant of the vector sum of the internal circumferential flow speed of 16 knots plus the radial inward component of flow imparted by the constraining spiral wall, of about 4.3 knots.

This is significant for the next step 106 of the design method shown in FIG. 10. Namely, the rotor rotation speed is selected based on the internal, circumferential flow speed of 16 knots, so that the peripheral circumferential speed or tip speed of the rotor 9 preferably corresponds to 50% of the circumferential flow component of the water flowing into the rotor inlet 9A from the spiral channel 6. The rotor shape will be designed with reference to this specific design rotation speed of the rotor, so that the rotor rotation speed in actual practice will also be self regulating or self limiting to the design speed. As the design speed is a fraction of internal, circumferential flow speed rather than an absolute value, this means that a rotor shape that is effective under this consideration will work with substantially similar efficiency over a range of internal, circumferential flow speeds.

Figure 13A:
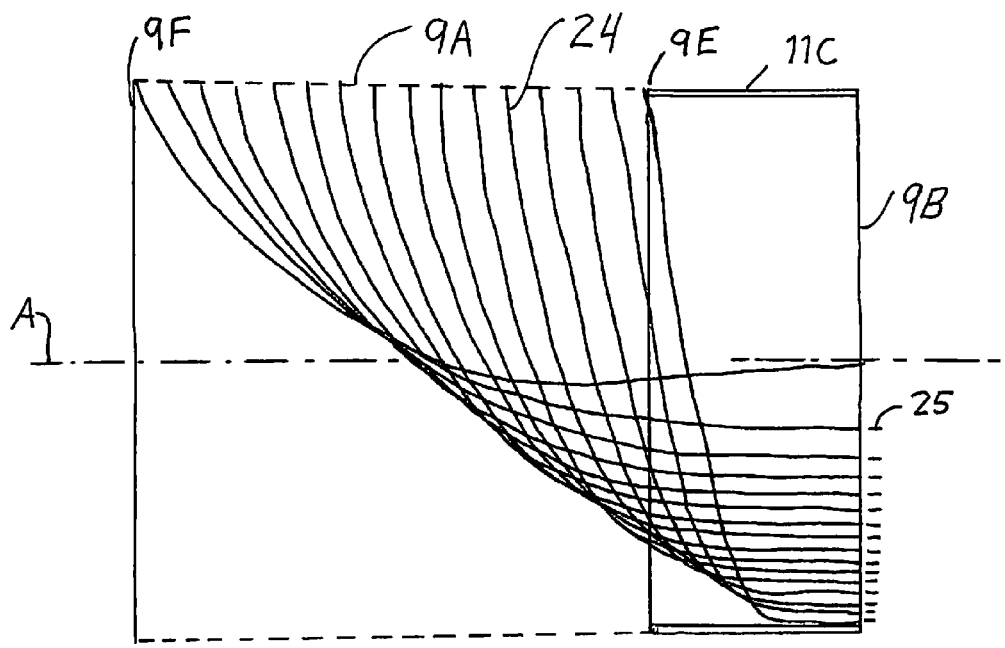
FIG. 13A is a schematic top plan view of idealized streamlines characterizing smooth water flow from the peripheral inlet to the axial end outlet of the rotor, through the stationary space that is enclosed by the bounding surfaces of a rotating rotor.

This is carried out in step 107 of the method represented in FIG. 10, whereby the rotor channels are shaped as bucket vanes according to particular flow rules or principles, with transformation for rotation at the particular determined target rotational peripheral speed ratio of the rotor. Basically, as discussed above, the rotor core 12 and the rotor vanes 11 are shaped to redirect the water from the circumferential direction and the radial direction (and possibly also the axial direction as can be seen in FIG. 13A) in the spiral channel 6, into the axial direction while extracting energy from the water as the water flows through the rotor channels. In order to maintain preferably the same overall average flow rate through the rotor inlet and outlet, the cross-sectional area of the rotor outlet 9B is made equal to the effective area of the circumferential developed area of the rotor inlet 9A perpendicular to the flow, i.e. with respect to the inward spiraling flow at which the water flow is directed into the peripheral envelope of the rotor by the spiral housing.

Figure 14A:
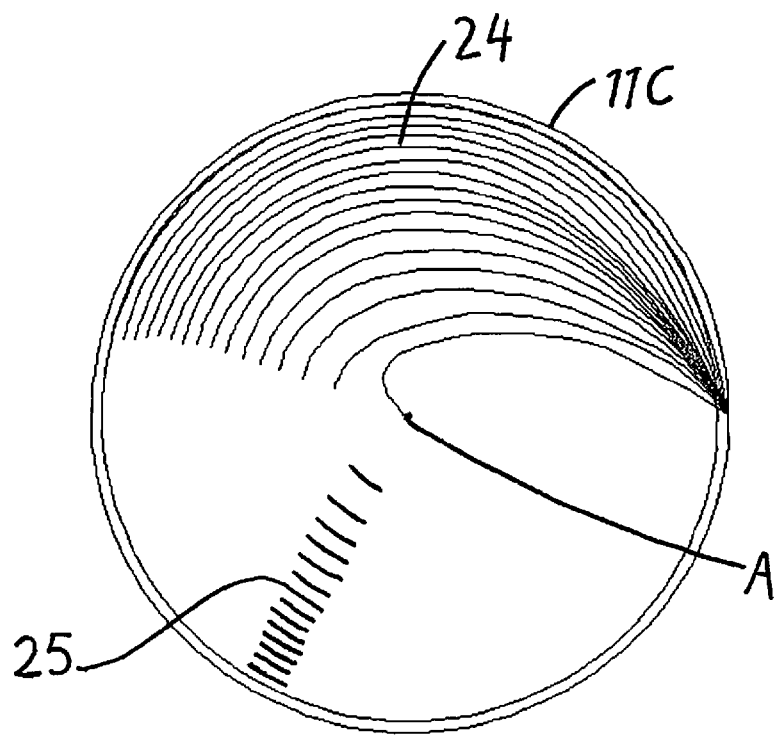
FIG. 14A is a schematic axially directed end view, looking at the outlet end of the rotor, of the "stationary" rotor streamlines of FIG. 13A.

The shapes of the bounding surfaces of the rotor 9 bounding the rotor channels are determined to follow along water flow streamlines. The rotor core 12 is shaped to taper in a smoothly curved manner along the axial direction as discussed above. The bucket vanes are shaped along streamlines that all have the same length (for a stationary reference) and that conserve the uniform volume flow at approximately constant velocity throughout the rotor channel. In this regard, a representative set or rank of streamlines for a stationary reference frame, e.g. a stationary rotor, is shown in FIGS. 13A and 14A. Each streamline 24 represents the flow path of a given unit volume or particle of water from the rotor inlet 9A to the rotor outlet 9B (for a theoretical stationary rotor). The streamlines 24 make a smooth banked rolling turn through the respective rotor channel from the inlet to the outlet thereof. The streamlines 24 all extend with smoothly changing, ranked fair spacing from the inlet 9A to the outlet 9B, where the streamlines exit the rotor respectively in annular rings 25 of equal cross-sectional area. Note that the annular rings 25 have successively smaller radial widths as the radial position thereof increases, in order to have equal cross-sectional areas. A single streamline is associated with and allocated to each respective annular ring 25, because each streamline represents the same volume flow of water, which needs the same cross-sectional area at the rotor outlet 9B to ensure a uniform flow velocity across the entire area of the rotor outlet. Thus, while the axial spacings between neighboring streamlines 24 are equal for all of the streamlines at the rotor inlet 9A, the radial spacings between adjacent streamlines at the rotor outlet 9B are varied according to the successively diminishing radial width of the successive adjacent annular rings 25 of equal cross-sectional area.

All of the streamlines, in flowing or extending from the rotor inlet 9A to the rotor outlet 9B, preferably have the same length in the stationary reference (FIGS. 13A and 14A), and each one of the streamlines preferably never penetrates radially inwardly farther than its point of exit from the rotor outlet 9B. The first streamline 24 farthest to the left at the top of FIG. 13A, i.e. closest to the base end 9F of the rotor, travels substantially radially inwardly and axially toward the rotor outlet 9B, to exit from the outlet 9B close along the axis A, with a relatively small circumferential travel distance. On the other extreme, the last streamline 24, farthest to the right at the top of FIG. 13, i.e. directly adjacent to the peripheral band 11C at the outboard end 9E of the first stage of the rotor, travels mostly circumferentially around the rotor, without penetrating any significant radial distance inwardly into the rotor channel, and then turns sharply axially to exit from the rotor outlet 9B at the radially outer edge of the rotor channel 10 along the inner wall of the peripheral band 11C.

As can be seen in FIG. 13A, the streamlines 24 entering the rotor inlet 9A from the spiral channel 6 may have an axial flow component in addition to a radial flow component, as well as a tangential circumferential flow component as shown in FIG. 14A. The streamlines of FIGS. 13A and 14A thus represent a flow pattern of water entering the peripheral rotor inlet 9A somewhat axially, but predominantly tangentially and radially inwardly from the spiral channel 6, and being redirected in the manner of a twisting, curling strip of paper, or a rolling turn of several aircraft maintaining side by side formation, to exit the rotor outlet 9B in the axial direction. In a true idealized flow pattern resulting from the illustrated embodiment of the spiral channel 6, there would be no axial flow component but rather only a radial and tangential flow as explained elsewhere herein. The idealized flow pattern takes the sharpest banking turn that can be applied to a set of equal length streamlines while maintaining a smooth flowing turn, preferably with an average intake angle right at the rotor inlet periphery that matches the direction of the inward spiraling flow as it is directed into the rotor by the spiral housing. If the rotor vanes 11 are shaped to follow exactly along the streamlines 24 as shown in FIGS. 13A and 14A, then the rotor will present no significant obstruction, in the circumferential or rotational direction about the axis A, to the water flow as it transitions from the radial and circumferential direction to the axial direction. Accordingly, such a rotor would not rotate, even while smoothly allowing the full design mass flow of water through the rotor channels. This has been confirmed by experiments conducted by the inventor. Namely, rotors having this design were built and tested, and found to present very little obstruction to the water flow, so that the rotors did not rotate significantly despite a high volume flow of water flowing through the rotors.

Figure 13B:
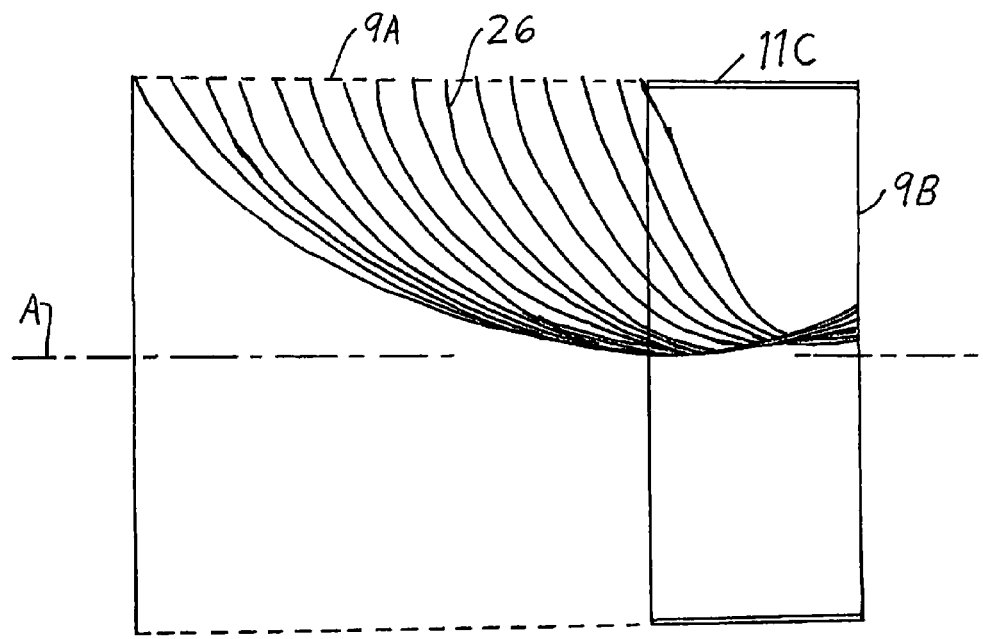
FIG. 13B is a schematic top plan view of idealized streamlines similar to FIG. 13A, but the shape of the streamlines has been transformed to define rotor channel surfaces that provide passageway for the desired water flow path through stationary space when the rotor is rotating at its designed rotational peripheral speed, which is determined as a ratio relative to the velocity of inflowing water.
Figure 14B:
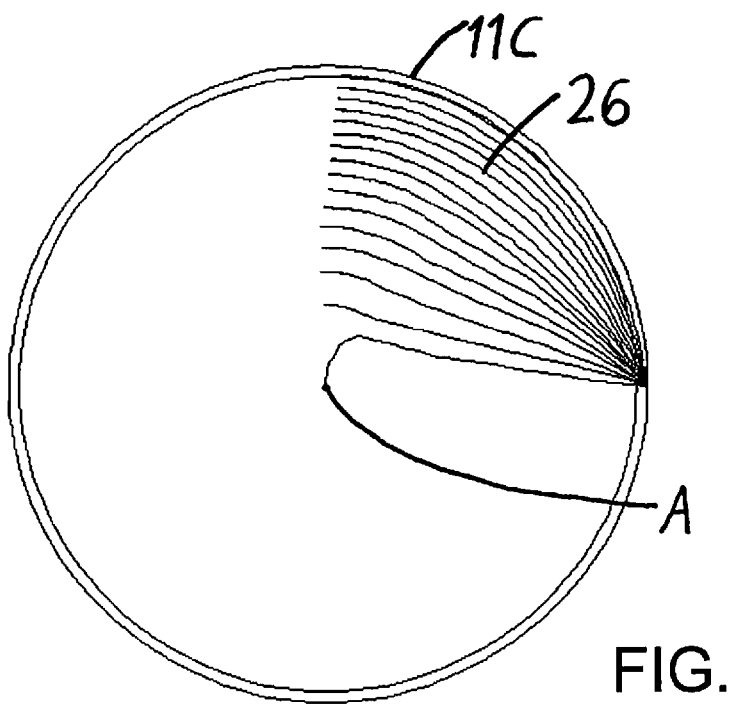
FIG. 14B is a schematic axially directed end view, looking at the outlet end of the rotor, of the "rotationally transformed" streamlines of FIG. 13B.
Figure 15:
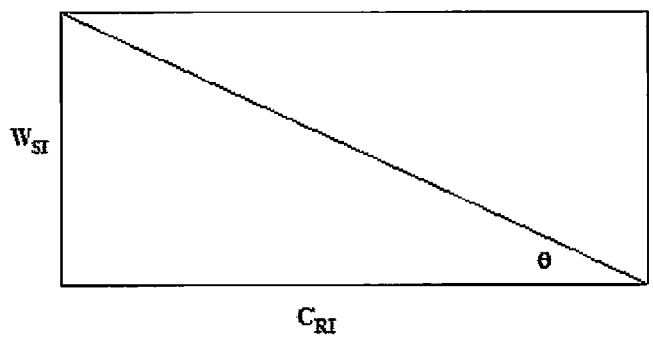
FIG. 15 is a diagram for explaining the derivation of the spiral angle at the peripheral rotor inlet.

For the above reason, the next feature of step 107 of the inventive design method shown in FIG. 10 is to transform the streamlines 24 from a stationary frame of reference (FIGS. 13A and 14A) into a rotating frame of reference (FIGS. 13B and 14B) corresponding to the rotation of the rotor at the design rotation speed. In effect, when the rotor is rotating at its design rotation speed, then the water shall impact the shape of the rotor corresponding to the streamlines of FIGS. 13A and 14A to achieve a smooth, essentially unobstructed flow. Because the rotating rotor advances in its rotation direction as any particle of water flows through it from the rotor inlet 9A to the rotor outlet 9B, therefore the effective shape of the rotating rotor relative to the water flowing through it will be twisted helically in the rotation direction from its inboard base end 9F to its outlet end 9B, relative to its actual physical stationary shape. Thus, the physical design of the rotor shape must take this into account, i.e. counteract this, to achieve the desired effective shape at the design rotation speed. This is achieved, in effect, by "twisting" the streamlines 24 of FIGS. 13A and 14A about the axis A in a spiral or helical manner in a direction opposite the rotation of the rotor, by a helical twist amount corresponding to the design rotation speed of the rotor. For example, this involves calculating how much farther (e.g. in degrees of rotation) the rotor will have rotated at the design rotation speed, respectively at each axial distance along the rotor axis A, as the water flows along the rotor channels in its streamline paths. The streamlines 24 are then adjusted or transformed in this manner in the opposite rotation direction, i.e. opposite the intended rotation direction of the rotor, to result in the transformed streamlines 26 as shown in FIGS. 13B and 14B.

The rotor core 12 and vanes 11 are then designed to have a shape following along these transformed streamlines 26. As a result the rotor channels 10 will present an obstruction to the water flow if the rotor is stationary. However, if the rotor spins at the design rotation speed, then the active or effective shape of the rotor channel as it impacts the water flowing through it will correspond to the streamlines 24 as shown in FIGS. 13A and 14A. Thus, by transforming the idealized streamlines 24 for rotation to produce the transformed streamlines 26 according to FIGS. 13B and 14B, and designing the shape of the rotor according to the transformed streamlines 26, this ensures that the flow of the water through the rotor channels will experience the least obstruction and will have the idealized flow configuration according to the ideal streamlines 24 of FIGS. 13A and 14A when the rotor rotates at its design rotational speed. This represents the no-load free-wheeling rotation of the rotor synchronously with the optimal flow of the water through the rotor. Basically, as a theoretical concept underlying this design of the rotor, if one gives the constrained stream of water an opportunity to maximize its flow by making the rotor spin at a particular designed target rotational peripheral speed ratio of the peripheral speed of the rotating rotor relative to the incoming water flow velocity, then that's what the stream will do.

Upon startup of the apparatus with an initially stationary rotor, the transfer of energy from the flowing water to the stationary rotor will drive the rotor into rotation at a speed that approaches, and is self-regulating or self-limiting to, the design rotational speed. If the rotor rotates more slowly than the design rotational speed, then the degree of obstruction that impacts the flowing water will increase, and therefore the rotor will be driven faster, i.e. up to the design rotational speed. On the other hand, if the rotor rotates faster than the design rotational speed, then the flow pattern experienced by the water will actually be impacted by the rotor running ahead of the ideal flow pattern, so that the rotational driving force applied to the rotor will be reversed and thereby slow down the rotation of the rotor. Thus, with the inventive design according to the transformed streamlines 26 shown in FIGS. 13B and 14B, the rotor is specifically designed to rotate at the design or target rotational peripheral speed ratio, for which the transformation from FIGS. 13A and 14A to FIGS. 13B and 14B has been carried out. If that transformation is carried out based on a design or target rotational peripheral speed ratio that is determined as a fraction between 30% and 400%, preferably 50%, of the circumferential or tangential component of the water flow entering the rotor from the spiral channel as discussed above, then it is expected that the rotor will tend to seek the rotational speed that is the targeted fraction of circumferential water flow speed, subject to any draw of power that tends to slow it down. As incident water flow speed varies up and down, the actual rotational speed of the rotor will vary proportionately while always seeking to maintain the target rotational peripheral speed ratio relative to the speed of the incoming water.

As long as the above principles of the rotor design are followed, then the specific dimensions of the length, diameter, etc. can be selected in view of other requirements. For example, the diameter of the rotor will affect the resultant circumferential tip speed, but an increasing diameter also makes available an increasing peripheral inlet area as well as the axial outlet area so as to process more water. On the other hand, making the rotor axially longer allows an increase of the inlet area, but does not increase the available outlet area. Therefore, the inlet area might need to be reduced by providing an axially longer peripheral band, for example, which also helps ensure complete axial redirection of the water flow. Furthermore, the rotor outlet radius can be varied relative to the rotor inlet radius, for example in that the rotor outlet does not have to occupy the entire available area of the outboard end of the rotor. By making the rotor outlet area smaller or larger, the rotor channels may be designed to contribute to the acceleration or the deceleration of the water through the apparatus.

Several different embodiments or configurations of rotors have been constructed. The preferred rotor embodiment as shown in FIG. 8 preferably has a cylindrical rotational envelope, and preferably with an axial length of 0.134 meters, a diameter of 0.103 meters, an outlet area of 0.00785 meters squared, and a developed cylindrical peripheral inlet area of 0.0301 meters squared. An effective rotor inlet area may be calculated as the product of the developed cylindrical peripheral area multiplied by the sine of the angle, radial with respect to tangent, at which the water flow is considered to enter into the peripheral envelope of the rotor, i.e. that of the diminishing spiral shape where it meets the radius of the peripheral envelope of the rotor, which angle in the present preferred embodiment is 15.0°. The effective rotor inlet area therefore may be calculated as 0.0301 meters squared multiplied by 0.2588, the sine of 15.0°, to equal 0.00779 meters squared. This rotor preferably is designed to rotate freely at 764 rpm, for an ambient water stream flow speed of 4 knots, which is specified to increase fourfold to 16 knots through the intake channel 3 and then to about 16.6 knots through the spiral channel 6 and into the rotor channels 10. The water then exits the axial outlet end of the rotor at a flow speed which is specified to be about 16.5 knots and flows into the exhaust channel 18 defined within the exhaust duct 14. The exhaust channel 18 is specified to decelerate the water by an exhaust deceleration ratio which is the product of the internal acceleration ratio times the overall deceleration ratio. For example, if the internal acceleration ratio is 4:1 and the desired overall deceleration ratio is 3:1, then the exhaust deceleration ratio must be 12:1. In the example embodiment as illustrated and specified in detail above, the overall deceleration ratio is 3.79:1, and the exhaust deceleration ratio is 16.5:1, so as to decelerate the water flow from 16.5 knots down to 1 knot.

Figure 12:
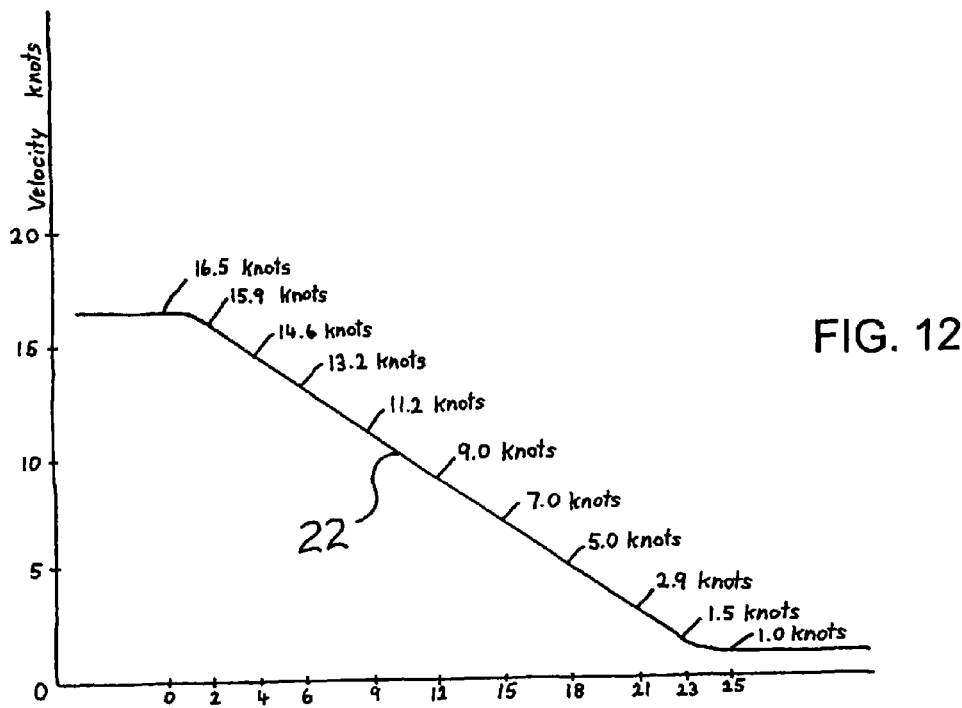
FIG. 12 is a graph of the idealized velocity curve or function of the water flowing into and through the exhaust duct of the apparatus of FIG. 1.

The exhaust channel 18 defined by the exhaust duct 14 is shaped to smoothly decelerate the water in accordance with this exhaust deceleration ratio in the step 108 of the design method illustrated in FIG. 10. Furthermore, FIG. 12 is a graph of the flow velocity 22 of the water in knots (along the vertical axis of the graph) as the water flows along the exhaust channel 18, as shown in inches along the horizontal axis of the graph. This graph shows that the water enters the exhaust channel at a speed of about 16.5 knots and then decelerates along the velocity curve 22, smoothly until it reaches its final discharge velocity of 1 knot at the exhaust duct outlet 14B and is reintroduced into the ambient stream of water flowing around the apparatus at 4 knots. That will produce some turbulence or eddying as the discharged exhaust water is reintroduced into the ambient flow downstream of the apparatus, and this may provide additional "suction" driving the flow through the water channels of the apparatus, but any such effects have not been explored in detail.

The decelerating velocity curve 22 shown in FIG. 12 has a more-linear reduction of the speed than the accelerating velocity curve 20 of the intake duct shown in FIG. 11A, with merely small "rounded" transitions to and from the linear deceleration rate near the ends of the curve 22. Thus, the exhaust duct is specified to maintain a substantially constant deceleration (negative slope of the velocity curve 22) throughout most of the longitudinal travel of the water through the exhaust duct. Such a more-linear slope of the velocity curve could also be used for the acceleration of the water in the intake duct, but it is considered that a smoother acceleration of the water can be achieved through the relatively short length of the intake duct by following a gentle curved velocity function as shown in FIG. 11A. For such a velocity curve, the acceleration increases in the manner of a rounded or curved hump up to a maximum at about the midpoint of the travel through the intake duct, and then again decreases toward the outlet end of the duct. On the other hand, the linear velocity curve shown in FIG. 12 for the exhaust duct transitions quickly to the specified deceleration rate and maintains that rate throughout almost all of the duct, with only short transition ranges at the inlet and outlet ends of the exhaust duct.

When the desired velocity curve has been specified for the exhaust duct, then the configuration of the exhaust duct is designed to provide the required expanding cross-sectional area perpendicular to the water flow direction at each longitudinal station point along the exhaust duct, while also bending or turning the exhaust channel as necessary to redirect the water from the axial direction of axis A (transverse to the ambient water stream flow W) toward the rear of the apparatus and ultimately out of the exhaust duct outlet parallel to the ambient water stream flow W. The duct also transitions the shape of the exhaust channel from the circular inlet 14A to the half-elliptical D-shaped outlet 14B. All of these transitions are carried out according to streamlines that extend with smooth banking turns that immediately split the flow on the horizontal center plane of the exhaust duct, partially inverting top and bottom halves of the flow mirror symmetrically about the exhaust duct center plane as they progress from the inlet to the elbow. From the elbow they progress in expanding ranks to the outlet, representing throughout their progress the flow of equal unit volumes of water while decelerating, turning, and changing the overall shape of the exhaust channel. Thus, the streamlines all represent equal lengths of water flow from the exhaust duct inlet 14A to the exhaust duct outlet 14B, while the spacing distance therebetween increases from the inlet to the outlet in correspondence to the intended deceleration of the water, and the outermost streamlines at any longitudinal position along the exhaust channel path provide reference points by which exhaust channel shape can be derived.

Generally, the inventive design method applies the above discussed principles throughout the water flow channel, including the intake channel, the spiral channel, the rotor channels, and the exhaust channel. The intake and exhaust channels are designed in consideration of the water velocity curves or acceleration curves, as well as the resultant streamlines guiding the shape of the respective water flow channels. These considerations determine the length of the intake duct to achieve the required acceleration without exceeding acceptable acceleration limits. These considerations further determine the shape of the intake duct inlet to match the shape of the cross-section of the spiral channel. These considerations further determine the reducing cross-section areas of the intake duct as a function of the longitudinal position. These considerations further determine the spiral housing dimensions, with the added requirement that all water must exit the spiral into the rotor channels by the time it has passed once around the spiral. These considerations further determine the rotor inlet opening dimensions, which must match the radially inward component of flow imparted to the water stream by its confinement within the spiral housing. These considerations still further determine the rotor outlet openings, which are preferably sized to match a flow speed approximately equal to the flow speed of the water entering the spiral housing, i.e. so as to maintain the same flow speed through the spiral channel and the rotor channels up to the point of exiting the rotor outlet, although this design feature can be varied. The inventive considerations further determine the exhaust duct inlet opening, which matches the cross-sectional shape and area of the rotor outlet opening. The inventive considerations also determine the length of the exhaust duct to achieve the required deceleration at an acceptable deceleration rate, while the length of the exhaust duct must also satisfy the requirements of directing the exhaust flow to the desired discharge location and direction. The inventive considerations also determine the rate of change of the cross-sectional area inside the exhaust duct as a function of longitudinal position. Lastly, the inventive considerations determine the discharge area of the exhaust duct outlet where the exhaust water is released and reintroduced back into the ambient stream of water in which the apparatus is immersed.

As discussed above, streamlines can be used to model the water flow as an aid in designing the flow channels. This streamline modeling can be carried out manually or with computer aided drafting and design tools. However, the streamline modeling and design concept according to the streamlines may not be needed for designing the intake duct, because its square or rectangular cross-section is rather simple to reduce consistently from the inlet to the outlet, and the outlet must simply match the square or rectangular cross-section of the spiral channel, which in turn leads into the flat entry opening of the circumferentially developed peripheral rotor inlet. Nonetheless, the streamline design approach would be useful for an intake channel and spiral channel embodiment having a cross-section other than square or rectangular, such as a predominantly round or elliptical cross-section. Similarly, streamlines are not necessary for designing the spiral channel if its cross-section is predominantly rectangular. On the other hand, the streamline design approach is essential or extremely useful for designing the water flow channels through the rotor from the tangential and radially inward flow at the peripheral rotor inlet to the axial outward flow through the rotor outlet. The streamline design approach promotes a smooth banking or rolling non-turbulent water flow through the rotor channels, and the rotational transformation to adjust the stationary streamlines to the rotating coordinate system of the rotating rotor defines the exact shape of the rotor vanes necessary to promote the desired smooth streamline flow of water through the rotor while it is turning at the designed target rotational peripheral speed ratio. The streamline design approach is also very helpful for the design of the exhaust duct, because it has a rather complex geometry for expanding and decelerating the water flow while it also changes the shape from the inlet to the outlet and also redirects the water flow from transverse to parallel relative to the surrounding ambient stream.

The design of the various channel components of the apparatus 1 according to the invention is further preferably characterized by mathematical relationships or particularly ratios among certain parameters that define pertinent dimensions, areas, angles and velocities of the apparatus. A discussion of the derivation of these parametric relationships will now be presented with reference to FIGS. 15 to 18.

Parametric relationships define channel configuration throughout the system of encaptured water flow. Upon determining or selecting one basic value, namely the radius at the rotor outlet, then the channel configuration at critical junctures of intake inlet opening, spiral inlet, rotor inlet, rotor outlet, and final exhaust outlet opening can be derived mathematically, and the channel configuration between critical junctures can be determined by modeling with equations, streamlines and graphs.

For an apparatus that is deployed in an ambient stream, the physical principle that connects channel sections together mathematically is conservation of volume flow. Volume flow can be considered at any section of channel that is perpendicular to the encaptured stream as the product of that section's cross-sectional area multiplied by velocity of the flow coming through it.

Six design ratios and several additional configuration notes are needed to make the mathematical derivations that define the apparatus disclosed herein. Where area is known, velocity can be ascertained, and where velocity is known, the requisite area is established. Velocity of encaptured flow is described in relative terms as a multiple of the speed of ambient flow.

Rotor channels, i.e. the channel spaces between vanes through which encaptured water flows while inducing the rotors to turn, are included in these channel system relationships. Ideal (theoretical) vane angles at the rotor inlet and the rotor outlet can be derived from ratios and configuration notes disclosed herein.

If the speed of the ambient stream as it enters the deployed apparatus can be ascertained, then the velocity of the encaptured flow at the channel junctures can be described in absolute terms.

The basic value that needs to be determined is:
R=Radius at rotor exhaust

One more value that will allow velocity to be described in absolute terms is:
V=Velocity of ambient current Six design ratios that need to be determined are:
Ratio 1=Exhaust duct outlet area to intake duct inlet area
Ratio 2=Intake duct inlet area to spiral inlet area
Ratio 3=Spiral inlet area to rotor outlet area
Ratio 4=Rotor inlet radius to rotor outlet radius
Ratio 5=Spiral inlet radial width to spiral inlet axial length
Ratio 6=Rotor peripheral speed to spiral inlet flow velocity Configuration notes that define certain preferred aspects of an example embodiment of a design according to the invention are as follows:

Note 1: Channel sections are designed as to size and shape, to produce smooth water flow for the whole extent of the channel, subject to the dimensions, conditions, ratios and constraints that apply.

Note 2: Adjoining channel sections have identical shapes and sizes where they join.

Note 3: Intake duct inlet area is determined at the forward perpendicular, e.g. defined as 0 cm longitudinal position in FIG. 11A and FIG. 11B.

Note 4: Intake duct maintains a constant proportion of cross-sectional length to cross-sectional width for the whole extent of its channel section.

Note 5: Spiral channel has a rectangular cross-section with a constant axial length.

Note 6: Rotor inlet axial length is equal to spiral channel axial length.

Note 7: Spiral channel radial width decreases linearly with angle of spiral rotation.

Note 8: Intake duct configuration observes its velocity curve, e.g. as shown in FIG. 11A.

Note 9: Spiral channel dimension observes its equation, e.g. the polar equation:

$$r(t) = at + b,$$

where:
r(t)=spiral radius as a function of t
t=polar angle measured from spiral inlet
a=constant
b=constant Note 10: Rotor channel configuration observes its streamlines model, e.g. FIG. 14B.

Note 11: Exhaust channel configuration observes its velocity curve, e.g. FIG. 12, and streamlines model.

Note 12: All channel interfaces observe conservation of volume flow.

A parametric derivation of channel dimensions and areas, water flow velocities, and ideal vane angles is as follows:
Section 1: Derivation of Rotor Outlet Dimensions:
R=Radius at rotor outlet
$D_{RO}$=Diameter at rotor outlet $$D_{RO} = 2 \cdot R \qquad (1.1)$$

$C_{RO}$=Circumference at rotor outlet $$C_{RO} = 2 \cdot \pi \cdot R \qquad (1.2)$$

Section 2: Derivation of Cross-sectional Area at Designated Channel Locations:
$A_{RO}$=Area at rotor outlet $$A_{RO} = \pi \cdot R^2 \quad (2.1)$$

$A_{SI}$=Area at spiral inlet $$A_{SI} = A_{RO} \cdot (\text{Ratio 3}) \quad (2.2)$$

$$A_{SI} = \pi \cdot R^2 \cdot (\text{Ratio 3}) \quad (2.3)$$

$A_{II}$=Area at intake duct inlet $$A_{II} = A_{SI} \cdot (\text{Ratio 2}) \quad (2.4)$$

$$A_{II} = \pi \cdot R^2 \cdot (\text{Ratio 2}) \cdot (\text{Ratio 3}) \quad (2.5)$$

$A_{EO}$=Area at exhaust duct outlet $$A_{EO} = A_{II} \cdot (\text{Ratio 1}) \quad (2.6)$$

$$A_{EO} = \pi \cdot R^2 \cdot (\text{Ratio 1}) \cdot (\text{Ratio 2}) \cdot (\text{Ratio 3}) \quad (2.7)$$

Section 3: Derivation of Volume Flow within the Channel:
V=Velocity of ambient current
VF=Volume flow $$VF = V \cdot A_{II} \quad (3.1)$$

$$VF = V \cdot \pi \cdot R^2 \cdot (\text{Ratio 2}) \cdot (\text{Ratio 3}) \quad (3.2)$$

Section 4: Derivation of Flow Velocity at Designated Channel Locations:
$V_{RO}$=Velocity of flow at rotor outlet, relative to its stationary reference $$V_{RO} = \frac{VF}{A_{RO}} \quad (4.1)$$

$$V_{RO} = \frac{V \cdot \pi \cdot R^2 \cdot (\text{Ratio 2}) \cdot (\text{Ratio 3})}{\pi \cdot R^2} \quad (4.2)$$

$$V_{RO} = V \cdot (\text{Ratio 2}) \cdot (\text{Ratio 3}) \quad (4.3)$$

$V_{SI}$ = Velocity of flow at spiral inlet $$V_{SI} = \frac{VF}{A_{SI}} \quad (4.4)$$

$$V_{SI} = \frac{V \cdot \pi \cdot R^2 \cdot (\text{Ratio 2}) \cdot (\text{Ratio 3})}{\pi \cdot R^2 \cdot (\text{Ratio 3})} \quad (4.5)$$

$$V_{SI} = V \cdot (\text{Ratio 2}) \quad (4.6)$$

$V_{EO}$ = Velocity of flow at exhaust duct outlet $$V_{EO} = \frac{VF}{A_{EO}} \quad (4.7)$$

$$V_{EO} = \frac{V \cdot \pi \cdot R^2 \cdot (\text{Ratio 2}) \cdot (\text{Ratio 3})}{\pi \cdot R^2 \cdot (\text{Ratio 1}) \cdot (\text{Ratio 2}) \cdot (\text{Ratio 3})} \quad (4.8)$$

$$V_{EO} = \frac{V}{(\text{Ratio 1})} \quad (4.9)$$

Section 5: Derivation of Spiral Inlet Dimensions:
$L_{SI}$=Axial length at spiral inlet
$W_{SI}$=Radial width at spiral inlet $$W_{SI} = L_{SI} \cdot (\text{Ratio 5}) \quad (5.1)$$

$A_{SI}$=Area at spiral inlet $$A_{SI} = L_{SI} \cdot W_{SI} \quad (5.2)$$

$$A_{SI} = L_{SI}^2 \cdot (\text{Ratio 5}) \quad (5.3)$$

$$A_{SI} = \pi \cdot R^2 \cdot (\text{Ratio 3}) \quad (2.3)$$

$$\pi \cdot R^2 \cdot (\text{Ratio 3}) = L_{SI}^2 \cdot (\text{Ratio 5}) \quad (5.4)$$

$$L_{SI}^2 = \frac{\pi \cdot R^2 \cdot (\text{Ratio 3})}{(\text{Ratio 5})} \quad (5.5)$$

$$L_{SI} = \sqrt{\frac{\pi \cdot R^2 \cdot (\text{Ratio 3})}{(\text{Ratio 5})}} \quad (5.6)$$

$$L_{SI} = \frac{R \cdot \sqrt{\pi \cdot (\text{Ratio 3})}}{\sqrt{(\text{Ratio 5})}} \quad (5.7)$$

$$W_{SI} = L_{SI} \cdot (\text{Ratio 5}) \quad (5.8)$$

$$W_{SI} = \frac{R \cdot \sqrt{\pi \cdot (\text{Ratio 3})} \cdot (\text{Ratio 5})}{\sqrt{(\text{Ratio 5})}} \quad (5.9)$$

$$W_{SI} = R \cdot \sqrt{\pi \cdot (\text{Ratio 3}) \cdot (\text{Ratio 5})} \quad (5.10)$$

Section 6: Derivation of Intake Duct Inlet Dimensions:
$L_{II}$=Length of cross-section at intake duct inlet
$W_{II}$=Width of cross-section at intake duct inlet $$W_{II} = L_{II} \cdot (\text{Ratio 5}) \quad (6.1)$$

$A_{II}$=Area at intake duct inlet $$A_{II} = L_{II} \cdot W_{II} \quad (6.2)$$

$$A_{II} = L_{II}^2 \cdot (\text{Ratio 5}) \quad (6.3)$$

$$A_{II} = \pi \cdot R^2 \cdot (\text{Ratio 2}) \cdot (\text{Ratio 3}) \quad (2.5)$$

$$\pi \cdot R^2 \cdot (\text{Ratio 2}) \cdot (\text{Ratio 3}) = L_{II}^2 \cdot (\text{Ratio 5}) \quad (6.4)$$

$$L_{II}^2 = \frac{\pi \cdot R^2 \cdot (\text{Ratio 2}) \cdot (\text{Ratio 3})}{(\text{Ratio 5})} \quad (6.5)$$

$$L_{II} = \sqrt{\frac{\pi \cdot R^2 \cdot (\text{Ratio 2}) \cdot (\text{Ratio 3})}{(\text{Ratio 5})}} \quad (6.6)$$

$$L_{II} = \frac{R \cdot \sqrt{\pi \cdot (\text{Ratio 2}) \cdot (\text{Ratio 3})}}{\sqrt{(\text{Ratio 5})}} \quad (6.7)$$

$$W_{II} = L_{II} \cdot (\text{Ratio 5}) \quad (6.8)$$

$$W_{II} = \frac{R \cdot \sqrt{\pi \cdot (\text{Ratio 2}) \cdot (\text{Ratio 3})} \cdot (\text{Ratio 5})}{\sqrt{(\text{Ratio 5})}} \quad (6.9)$$

$$W_{II} = R \cdot \sqrt{\pi \cdot (\text{Ratio 2}) \cdot (\text{Ratio 3}) \cdot (\text{Ratio 5})} \quad (6.10)$$

Section 7: Derivation of Rotor Inlet Dimensions:
$R_{RI}$=Radius at rotor inlet $$R_{RI} = R \cdot (\text{Ratio 4}) \quad (7.1)$$

$D_{RI}$=Diameter at rotor inlet $$D_{RI} = 2 \cdot R_{RI} \quad (7.2)$$

$$D_{RI} = 2 \cdot R \cdot (\text{Ratio 4}) \quad (7.3)$$

$C_{RI}$=Circumference at rotor inlet $$C_{RI} = 2 \cdot \pi \cdot R_{RI} \quad (7.4)$$

$$C_{RI} = 2 \cdot \pi \cdot R \cdot (\text{Ratio 4}) \quad (7.5)$$

$L_{RI}$=Axial length at rotor inlet
$L_{RI}=L_{SI}$ $$L_{SI} = \frac{R \cdot \sqrt{\pi \cdot (\text{Ratio 3})}}{\sqrt{(\text{Ratio 5})}} \tag{5.7}$$

$$L_{RI} = \frac{R \cdot \sqrt{\pi \cdot (\text{Ratio 3})}}{\sqrt{(\text{Ratio 5})}} \tag{7.6}$$

$A_{RI}$=Area at rotor inlet (cylindrical surface)

$$A_{RI} = L_{RI} \cdot C_{RI} \tag{7.7}$$

$$A_{RI} = \frac{R \cdot \sqrt{\pi \cdot (\text{Ratio 3})}}{\sqrt{(\text{Ratio 5})}} \cdot 2 \cdot \pi \cdot R \cdot (\text{Ratio 4}) \tag{7.8}$$

$$A_{RI} = \frac{2 \cdot \pi^{\frac{3}{2}} \cdot R^2 \cdot \sqrt{(\text{Ratio 3})} \cdot (\text{Ratio 4})}{\sqrt{(\text{Ratio 5})}} \tag{7.9}$$

Section 8: Derivation of Spiral Angle, Radial with Respect to Tangent of a Circle at the Rotor Inlet Periphery:
See FIG. 15, which shows a diagram pertinent to this derivation.
θ=Spiral angle, radial with respect to tangent of a circle at the rotor inlet periphery.

$W_{SI}$ = Radial width at spiral inlet $$W_{SI} = R \cdot \sqrt{\pi \cdot (\text{Ratio 3}) \cdot (\text{Ratio 5})} \tag{5.10}$$

$C_{RI}$ = Circumference at rotor inlet $$C_{RI} = 2 \cdot \pi \cdot R \cdot (\text{Ratio 4}) \tag{7.5}$$

$$\text{Tan}\theta = \frac{W_{SI}}{C_{RI}} \quad (\text{See } Fig.\ 15) \tag{8.1}$$

$$\text{Tan}\theta = R \cdot \sqrt{\pi \cdot (\text{Ratio 3}) \cdot (\text{Ratio 5})} \cdot \frac{1}{2 \cdot \pi \cdot R \cdot (\text{Ratio 4})} \tag{8.2}$$

$$\text{Tan}\theta = \frac{\sqrt{(\text{Ratio 3}) \cdot (\text{Ratio 5})}}{2 \cdot \sqrt{\pi} \cdot (\text{Ratio 4})} \tag{8.3}$$

$$\theta = \text{ArcTan}\left[\frac{\sqrt{(\text{Ratio 3}) \cdot (\text{Ratio 5})}}{2 \cdot \sqrt{\pi} \cdot (\text{Ratio 4})}\right] \tag{8.4}$$

Section 9: Derivation of Radial Component of Flow Velocity at Rotor Inlet, Relative to its Stationary Reference:
See FIG. 16, which shows a diagram pertinent to this derivation.
$V_{SI}$=Velocity of flow at spiral inlet $$V_{SI}=V \cdot (\text{Ratio 2}) \tag{4.6}$$

θ=Spiral angle, radial with respect to tangent of a circle at the rotor inlet periphery
θ=Angle of flow velocity at rotor inlet, radial with respect to tangent at the rotor inlet periphery, relative to its stationary reference $$\theta = \text{ArcTan}\left[\frac{\sqrt{(\text{Ratio 3}) \cdot (\text{Ratio 5})}}{2 \cdot \sqrt{\pi} \cdot (\text{Ratio 4})}\right] \tag{8.4}$$

$$\text{Tan}\theta = \frac{\sqrt{(\text{Ratio 3}) \cdot (\text{Ratio 5})}}{2 \cdot \sqrt{\pi} \cdot (\text{Ratio 4})} \tag{8.3}$$

Tangential component of flow velocity at rotor inlet, relative to its stationary reference:

$$\cos\theta \cdot V_{RI} = V_{SI}, \tag{9.1}$$

Figure 16:
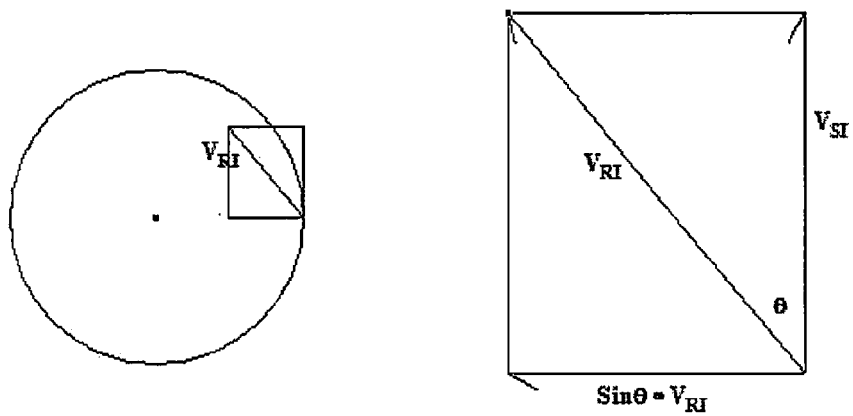
FIG. 16 includes two diagrams for explaining the derivation of the water flow velocity at the rotor inlet through the stationary space that is enclosed by the bounding surfaces of a rotating rotor.

(See FIG. 16)

$$V_{RI} = \frac{V_{SI}}{\cos\theta} \tag{9.2}$$

Radial component of flow velocity at rotor inlet, relative to its stationary reference:

$$\sin\theta \cdot V_{RI} = \sin\theta \cdot \frac{V_{SI}}{\cos\theta} \tag{9.3}$$

$$\sin\theta \cdot V_{RI} = \tan\theta \cdot V_{SI} \tag{9.4}$$

$$\sin\theta \cdot V_{RI} = V \cdot (\text{Ratio 2}) \cdot \tan\theta \tag{9.5}$$

$$\sin\theta \cdot V_{RI} = \frac{V \cdot (\text{Ratio 2}) \cdot \sqrt{(\text{Ratio 3}) \cdot (\text{Ratio 5})}}{2 \cdot \sqrt{\pi} \cdot (\text{Ratio 4})} \tag{9.6}$$

Section 10: Check Derivation of Radial Component of Flow Velocity at Rotor Inlet:
V=Velocity of ambient current
VF=Volume flow $$VF = V \cdot A_{II} \tag{10.1}$$

$$VF = V \cdot \pi \cdot R^2 \cdot (\text{Ratio 2}) \cdot (\text{Ratio 3}) \tag{3.2}$$

$A_{RI}$=Area at rotor inlet (cylindrical surface)

$$A_{RI} = \frac{2 \cdot \pi^{\frac{3}{2}} \cdot R^2 \cdot \sqrt{(\text{Ratio 3})} \cdot (\text{Ratio 4})}{\sqrt{(\text{Ratio 5})}} \tag{7.9}$$

Radial component of flow velocity at rotor inlet, relative to its stationary reference, by volume flow derivation:

$$\sin\theta \cdot V_{RI} = \frac{VF}{A_{RI}} \tag{10.2}$$

$$\sin\theta \cdot V_{RI} = V \cdot \pi \cdot R^2 \cdot (\text{Ratio 2}) \cdot (\text{Ratio 3}) \cdot \frac{\sqrt{(\text{Ratio 5})}}{2 \cdot \pi^{\frac{3}{2}} \cdot R^2 \cdot \sqrt{(\text{Ratio 3})} \cdot (\text{Ratio 4})} \tag{10.3}$$

$$\sin\theta \cdot V_{RI} = \frac{V \cdot (\text{Ratio 2}) \cdot \sqrt{(\text{Ratio 3}) \cdot (\text{Ratio 5})}}{2 \cdot \sqrt{\pi} \cdot (\text{Ratio 4})} \tag{10.4}$$

Radial component of flow velocity at rotor inlet, relative to its stationary reference, by earlier derivation above:

$$\sin\theta \cdot V_{RI} = \frac{V \cdot (\text{Ratio 2}) \cdot \sqrt{(\text{Ratio 3}) \cdot (\text{Ratio 5})}}{2 \cdot \sqrt{\pi} \cdot (\text{Ratio 4})} \tag{9.6}$$

Section 11: Derivation of Speed of Rotating Rotor Inlet Periphery, Relative to its Stationary Reference:

$V_{SI}$=Velocity of flow at spiral inlet $$V_{SI}=V \cdot (\text{Ratio 2}) \tag{4.6}$$

$S_{RP}$=Speed of rotating rotor inlet periphery, relative to its stationary reference $$S_{RP}=V_{SI}(\text{Ratio 6}) \tag{11.1}$$

$$S_{RP}=V \cdot (\text{Ratio 2}) \cdot (\text{Ratio 6}) \tag{11.2}$$

Section 12: Derivation of Angular Velocity of Rotating Vane, Relative to its Stationary Reference:

$\gamma$=Angular position of rotating vane relative to its stationary reference $$(12.1) \frac{d\gamma}{dt} = \text{Angular velocity of rotating vane}$$

relative to its stationary reference $R_{RI}$ = Radius at rotor inlet (7.1) $R_{RI} = R \cdot (\text{Ratio4})$ $S_{RP}$ = Speed of rotating rotor's periphery $$S_{RP} = \frac{d\gamma}{dt} \cdot R_{RI} \tag{12.3}$$

$$S_{RP} = \frac{d\gamma}{dt} \cdot R \cdot (\text{Ratio 4}) \tag{12.4}$$

$$S_{RP} = V \cdot (\text{Ratio 2}) \cdot (\text{Ratio 6}) \tag{11.2}$$

$$\frac{d\gamma}{dt} \cdot R \cdot (\text{Ratio 4}) = V \cdot (\text{Ratio 2}) \cdot (\text{Ratio 6}) \tag{12.5}$$

$$\frac{d\gamma}{dt} = \frac{V \cdot (\text{Ratio 2}) \cdot (\text{Ratio 6})}{R \cdot (\text{Ratio 4})} \tag{12.6}$$

Figure 17:
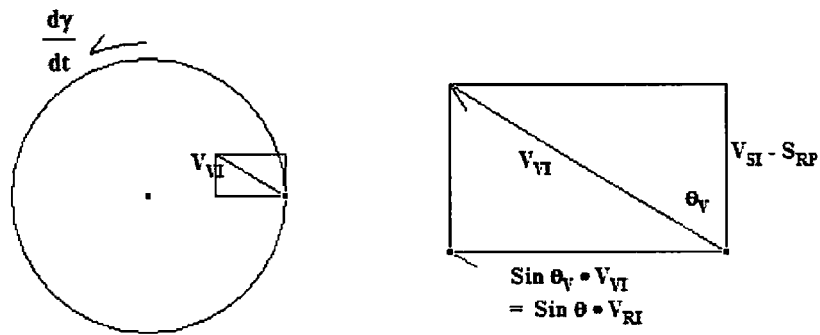
FIG. 17 includes two diagrams for explaining the derivation of an ideal vane angle of a leading edge of a rotor vane at the rotor inlet for a rotor rotating at its target rotational peripheral speed ratio.

Section 13: Derivation of Ideal Vane Angle at Rotor Inlet Periphery, Relative to its Rotating Reference:

See FIG. 17, which shows a diagram pertinent to this derivation.

$\theta$=Angle of flow velocity at rotor inlet, radial with respect to tangent at the rotor inlet periphery, relative to its stationary reference $\theta$=Spiral angle, radial with respect to tangent of a circle at the rotor inlet periphery (Section 8)

$\theta_V$=Angle of flow velocity at rotor inlet periphery, radial with respect to tangent relative to its rotating reference $\theta_V$=Ideal vane angle at rotor inlet periphery, radial with respect to tangent relative to its rotating reference $V_{RI}$=Velocity of flow at rotor inlet, relative to its stationary reference $V_{VI}$=Velocity of flow at rotor inlet, relative to its rotating reference (see FIG. 17)

$V_{SI}$=Velocity at spiral inlet $$V_{SI}=V \cdot (\text{Ratio 2}) \tag{4.6}$$

$S_{RP}$=Speed of rotating rotor inlet periphery, relative to its stationary reference $$S_{RP}=V \cdot (\text{Ratio 2}) \cdot (\text{Ratio 6}) \tag{11.2}$$

Tangential component of flow velocity at rotor inlet, relative to its rotating reference:

$$\cos\theta_V \cdot V_{VT}=V_{SI}-S_{RP} \tag{13.1}$$

(See FIG. 17)

$$\cos\theta_V \cdot V_{VT}=[V \cdot (\text{Ratio2})]-[V \cdot (\text{Ratio 2}) \cdot (\text{Ratio 6})] \tag{13.2}$$

$$\cos\theta_V \cdot V_{VT}=V \cdot (\text{Ratio2}) \cdot [1-(\text{Ratio 6})] \tag{13.3}$$

Radial component of flow velocity at rotor inlet, relative to its stationary reference:

$$\sin\theta \cdot V_{RI} = \frac{V \cdot (\text{Ratio 2}) \cdot \sqrt{(\text{Ratio 3}) \cdot (\text{Ratio 5})}}{2 \cdot \sqrt{\pi} \cdot (\text{Ratio 4})} \tag{10.4}$$

Radial component of flow velocity at rotor inlet, relative to its rotating reference:

$$\sin\theta_V \cdot V_{VI} = \sin\theta \cdot V_{RI} \text{ (See } Fig. \text{ 17)} \tag{13.4}$$

$$\sin\theta_V \cdot V_{VI} = \frac{V \cdot (\text{Ratio 2}) \cdot \sqrt{(\text{Ratio 3}) \cdot (\text{Ratio 5})}}{2 \cdot \sqrt{\pi} \cdot (\text{Ratio 4})} \tag{13.5}$$

Ideal vane angle, $\theta_V$, defined by its tangent:

$$\tan\theta_V = \frac{\sin\theta_V}{\cos\theta_V} \tag{13.6}$$

$$\tan\theta_V = \frac{\sin\theta_V \cdot V_{VI}}{\cos\theta_V \cdot V_{VI}} \tag{13.7}$$

$$\tan\theta_V = \frac{V \cdot (\text{Ratio 2}) \cdot \sqrt{(\text{Ratio 3}) \cdot (\text{Ratio 5})}}{2 \cdot \sqrt{\pi} \cdot (\text{Ratio 4})} \cdot \frac{1}{V \cdot (\text{Ratio 2}) \cdot [1-(\text{Ratio 6})]} \tag{13.8}$$

$$\tan\theta_V = \frac{\sqrt{(\text{Ratio 3}) \cdot (\text{Ratio 5})}}{2 \cdot \sqrt{\pi} \cdot (\text{Ratio 4}) \cdot [1-(\text{Ratio 6})]} \tag{13.9}$$

$$\theta_V = \text{ArcTan}\left[\frac{\sqrt{(\text{Ratio 3}) \cdot (\text{Ratio 5})}}{2 \cdot \sqrt{\pi} \cdot (\text{Ratio 4}) \cdot [1-(\text{Ratio 6})]}\right] \tag{13.10}$$

Figure 18:
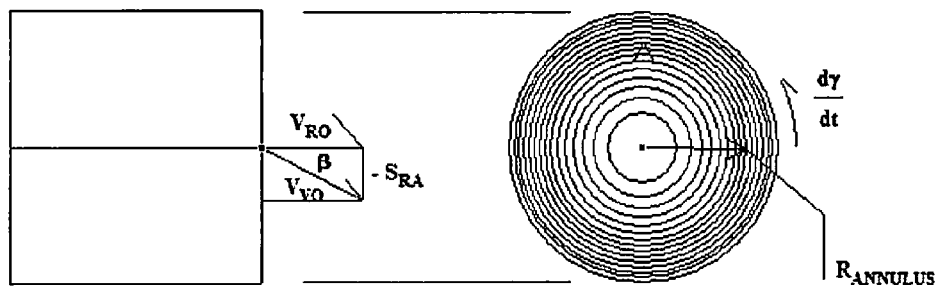
FIG. 18 includes two diagrams for explaining the derivation of an ideal vane angle of a trailing edge of a rotor vane at the rotor outlet for a rotor rotating at its target rotational peripheral speed ratio.

Section 14: Derivation of Ideal Vane Angle at a Designated Annular Ring of Rotor Outlet, Tangential with Respect to Axis, Relative to its Rotating Reference:

See FIG. 18, which shows a diagram pertinent to this derivation.

$R_{ANNULUS}$=Radius of a designated annular ring at rotor outlet $\beta$=Angle of flow velocity at a designated annular ring of rotor outlet, tangential with respect to axis, relative to its rotating reference $\beta$=Ideal vane angle at a designated annular ring of rotor outlet, tangential with respect to axis, relative to its rotating reference $$\frac{d\gamma}{dt} = \text{Angular velocity of rotating} \tag{12.1}$$

vane relative to its stationary reference $$\frac{d\gamma}{dt} = \frac{V \cdot (\text{Ratio 2}) \cdot (\text{Ratio 6})}{R \cdot (\text{Ratio 4})} \tag{12.6}$$

$S_{RA}$=Speed of rotating vane at a designated annular ring of rotor outlet, relative to its stationary reference $$S_{RA} = R_{ANNULUS} \cdot \frac{d\gamma}{dt} \tag{14.1}$$

$$S_{RA} = \frac{R_{ANNULUS} \cdot V \cdot (\text{Ratio 2}) \cdot (\text{Ratio 6})}{R \cdot (\text{Ratio 4})} \tag{14.2}$$

$V_{RO}$=Velocity of flow at rotor outlet, relative to its stationary reference $$V_{RO} = V \cdot (\text{Ratio 2}) \cdot (\text{Ratio 3}) \qquad (4.3)$$

$V_{VO}$=Velocity of flow at a designated annular ring of rotor outlet, relative to its rotating reference Axial component of $V_{VO}$:

$$\cos\beta \cdot V_{VO} = V_{RO} \qquad (14.3)$$

(See FIG. 18)

$$\cos\beta \cdot V_{VO} = V \cdot (\text{Ratio 2}) \cdot (\text{Ratio 3}) \qquad (14.4)$$

Tangential component of $V_{VO}$:

$$\sin\beta \cdot V_{VO} = (-)S_{RA} \quad (\text{See Fig. 18}) \qquad (14.5)$$

$$\sin\beta \cdot V_{VO} = (-)\frac{R_{ANNULUS} \cdot V \cdot (\text{Ratio 2}) \cdot (\text{Ratio 6})}{R \cdot (\text{Ratio 4})} \qquad (14.6)$$

Ideal vane angle, β, defined by its tangent:

$$\tan\beta = \frac{\sin\beta}{\cos\beta} \qquad (14.7)$$

$$\tan\beta = \frac{\sin\beta \cdot V_{VO}}{\cos\beta \cdot V_{VO}} \qquad (14.8)$$

$$\tan\beta = (-)\frac{R_{ANNULUS} \cdot V \cdot (\text{Ratio 2}) \cdot (\text{Ratio 6})}{R \cdot (\text{Ratio 4})} \cdot \frac{1}{V \cdot (\text{Ratio 2}) \cdot (\text{Ratio 3})} \qquad (14.9)$$

$$\tan\beta = (-)\frac{R_{ANNULUS} \cdot (\text{Ratio 6})}{R \cdot (\text{Ratio 3}) \cdot (\text{Ratio 4})} \qquad (14.10)$$

$$\beta = \text{ArcTan}\left[(-)\frac{R_{ANNULUS} \cdot (\text{Ratio 6})}{R \cdot (\text{Ratio 3}) \cdot (\text{Ratio 4})}\right] \qquad (14.11)$$

Section 15: Another Derivation to Confirm Spiral Angle, Radial with Respect to Tangent of a Circle At the Rotor Inlet Periphery:
θ=Spiral angle, radial with respect to tangent of a circle at the rotor inlet periphery
φ=Rotational angle of spiral channel radius and contained flow about the spiral center
The radial width of the spiral channel is the difference between two radii. The inner radius does not change but is everywhere equal to the radius of the rotor inlet periphery. The outer radius changes as a function of its angular position within the spiral form.
The outer radius starts at spiral inlet with a value of:
$R_{RI}+W_{SI}$
$R_{RI}$=Radius at rotor inlet
$W_{SI}$=Radial width at spiral inlet
And in one turn (360° or 2π radians), about the spiral center, diminishes linearly to an ending value of:
$R_{RI}$
The radial width of the spiral channel, with respect to angular position, decreases at a rate of:

$$\frac{W_{SI}}{(1)\text{turn}} = \frac{W_{SI}}{360°} = \frac{W_{SI}}{(2\pi)\text{radians}} \qquad (15.1)$$

The radial component of velocity of spiral channel flow is the product of the angular velocity of flow multiplied by the rate of decrease of radial width of the spiral channel with respect to angular position of the flow within.

The radial component of flow velocity, for a particle in spiral motion at radius r:

$$\frac{dr}{dt} = \frac{d\phi}{dt} \cdot \frac{dr}{d\phi}, \qquad (15.2)$$

where:

$\frac{dr}{dt}$ = Radial component of flow velocity, for a particle in spiral motion $\frac{d\phi}{dt}$ = Angular velocity of flow, for a particle in spiral motion $\frac{dr}{d\phi}$ = Rate of change in radial width of spiral channel with respect to angular position Rate of change in radial width of spiral channel with respect to angular position:

$$\frac{dr}{d\phi} = \frac{W_{SI}}{2\pi} \qquad (15.3)$$

Tangential component of flow velocity $$\frac{ds}{dt},$$

for a particle in spiral motion at radius r:

$$\frac{ds}{dt} = r \cdot \frac{d\phi}{dt} \qquad (15.4)$$

At rotor inlet:

$$\frac{ds}{dt} = V_{SI} \qquad (15.5)$$

$$V_{SI} = V \cdot (\text{Ratio 2}) \qquad (4.6)$$

$$\frac{ds}{dt} = V \cdot (\text{Ratio 2}) \qquad (15.6)$$

Angular velocity of flow:

$$\frac{d\phi}{dt} = \frac{ds}{dt} \cdot \frac{1}{r} \qquad (15.7)$$

At rotor inlet:

$$r = R_{RI} \qquad (15.8)$$

$$R_{RI} = R \cdot (\text{Ratio 4}) \qquad (15.9)$$

$$r = R \cdot (\text{Ratio 4}) \qquad (15.10)$$

$$\frac{d\phi}{dt} = V \cdot (\text{Ratio 2}) \cdot \frac{1}{R \cdot (\text{Ratio 4})} \qquad (15.11)$$

$$\frac{d\phi}{dt} = \frac{V \cdot (\text{Ratio 2})}{R \cdot (\text{Ratio 4})} \qquad (15.12)$$

Again, the radial component of flow velocity:

$$\frac{dr}{dt} = \frac{d\phi}{dt} \cdot \frac{dr}{d\phi} \qquad (15.2)$$

$$\frac{dr}{dt} = \frac{V \cdot (\text{Ratio 2})}{R \cdot (\text{Ratio 4})} \cdot \frac{W_{SI}}{2 \cdot \pi} \qquad (15.13)$$

$$W_{SI} = R \cdot \sqrt{\pi \cdot (\text{Ratio 3}) \cdot (\text{Ratio 5})} \quad (5.10)$$

$$\frac{dr}{dt} = \frac{V \cdot (\text{Ratio 2})}{R \cdot (\text{Ratio 4})} \cdot \frac{R \cdot \sqrt{\pi \cdot (\text{Ratio 3}) \cdot (\text{Ratio 5})}}{2 \cdot \pi} \quad (15.14)$$

$$\frac{dr}{dt} = \frac{V \cdot (\text{Ratio 2}) \cdot \sqrt{(\text{Ratio 3}) \cdot (\text{Ratio 5})}}{2 \cdot \sqrt{\pi} \cdot (\text{Ratio 4})} \quad (15.15)$$

Spiral angle, θ, derived from its tangent:

$$\text{Tan}\theta = \frac{\text{Radial component of water flow velocity}}{\text{Tangential component of water flow velocity}} \quad (15.16)$$

$$\text{Tan}\theta = \frac{\frac{dr}{dt}}{\frac{ds}{dt}} \quad (15.17)$$

$$\text{Tan}\theta = \frac{V \cdot (\text{Ratio 2}) \cdot \sqrt{(\text{Ratio 3}) \cdot (\text{Ratio 5})}}{2 \cdot \sqrt{\pi} \cdot (\text{Ratio 4})} \cdot \frac{1}{V \cdot (\text{Ratio 2})} \quad (15.18)$$

$$\text{Tan}\theta = \frac{\sqrt{(\text{Ratio 3}) \cdot (\text{Ratio 5})}}{2 \cdot \sqrt{\pi} \cdot (\text{Ratio 4})} \quad (15.19)$$

$$\theta = \text{ArcTan}\left[\frac{\sqrt{(\text{Ratio 3}) \cdot (\text{Ratio 5})}}{2 \cdot \sqrt{\pi} \cdot (\text{Ratio 4})}\right] \quad (15.20)$$

$$\theta = \text{ArcTan}\left[\frac{\sqrt{(\text{Ratio 3}) \cdot (\text{Ratio 5})}}{2 \cdot \sqrt{\pi} \cdot (\text{Ratio 4})}\right] \quad (8.4)$$

Section 16: Complete List of Variable Names:
R=Radius at rotor outlet
$D_{RO}$=Diameter at rotor outlet
$C_{RO}$=Circumference at rotor outlet
$A_{RO}$=Area at rotor outlet
$A_{SI}$=Area at spiral inlet
$A_{II}$=Area at intake duct inlet
$A_{EO}$=Area at exhaust duct outlet
V=Velocity of ambient current
VF=Volume flow
$V_{RO}$=Velocity of flow at rotor outlet, relative to its stationary reference
$V_{SI}$=Velocity of flow at spiral inlet
$V_{EO}$=Velocity of flow at exhaust duct outlet
$L_{SI}$=Axial length at spiral inlet
$W_{SI}$=Radial width at spiral inlet
$L_{II}$=Length of cross-section at intake duct inlet
$W_{II}$=Width of cross-section at intake duct inlet
$R_{RI}$=Radius at rotor inlet
$D_{RI}$=Diameter at rotor inlet
$C_{RI}$=Circumference at rotor inlet
$L_{RI}$=Axial length at rotor inlet
$A_{RI}$=Area at rotor inlet (cylindrical surface)
θ=Spiral angle, radial with respect to tangent of a circle at the rotor inlet periphery
θ=Angle of flow velocity at rotor inlet, radial with respect to tangent at the rotor inlet periphery, relative to its stationary reference
$V_{RI}$=Velocity of flow at rotor inlet, relative to its stationary reference
$S_{RP}$=Speed of rotating rotor inlet periphery, relative to its stationary reference
γ=Angular position of rotating vane relative to its stationary reference $\frac{d\gamma}{dt}$ = Angular velocity of rotating vane relative to its stationary reference $\theta_V$=Angle of flow velocity at rotor inlet periphery, radial with respect to tangent, relative to its rotating reference $\theta_V$=Ideal vane angle at rotor inlet periphery, radial with respect to tangent, relative to its rotating reference
$V_{VI}$=Velocity of flow at rotor inlet, relative to its rotating reference
$R_{ANNULUS}$=Radius of a designated annular ring of rotor outlet
β=Angle of flow velocity at a designated annular ring of rotor outlet, tangential with respect to axis, relative to its rotating reference
β=Ideal vane angle at a designated annular ring of rotor outlet, tangential with respect to axis, relative to its rotating reference
$S_{RA}$=Speed of rotating vane at a designated annular ring of rotor outlet, relative to its stationary reference
$V_{VO}$=Velocity of flow at a designated annular ring of rotor outlet, relative to its rotating reference
φ=Rotational angle of spiral channel radius and contained flow about the spiral center $\frac{dr}{dt}$ = Radial component of flow velocity, for a particle in spiral motion $\frac{d\phi}{dt}$ = Angular velocity of flow, for particle in spiral motion $\frac{dr}{d\phi}$ = Rate of change in radial width of spiral channel, with respect to angular position $\frac{ds}{dt}$ = Tangential component of flow velocity, for a particle in spiral motion Some numerical values of the pertinent parameters are developed in the following.

Ambient Current Speed

Ambient current speed may range preferably from 1 to 10 knots, or more preferably from 2 to 8 knots (1.03-4.12 m/sec) for the applications in which this device in its present embodiment is likely to be used. The prototype was based on an ambient current speed of 4 knots (2.06 m/sec), because it was a fairly conservative high-end value likely to be encountered under most usage conditions. For example, a sailing yacht of waterline length up to 38' cannot travel faster than about 8 knots (4.12 m/sec), according to the so-called "hull speed" formula for displacement craft. Most recreational sailing craft are smaller than that and thus slower at their full "hull speed." Most of the time sailing vessels are likely to travel well below "hull speed." Tide streams in the waters around Eastport, Me., can get up to 7 knots (3.61 m/sec) at maximum flow, but sites where this occurs are relatively few and far between. Locations where tide speed maxes out at 4 knots (2.06 m/sec) or below are more easily found. Much of the tide change occurs at speeds lower than this. A few tide flows exist where ambient current speeds greater than 8 knots (4.12 m/sec) prevail. Also, greater ambient speeds would prevail in a design of the inventive apparatus developed for wind. Current speeds below 2 knots (1.03 m/sec) contain very little power in any fluid stream, relative to volume flow.

Velocity Ratio for Internal Acceleration in the Venturi

A velocity ratio that falls between the values of 2:1 and 72:1 is preferred in applications for this machine. In this context velocity ratio means $V_{internal}/V_{ambient}$. The fundamental question is how fast the water in the venturi can be accelerated without experiencing cavitation. Velocity head is a measure of the fluid's energy per unit weight. The maximum velocity that water can attain inside a venturi occurs when the velocity head of the captured water equals the total pressure of the ambient stream, which is ambient static pressure plus ambient velocity pressure (minus the water's vapor pressure at cavitation, which is less than 5% of one atmosphere under typical usage conditions). Just under the surface of the water, in a 4 knot stream, the total pressure is equal to the ambient stream's velocity head plus the static pressure exerted by the atmosphere above. The calculations follow:

Formula for velocity head of a stream: $H=V^2/2\,g$ (units are "meters of water")

Acceleration of gravity: $g=9.81$ m/sec$^2$

Velocity head of a 4 knot (2.06 m/sec) stream: 0.216 meters of water.

Static pressure of the ambient stream (one atmosphere): 10.3 meters of water.

Stream's total pressure (10.3+0.216): 10.5 meters of water.

Working the formula backwards (V=the square root of (2 g*H)), the maximum velocity of water after acceleration in the venturi is calculated as follows:

H=10.5 meters of water.

V=27.9 knots (14.35 m/sec)

Adjusting for vapor pressure of water up to 5% of one atmosphere, or 0.525 meters of water:

H=9.98 meters of water

V=27.2 knots (13.99 m/sec)

If 4 knots (2.06 m/sec) is the ambient current speed, 27.2 knots (13.99 m/sec) would mean a velocity ratio of 6.8 to 1, calculated as follows:

27.2 knots/4 knots=6.8 (ratio)

The prototype embodiment of the inventive apparatus uses a smaller velocity ratio of 4:1 to keep the design conservative. This reduces the expected volume flow from a given ambient stream, and thus the maximum possible power. It possibly limits energy transfer efficiency to the extent that a higher captured water speed interacts more effectively with the rotor. But as a benefit it enables the machine to handle occasionally higher ambient current speeds. With a 4:1 ratio, the highest ambient current speed that the device in its present embodiment can be expected to handle, without experiencing cavitation when it is installed just under the surface of the water, is calculated as follows:

27.2 knots (13.99 m/sec)/4=6.8 knots (3.50 m/sec)

Of course, it will handle faster flows if it is installed deeper in the water where ambient static pressure is higher. For example, at 10.3 meters depth (1 atmosphere of water plus 1 atmosphere of air), it will handle an internal velocity of up to 38.8 knots (19.95 m/sec), which with its present 4:1 velocity ratio reflects an allowable ambient stream speed of 9.7 knots.

Or, if ambient stream speed does not exceed 4 knots (2.06 m/sec), the velocity ratio can be increased to enable a smaller, more cost-efficient machine harvesting the same amount of energy. To accelerate a 4 knot (2.06 m/sec) stream to 38.8 knots (19.95 m/sec) requires a velocity ratio of 9.7:1. This effect becomes increasingly significant as deeper installations are made. For example, at 103 meters depth (10 atmospheres of water plus 1 atmosphere of air), the internal velocity can reach up to 88.4 knots (45.5 m/sec). To accelerate a 4 knot (2.06 m/sec) stream to 88.4 knots (45.5 m/sec) requires a velocity ratio of 22:1. The same rotor and spiral housing, if used in a machine with a velocity ratio of 22:1 that is installed at 103 meters depth would handle 5.5 times as much volume flow as the present configuration. Initial intake and final exhaust openings presented to the ambient stream would have to be 5.5 times larger. If installed at 1030 meters depth (100 atmospheres of water plus 1 atmosphere of air), the highest internal velocity can reach 289 knots (149 m/sec). To accelerate a 4 knot (2.06 m/sec) stream to 289 knots requires a velocity ratio of 72:1. The same rotor and spiral housing, if used in a machine with a velocity ratio of 72.1 that is installed at 1030 meters depth would handle 18 times as much volume flow as the present configuration. Initial intake and final exhaust openings presented to the ambient stream would have to be 18 times larger.

Velocity Ratio for Overall Deceleration in the Machine

The coefficient of performance on the Betz law graph reaches its highest value of 59.3% at a velocity ratio of 1:3 (0.33). In this context velocity ratio means $V_{out}/V_{in}$. The coefficient values are above 54% for velocity ratios between 1:10 (0.10) and 1:2 (0.50). In other words the peak of that graph is fairly flat over the noted domain. Good efficiency can be achieved over that range.

Designing the Spiral Housing and the Rotor

The interactions between components of encaptured water flow lead to a recommended sequence of design.

First thing is to decide how much ambient stream flow is to be captured. This is measured as volume flow (or mass flow, which is equivalent for incompressible fluids), and it leads to a determination of intake opening area that together with ambient current speed, velocity ratio for internal acceleration through the venturi, and velocity ratio for overall deceleration through the machine, sets an upper limit on how much power is available in the machine.

Volume flow is the same for all channels in the machine (by conservation of volume flow). Flow velocity and cross sectional area (perpendicular to flow) are inversely related at every stage of the water's progress through the machine, by the statement that volume flow is equal to cross-sectional area (perpendicular to flow) multiplied by flow velocity.

The spiral housing channel imparts a radial inward component to the flow and directs it into the rotor. The velocity ratio for internal acceleration in the venturi, together with ambient current speed, sets how fast the encaptured flow is traveling as it enters the spiral housing. The spiral housing intake is sized not to change that speed. Spiral housing intake area is derived as volume flow divided by flow velocity at the spiral housing intake. The axial length of the channel in the spiral housing remains constant throughout, and is sized to match the length of the rotor's intake opening, measured axially. The channel height or width in the spiral intake opening derives from its intake opening area divided by intake opening length.

Two simultaneous conditions preferably must be met:

Condition 1: The spiral channel height in radial cross-section starts at full value at the spiral's intake opening and diminishes to zero at a constant decreasing rate in one revolution around the spiral. That fact, together with the initial spiral channel height, gives the rate of decrease from which the radial inward vector component of flow can be found.

Condition 2: The product of rotor's intake opening length (or spiral channel axial length) multiplied by rotor's intake opening circumference, which is the rotor's intake area at its intake periphery, has to equal total volume flow divided by radial inward component of velocity imparted to the flow by the spiral housing.

Channel height and width values at the spiral intake opening are determined iteratively with the rotor's design. Volume flow divided by the radial inward component of flow at the rotor's periphery sets the cross-sectional area (perpendicular to the radial inward component of flow) at the rotor's peripheral intake opening. Cross-sectional area at the rotor's peripheral intake opening divided by the rotor's circumference at its periphery sets the width of the rotor's peripheral intake opening. The width of the rotor's peripheral intake opening sets the width of the spiral housing channel. The width of the spiral housing channel, divided into its intake opening area, sets the height of the spiral housing channel at its intake opening. The height of the spiral channel at its intake opening sets the rate of decreasing height, according to condition 1 above.

For the present embodiment, two decisions were made regarding the rotor's exhaust (i.e. rotor outlet): 1) It would embody the full diameter (or nearly that amount) of the rotor's intake periphery, and 2) it would embody about the same cross-sectional area (perpendicular to the flow) as the spiral housing intake. This leads to the condition that (average) flow speed through the spiral housing and through the rotor channels will not change much as the water passes through. As it turns out, these conditions were not met exactly in the prototype, for the peripheral band in the second stage reduced the outlet area, but the embodiment comes pretty close.

Once the decision is made about the size of the rotor's outlet, then the peripheral size of the rotor's intake opening follows mathematically. The rotor's intake opening can be modeled as a rectangle developed from the rotor's cylindrical periphery, whose width is the circumference of the rotor and whose area is derived as the volume flow divided by the radial inward component of velocity imparted to that flow by the decreasing outer radius of the spiral housing channel. The length of the rotor's opening parallel to its axis, like the length of the developed rectangle that it derives from, is the developed rectangle's area divided by the rotor's circumference.

A related value, rotor's "effective intake area," is simply the cross-sectional area perpendicular to the incoming flow at the rotor's peripheral opening. It can be described in one of two ways: 1) It is taken to be approximately equal to the spiral housing's cross-sectional intake area, and 2) It is proportional to the developed rectangle's area by a factor of sine of the angle of a streamline of inward spiraling flow, radial with respect to the tangent line at the rotor's periphery where the streamline enters in.

Changes in Static Pressure and Velocity

With accelerated internal current traveling at several times the ambient speed, the speed change necessary to extract available power is small. For example, based on a 1:4 velocity ratio for overall deceleration in the machine, full capture of available power requires a reduction in velocity head calculated as follows:

Velocity head at 4 knots (2.06 m/sec): 0.216 meters of water at the intake opening
Velocity head at 1 knot (0.515 m/sec): 0.014 meters of water at the exhaust opening
Difference in velocity head (0.216-0.014): 0.202 meters of water (delta)

Accelerating captured water in the venturi borrows energy from the static pressure in the acceleration tube that has to be returned in the exhaust channel to put the water back into the ambient stream. But energy that is harvested as water passes through the rotor cannot be returned. The portion of difference in velocity head of 0.202 meters of water (delta) in the machine overall that is exhibited across the rotor occurs through one of three choices:
1) A reduction of said portion in velocity pressure,
2) A like reduction of said portion in static pressure, or
3) Changes in both that together amount to a like reduction in either one.

Looking at Choice 1, for a stream that has been accelerated to 16 knots in the venturi, the difference in velocity head seems relatively small. See the calculations that follow:
Velocity head at 16 knots (8.24 m/sec): 3.46 meters of water
Velocity head after power extraction (3.46-0.202): 3.26 meters of water The velocity head after power extraction corresponds to a new velocity of 15.5 knots (8.00 m/sec).

Stipulating effective intake area and exhaust area in the rotor geometry will dictate as to which of these three choices will prevail. In the instant embodiment, the rotor was intended to be a cylinder with intake and exhaust regions of approximately equal diameter (Choice 2). If the exhaust opening were to have less cross-sectional area than the effective area of the intake opening, implying a slight acceleration through the rotor vanes even as useful power is harvested, then Choice 3 would prevail.

Here are normalized calculations based on three possible embodiment choices:

At rotor intake:
Normalized area (perpendicular to the flow): A=1
Normalized velocity: V=1
Normalized volume flow: A*V=1
At rotor exhaust:
Volume flow: A*V=1
(Choice 1) Exhaust area: A=1.026, Exhaust velocity: V=0.975, Static pressure unchanged, Velocity pressure reduced by 0.202 meters of water
(Choice 2) Exhaust area: A=1, Exhaust velocity: V=1, Static pressure reduced by 0.202 meters of water, Velocity pressure unchanged
(Choice 3) Exhaust area: A=14/15, Exhaust velocity: V=15/14, Static pressure reduced by 0.202 meters of water to account for the harvested power and a further reduction of 0.49 meters of water (equal to the increased velocity pressure as calculated below):
Velocity pressure at 16 knots (8.24 m/sec): 3.46 meters of water
Velocity pressure at 17.1 knots (8.81 m/sec): 3.95 meters of water
Velocity pressure increased by (3.95-3.46): 0.49 meters of water
Static pressure reduced by (0.202+0.49): 0.692 meters of water The Streamlines The angles of the streamlines entering the rotor inlet are developed as follows.

In the stationary coordinate system of the spiral housing:
1) The spiral housing is directing water into the rotor at an inward angle of 15.0° relative to the tangent, everywhere around the rotor's periphery.
2) At the rectangular developed surface of the rotor's cylindrical envelope, total velocity is V (normalized), radial inward velocity=V*sin 15.0°, tangential velocity=V*cos 15.0°, axial velocity=0
3) The vane velocity of the spinning rotor=(½) V*cos 15.0°
In the rotating coordinate system of the spinning rotor:
4) Vane angle to the radius=61.8°, to the tangent=28.2° (90-61.8=28.2).
5) Vane angle to the axis=0°

The above angle of 28.2° represents the average inlet angle of all of the streamlines. Actually, to permit a smoother "banked turn" of a sheet of water or rank of streamlines, the inlet angle varies with axial position of the streamline entering the rotor inlet. Here are the approximate intake angles that were modeled for all 15 streamlines in the prototype embodiment:
streamline #1: 71°
streamline #2: 59°
streamline #3: 51°
streamline #4: 40°
streamline #5: 37°
streamline #6: 34° streamline #7: 27°
streamline #8: 25°
streamline #9: 21°
streamline #10: 19°
streamline #11: 14°
streamline #12: 12°
streamline #13: 10°
streamline #14: 8°
streamline #15: 7°

For the outermost streamlines #11-15, the water has to deflect outwards from its earlier path. For the innermost streamlines, #00-04, the water has to deflect inwards. Only for the streamline in the very middle, #07, does the water's entry approximate the ideal condition of a 28.2° entrance angle as measured to the rotor's tangent. The average angle for all the streamlines, however, is very close at 29°. Basically it is a banking turn for the water stream as a whole, in which the outermost streamlines lift up and go around the periphery, while the innermost streamlines dive down and go into the rotor's center. The outermost streamlines start out mostly in a tangential path, gradually working their way axially away to make room in a horizontal fashion (same radius) for the following streamlines of the same number (#15's behind #15, #14's behind #14, etc.). Near the end of their travel they encounter the sharply deflecting, radially outermost portion of the rotor vane and turn sharply axial. That's where they give up most of their power. The innermost streamlines first travel radially inward, and that's where they give up most of their power. Then they turn toward a predominately axial flow and just make their way toward the end.

Axial Length of Rotor

The axial length of the inventive rotor is important for meeting the streamlines model rules (equal length, equal volumetric spacing, smooth banking turn) that lead to passing water smoothly through the rotor. The axial length of the first stage is one of the factors of rotor inlet area, (the other being rotor inlet circumference), and as such it affects the radial inward component of velocity at which flowing water can enter the rotor all around its periphery. By conservation of volume flow, whose upper limit value, disregarding losses due to turbulence and cavitation, is derived by the equation above (Eq. 3.2), the volume flow of water entering into the rotor inlet is equal to the volume flow that passes through the spiral channel as well as other channel passages. The radial inward velocity component of water as it enters a rotor channel equals the radial inward velocity component of water exiting the spiral channel, the boundary between these channels being the cylinder of the rotor's inlet periphery. Sizing the rotor inlet area to smoothly receive the flow that is impressed inward only by the diminishing radius of the spiral channel, is an important consideration to maximizing volume flow through the machine to its upper limit amount, and thereby maximizing stream energy available to harvest in the machine. In the preferred embodiment, the axial first stage length is 0.904 (+/−15%) times the rotor inlet diameter.

This distinguishing feature supports the object of the inventive device to overcome a disadvantage of the prior art, wherein external moveable or fixed guide vanes direct water radially into rotating vanes. Parametric derivations above, of flow velocity through the spiral channel and into the rotor vanes of the inventive device, illustrate that the tangential velocity component of flow does not change as water spirals inward, being impressed by the diminishing radius of the spiral channel (Section 9), but a radial component of velocity is added to the flow, accelerating it to a resultant velocity that is the vector sum of the two perpendicular components. This acceleration requires an increase in velocity pressure and thus a corresponding draw down of static pressure to sustain the accelerated flow. An analogous situation in which constraining an enclosed stream to accelerate flow where pressure is relieved can be observed in putting one's thumb over the end of a garden hose. The thumb impedes the flow, but where water can escape it does so with increased velocity. Guide vanes, or gates, conventionally used inside the volute of a turbine have separate control surfaces that together guide water inward through multiple small channels, much as a Fresnel lens combines multiple transmissive or reflective surfaces to focus a beam of light. Though the angle of the gates is conventionally adjustable, in order to allow full volume flow through the turbine the gates must be opened wide, thus imparting a large radial inward velocity component to the flow, with the resultant acceleration just described, or if they are partially closed to reduce the inward velocity component then by their close overlap they restrict the channel openings and thus accelerate the water by that means. Either way, the conventional apparatus requires a larger static head in order to drive the intended flow through the machine. Without adequate head, the multiple gate channels, where higher flow velocity is required to conserve volume flow with the rest of the machine, will be sites of designed-in cavitation causing loss of power.

A preferred embodiment of the inventive apparatus, in distinction from the prior art, overcomes this disadvantage by shaping and sizing the rotor inlet and the spiral channel in concert with each other to pass full volume flow without the use of active movable control gates, guide vanes, variable pitch blades, and other movable elements that cause restriction. Some increase in velocity is unavoidable as water flow is constrained in a diminishing spiral channel, but the preferred embodiment of the invention keeps that increase within a range that allows the configuration to extract power in a very low head, in-stream application.

The following is a description of steps that were carried out by the inventors, and specific numerical values for the various dimensions and parameters discussed above, when building a particular preferred example embodiment of a prototype hydro generator according to the invention as described and illustrated herein.

The design and build process involved the following steps:
1. Identify in-stream locations at which the machine may be deployed.
2. Ascertain a target maximum of ambient flow velocity at intended locations of deployment. This value is a condition of the environment, not the machine, and it sets an upper limit on harvestable power in a given volume flow. For the prototype, two deployment applications were considered, one a stationary or moored installation that harvests power from flowing ocean tides and, the other, an accessory that is pulled or towed behind a sailboat to harvest power from the water flowing through. In both cases an adequate, yet conservative estimate of maximum ambient flow, deemed to permit a variety of deployment options, was chosen to be:

$$V_{MaxAmbient} = 2.06 \ \frac{m}{sec}$$

$$V_{MaxAmbient} = 4 \text{ knots}$$

3. Ascertain a target minimum of ambient static pressure at intended locations of deployment. This value is a condition of the environment, not the machine, and it combines with the ambient flow velocity pressure to set an upper limit on the maximum possible increase of velocity that the flow can undergo inside the machine. The governing equation for deployment in water is:

$$h = \frac{v^2}{2g},$$

where:
h=velocity head in meters of water
v=velocity of flow in $$v = \text{velocity of flow in } \frac{m}{\text{sec}}$$

$$g = \text{acceleration due to gravity in } \frac{m}{\text{sec}^2}$$

The ambient stream has total pressure that is equal to the sum of its velocity head added together with ambient static pressure, and the total pressure of flow inside the machine cannot exceed that sum. Thus, any target velocity that results from flow acceleration inside the machine must not exceed that whose head is the sum of static pressure plus velocity head of the ambient stream.

The prototype as built is intended to be deployed in water, near enough to the surface so that the target minimum of ambient static pressure does not substantially exceed that of the atmosphere above. One atmosphere of pressure is about 10.3 meters of water, at 4° C. Velocity head of an ambient stream of 4 knots is about 0.2 meters of water. Total pressure of ambient stream is about 10.5 meters of water.

The equation converts into a formula for maximum possible internal velocity as follows:

$$V_{MaxInternal} = \sqrt{2 \cdot g \cdot h},$$

where:
$V_{MaxInternal}$=target maximum velocity inside the machine $$g = 9.81 \frac{m}{\text{sec}^2}$$

h=10.5 meters of water $$V_{MaxInternal} = \sqrt{2 \cdot 9.81 \frac{m}{\text{sec}^2} \cdot 10.5 m}$$

$$V_{MaxInternal} = \sqrt{206.0 \frac{m^2}{\text{sec}^2}}$$

$$V_{MaxInternal} = 14.4 \frac{m}{\text{sec}}$$

$V_{MaxInternal}$=27.9 knots, where:

$$1 \text{ knot} = 0.515 \frac{m}{\text{sec}}$$

4. Use the principle of conservation of volume flow to determine the first five design ratios within the machine. Volume flow is the amount of encaptured fluid that passes through a designated channel location in a given amount of time. Volume flow relates the cross-sectional area of the designated channel location together with the velocity of its encaptured flow, by the equation:

$$VF = A \cdot V,$$

where:
VF=Volume flow
A=Cross-sectional area at designated channel location
V=Velocity of flow passing through
Volume flow as considered here has units of $$\frac{m^3}{\text{sec}}$$

Volume flow is conserved throughout the machine. That means it is the same at every designated channel location.
These are the first five ratios:
a. Ratio 1=Exhaust duct outlet area to intake duct inlet area
b. Ratio 2=Intake duct inlet area to spiral inlet area
c. Ratio 3=Spiral inlet area to rotor outlet area
d. Ratio 4=Rotor inlet radius to rotor outlet radius
e. Ratio 5=Spiral inlet radial width to spiral inlet axial length
Ratio 1 sets the overall velocity decrease as fluid exits the machine. Betz' law appears to govern the amount of power available to be harvested. According to Betz' law, harvested power is maximized when exhaust duct outlet velocity is one-third of intake tube inlet velocity, and will not exceed 59.3% of all the power in the encaptured flow. Based on this consideration, Ratio 1 should preferably be set at a value of 3:1. For the prototype it was set at a value of 4:1 before the inventors realized the implications of Betz' law as to the preferred design of the prototype.
Ratios 1, 2, 3, 4, and 5 operate interactively and should be decided together. Considerations include that nowhere in the channel can the internal target velocity be expected to exceed that value whose velocity head is equal to the sum of static pressure plus velocity pressure of the ambient stream. For the prototype the target maximum velocity, anywhere in the channel, was conservatively set to be no more than about four times the velocity of ambient flow. If target maximum velocity of ambient flow is estimated at:

$$V_{MaxAmbient} = 2.06 \frac{m}{\text{sec}}$$

$$V_{MaxAmbient} = 4 \text{ knots}$$

Then target maximum velocity inside the machine will not exceed:

$$V_{MaxInternal} = 8.24 \frac{m}{\text{sec}}$$

$$V_{MaxInternal} = 16 \text{ knots}$$

This value is well within the maximum internal velocity of 27.9 knots available under the intended deployment conditions.
5. Determine a value for the sixth and final design ratio:
Ratio 6=Rotor peripheral speed to spiral inlet flow velocity
This value might be varied to achieve a higher or lower rotational speed for a given condition of ambient flow. Note that a smaller diameter at rotor inlet enables faster rotor rotation for a given value of Ratio 6.

6. Choose a target maximum for volume flow to be directed through the machine. The target maximum for volume flow sets the stage for making decisions about the size of the machine. Volume flow is not controlled solely by the machine's configuration, but results also from velocity of flow in the ambient stream. A particular design target for maximum volume flow derives from diverse considerations. These include:
   a. What power output and limits on power output variation are desired?
   b. What are the expectations regarding velocity of ambient flow?
   c. What materials are being considered for construction?
   d. What physical features denote the likely deployment locations?
   e. How strong is the anchor or mooring?
   f. How much tow force is available?
   g. What is the likely method for transmitting and using harvested power?

For the prototype, volume flow was determined substantially by special considerations. The purpose of the prototype was to demonstrate functionality, and not to fulfill special power generation requirements of a particular application. The physical size of the prototype apparatus was limited within a range of convenience for construction and testing.

Based on these concerns, and the design ratios and other configuration restraints that applied, a target maximum for volume flow was selected to be:

$$VF = 0.0667 \, \frac{m^3}{\sec}$$

At that volume flow in an ambient stream of 4 knot velocity, harvestable power available to the prototype as sized, with two mirror image channels, in concurrence with the Betz limit of 59.3% turbine efficiency theoretically will be about 168 watts.

7. Set the rotor outlet radius as a basic value such that important dimensions at designated channel locations might be characterized in terms of it and the design ratios.
8. Set the targeted maximum velocity of ambient flow as a basic value such that volume flow and velocity at designated channel locations might be characterized in terms of it, the value of the rotor's outlet radius, and the design ratios.
9. Here are the basic values and design ratios used in the prototype apparatus:
   Rotor outlet radius is a basic value:
   R=0.0500 m
   Targeted maximum velocity of ambient flow is a basic value:

$$V_{MaxAmbient} = 2.06 \, \frac{m}{\sec}$$

Ratio 1 = 3.79

Ratio 2=4.00
   Ratio 3=1.03
   Ratio 4=1.03
   Ratio 5=0.934
   Ratio 6=0.50

Those values can be plugged into any of the parametric derivations for dimensions, area, volume flow, flow velocity, spiral angle, rotor speed, and theoretical vane angles at rotor inlet and outlet, as set forth and discussed above.

10. Sample dimensions and areas (equation numbers refer to the above parametric derivations):
    a. Radius at rotor outlet:
       R=0.0500 m
    b. Area at rotor outlet:

$$A_{RO} = \pi \cdot R^2 \qquad (2.1)$$

$A_{RO} = 0.00785 \, m^2$
    c. Area at spiral inlet:

$$A_{SI} = \pi \cdot R^2 \cdot (\text{Ratio 3}) \qquad (2.3)$$

$A_{SI} = 0.00809 \, m^2$
    d. Area at intake duct inlet:

$$A_{II} = \pi \cdot R^2 \cdot (\text{Ratio 2}) \cdot (\text{Ratio 3}) \qquad (2.5)$$

$A_{II} = 0.0324 \, m^2$
    e. Area at exhaust duct outlet:

$$A_{EO} = \pi \cdot R^2 \cdot (\text{Ratio 1}) \cdot (\text{Ratio2}) \cdot (\text{Ratio3}) \qquad (2.7)$$

$A_{EO} = 0.123 \, m^2$
    f. Axial length at spiral inlet:

$$L_{SI} = \frac{R \cdot \sqrt{\pi \cdot (\text{Ratio 3})}}{\sqrt{(\text{Ratio 5})}} \qquad (5.7)$$

$L_{SI} = 0.0931 m$ g. Radial width at spiral inlet:

$$W_{SI} = R \cdot \sqrt{\pi \cdot (\text{Ratio 3}) \cdot (\text{Ratio 5})} \qquad (5.10)$$

$W_{SI} = 0.0869 m$ h. Length of cross-section at intake duct inlet:

$$L_{II} = \frac{R \cdot \sqrt{\pi \cdot (\text{Ratio 2}) \cdot (\text{Ratio 3})}}{\sqrt{(\text{Ratio 5})}} \qquad (6.7)$$

$L_{II} = 0.186 m$ i. Width of cross-section at intake duct inlet:

$$W_{II} = R \cdot \sqrt{\pi \cdot (\text{Ratio 2}) \cdot (\text{Ratio 3}) \cdot (\text{Ratio 5})} \qquad (6.10)$$

$W_{II} = 0.174 m$ j. Radius at rotor inlet:

$$R_{RI} = R \cdot (\text{Ratio 4}) \qquad (7.1)$$

$R_{RI} = 0.0515 \, m$
    k. Circumference at rotor inlet:

$$C = 2 \cdot \pi \cdot R \cdot (\text{Ratio 4}) \qquad (7.5)$$

$C_{RI} = 0.324 \, m$ l. Axial length at rotor inlet:

$$L_{RI} = \frac{R \cdot \sqrt{\pi \cdot (\text{Ratio 3})}}{\sqrt{(\text{Ratio 5})}} \quad (7.6)$$

$$L_{RI} = 0.0931 m$$

m. Area at rotor inlet (cylindrical surface):

$$A_{RI} = \frac{2 \cdot \pi^{3/2} \cdot R^2 \cdot \sqrt{(\text{Ratio 3})} \cdot (\text{Ratio 4})}{\sqrt{(\text{Ratio 5})}} \quad (7.9)$$

$A_{RI} = 0.0301 \, m^2$ n. Spiral angle $\theta$, radial with respect to tangent of a circle at the rotor inlet periphery:

$$\theta = \text{ArcTan}\left[\frac{\sqrt{(\text{Ratio 3}) \cdot (\text{Ratio 5})}}{2 \cdot \sqrt{\pi} \cdot (\text{Ratio 4})}\right] \quad (8.4)$$

$\theta = \text{ArcTan}(.269)$ $\theta = 15.0°$ o. Radial component of flow velocity $\sin \theta \cdot V_{RI}$ at rotor inlet, relative to a stationary reference:

$$\sin\theta \cdot V_{RI} = \frac{V \cdot (\text{Ratio 2}) \cdot \sqrt{(\text{Ratio 3}) \cdot (\text{Ratio 5})}}{2 \cdot \sqrt{\pi} \cdot (\text{Ratio 4})} \quad (9.6)$$

$\sin \theta \cdot V_{RI} = 1.07 V,$ where:
V=Velocity of ambient stream $$\sin\theta \cdot V_{RI} = 2.21 \frac{m}{\text{sec}}$$

$\sin \theta \cdot V_{RI} = 4.24$ knots, where $V = V_{MaxAmbient}$ $V = V_{MaxAmbient} = 2.06 \frac{m}{\text{sec}}$ $V_{MaxAmbient} = 4$ knots p. Angular velocity $$\frac{d\gamma}{dt}$$

of rotating vane, relative to its stationary reference:

$$\frac{d\gamma}{dt} = \frac{V \cdot (\text{Ratio 2}) \cdot (\text{Ratio 6})}{R \cdot (\text{Ratio 4})} \quad (12.6)$$

$$\frac{d\gamma}{dt} = 38.83 V \frac{\text{radians}}{\text{sec}},$$

where:
V=Velocity of ambient stream $$\frac{d\gamma}{dt} = 80.0 \frac{\text{radians}}{\text{sec}}$$

$$\frac{d\gamma}{dt} = 12.7 \frac{\text{revolutions}}{\text{sec}}$$

$$\frac{d\gamma}{dt} = 764 \frac{\text{revolutions}}{\text{min}}, \text{ where:}$$

$V = V_{MaxAmbient}$ $V = V_{MaxAmbient} = 2.06 \frac{m}{\text{sec}}$ $V_{MaxAmbient} = 4$ knots q. Ideal vane angle $\theta_V$ at rotor inlet periphery, radial with respect to tangent, relative to its rotating reference:

$$\theta_V = \text{ArcTan}\left[\frac{\sqrt{(\text{Ratio 3}) \cdot (\text{Ratio 5})}}{2 \cdot \sqrt{\pi} \cdot (\text{Ratio 4}) \cdot [1 - (\text{Ratio 6})]}\right] \quad (13.10)$$

$\theta_V = \text{ArcTan}(.537)$ $\theta_V = 28.2°$ r. Ideal vane angle $\beta$ at a designated annular ring of rotor outlet, tangential with respect to axis, relative to its rotating reference:

$$\beta = \text{ArcTan}\left[\frac{-R_{ANNULUS} \cdot (\text{Ratio 6})}{R \cdot (\text{Ratio 3}) \cdot (\text{Ratio 4})}\right] \quad (14.11)$$

$$\beta = \text{ArcTan}\left[-.471 \cdot \left(\frac{R_{ANNULUS}}{R}\right)\right], \text{ where}$$

$$\left(\frac{R_{ANNULUS}}{R}\right) =$$

ratio of designated annular ring to rotor outlet radius

Ideal vane angle $\beta$ reaches its maximum absolute value at the outer periphery of rotor exhaust:
$\beta = \text{ArcTan}(-0.471)$
$\beta = -25.2°$, where:

$$\frac{R_{ANNULUS}}{R} = 1$$

Throughout this specification including the claims, terms of approximation such as "about", "approximately", etc., mean within a range of +/−5% of the stated target value, unless specified otherwise either expressly or from the context in which the term is used.

All values of any variable within any disclosed range are also disclosed as inventive values, and may be claimed as inventive endpoints of any narrower range within the originally disclosed broader range.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

REFERENCE NUMBER LIST

A rotor axis
R rotor rotation direction
1 instream hydro power generator apparatus
2 intake duct
2A intake duct inlet
2B intake duct outlet
3 intake channel
4 rotor housing
4A planar side plates
5 spiral volute casing
6 spiral channel
7 gear case
8 standpipe
9 rotor
9A rotor inlet
9B rotor outlet
9C first stage of rotor
9D second stage of rotor
10 rotor channel
11 rotor vane
11A radial obstruction portion
11B circumferential obstruction portion
11C peripheral band
12 rotor core
13 central axial bore
14 exhaust duct
14A exhaust duct inlet
14B exhaust duct outlet
15 exhaust duct elbow
16 exhaust diffuser bell
17 exhaust housing (elliptical)
18 exhaust channel
20 velocity curve of intake
22 velocity curve of exhaust
24 streamlines for non-rotating rotor
25 radial positions of annular rings of equal cross-sectional area
26 streamlines transformed for rotating rotor
101 design method step
102 design method step
103 design method step
104 design method step
105 design method step
106 design method step
107 design method step
108 design method step

What is claimed is:

1. A turbine rotor for a fluid-driven turbine, comprising a rotor core that is shaped as a first surface of revolution and that extends longitudinally along a rotor axis, a plurality of rotor vanes that each protrude outwardly from and extend along said rotor core, and a continuous closed peripheral band that circumferentially surrounds and interconnects respective portions of said rotor vanes circumferentially around said rotor axis, wherein:

said turbine rotor is bounded within a peripheral envelope that is shaped as a second surface of revolution and that defines a rotor diameter perpendicular to said rotor axis and a rotor length extending along said rotor axis from a base plane of said rotor to an outlet plane of said rotor, wherein said base plane and said outlet plane each extend normal to said rotor axis, said rotor length is greater than a maximum value of said rotor diameter, said peripheral band extends axially along said rotor axis from said outlet plane to an intermediate plane that extends normal to said rotor axis at a location between said outlet plane and said base plane, wherein said peripheral band has an axial band length between said outlet plane and said intermediate plane of 10% to 40% of said rotor length, said rotor core has a cross-sectional diameter that has a maximum value corresponding to said rotor diameter at said base plane and that diminishes monotonically along a curve from said base plane to said intermediate plane, each one of said rotor vanes respectively includes and terminates on a respective linear inlet edge that extends along a respective line on an axial plane extending along said rotor axis on said peripheral envelope from said rotor core at said base plane to said peripheral band at said intermediate plane, each one of said rotor vanes respectively includes and terminates on a respective outlet edge at said outlet plane, respective rotor channels are respectively bounded in a circumferential direction between circumferentially successive ones of said rotor vanes, and radially inwardly by said rotor core, and radially outwardly by said peripheral band, each one of said rotor channels respectively has a respective open channel inlet lying on said peripheral envelope circumferentially between circumferentially successive ones of said linear inlet edges of circumferentially successive ones of said rotor vanes, all of said channel inlets together form a peripheral rotor inlet extending circumferentially around said peripheral envelope and extending axially between said rotor core at said base plane and said peripheral band at said intermediate plane over an inlet length of 60% to 90% of said rotor length, whereby said peripheral rotor inlet is divided circumferentially into said channel inlets by said rotor vanes therebetween, each one of said rotor channels respectively has a respective open channel outlet lying on said outlet plane circumferentially between circumferentially successive ones of said outlet edges, and all of said channel outlets together form an axial rotor outlet bounded radially within said peripheral band on said outlet plane, whereby said axial rotor outlet is divided sectorially into said channel outlets by said rotor vanes therebetween.

2. The turbine rotor according to claim 1, wherein said second surface of revolution is a cylinder, said rotor diameter has a single diameter value uniformly at all locations axially along said rotor length, said peripheral envelope is a cylindrical peripheral envelope, and said peripheral band is an annular cylindrical peripheral band.

3. The turbine rotor according to claim 1, wherein said second surface of revolution is not a cylinder, said rotor diameter has a base diameter value at said base plane and an outlet diameter value at said outlet plane, and said outlet diameter value is greater than said base diameter value.

4. The turbine rotor according to claim 1, wherein said second surface of revolution is not a cylinder, said rotor diameter has a base diameter value at said base plane and an outlet diameter value at said outlet plane, and said outlet diameter value is less than said base diameter value.

5. The turbine rotor according to claim 1, wherein each one of said rotor channels respectively has an open channel cross-sectional area normal to said rotor axis, and said open channel cross-sectional area increases successively on successive section planes normal to said rotor axis successively along said rotor axis from said base plane to said intermediate plane.

6. An apparatus comprising the turbine rotor according to claim 1 and a spiral volute casing, wherein:
   said spiral volute casing includes a spiral wall that extends at least 315° along a spiral about a spiral axis from a radially outer end of said spiral wall to a radially inner end of said spiral wall, and a side wall extending normal to said spiral axis,
   a first stage portion of said rotor extends axially from said base plane to said intermediate plane, and a second stage portion of said rotor extends axially from said intermediate plane to said outlet plane,
   said rotor is rotatably mounted with said rotor axis extending along said spiral axis and with at least said first stage portion of said rotor received in said spiral volute casing,
   said side wall has a circular volute casing outlet opening therein located concentrically on said spiral axis,
   said second stage portion of said rotor is received at least partially in said volute casing outlet opening,
   said spiral volute casing bounds therein a spiral channel radially between said rotor and said spiral wall, and
   a volute casing inlet opening is provided extending radially inwardly from said radially outer end of said spiral wall, and communicates into said spiral channel.

7. The apparatus according to claim 6, wherein said spiral wall extends 360° ±5% along said spiral about said spiral axis from said radially outer end of said spiral wall to said radially inner end of said spiral wall, and said spiral channel has an open radial sectional area that diminishes from a maximum value at said volute casing inlet opening to essentially zero allowing only for radial clearance from said rotor at said radially inner end of said spiral wall.

8. The apparatus according to claim 6, wherein a ratio of an area of said volute casing inlet opening to an area of said axial rotor outlet is in a range from 0.6 to 1.7, or more preferably in a range from 0.9 to 1.1.

9. The apparatus according to claim 6, further comprising an exhaust duct that has an exhaust duct inlet and an exhaust duct outlet, and that defines therein an exhaust duct channel that diverges from said exhaust duct inlet to said exhaust duct outlet, and wherein said exhaust duct inlet is connected to said side wall of said spiral volute casing in communication with said volute casing outlet opening.

10. The apparatus according to claim 9, further comprising an intake duct that has an intake duct inlet and an intake duct outlet, and that defines therein an intake duct channel that converges from said intake duct inlet to said intake duct outlet, and wherein said intake duct outlet is connected to said spiral volute casing in communication with said volute casing inlet opening.

11. The apparatus according to claim 10, wherein
   a first ratio of an area of said exhaust duct outlet to an area of said intake duct inlet is in a range from 2 to 10,
   a second ratio of said area of said intake duct inlet to an area of said volute casing inlet opening is in a range from 1 to 72,
   a third ratio of said area of said volute casing inlet opening to an area of said axial rotor outlet is in a range from 0.6 to 1.7, and
   a fourth ratio of an average radius of said peripheral rotor inlet to a radius of said axial rotor outlet is in a range from 0.6 to 1.7.

12. The apparatus according to claim 11, wherein said spiral channel has a rectangular radial sectional shape with a spiral channel radial width in a radial direction from said spiral axis and a spiral channel axial length parallel to said spiral axis, and wherein a fifth ratio of said spiral channel radial width at said volute casing inlet opening relative to said spiral channel axial length at said volute casing inlet opening is in a range from 0.07 to 13.

13. The apparatus according to claim 12, wherein said first ratio is 3:1±30%, said third ratio is 1:1±7%, said fourth ratio is 1:1±7%, and said fifth ratio is 1:1±10%.

14. A turbine rotor adapted and configured to be rotationally driven, about a rotation axis that extends in an axial direction, by a flowing fluid that spirals circumferentially about, radially inwardly toward, and axially along said rotation axis, said rotor comprising a rotor core and a plurality of rotor vanes uniformly circumferentially distributed about said rotor core, wherein:
   said rotor has a configuration bounded by a peripheral envelope configured as a surface of revolution about said rotation axis, and has an axial length extending along said rotation axis from a base end of said rotor to an outlet end of said rotor;
   said rotor includes a first rotor stage being a first portion of said rotor adjoining said base end and extending along said rotation axis along a first portion of said axial length, and a second rotor stage being a second portion of said rotor adjoining said outlet end and extending along said rotation axis along a second portion of said axial length;
   bounding surfaces of said rotor core and of said plurality of said rotor vanes define and bound a corresponding plurality of open rotor channels that each respectively communicate from a respective rotor channel inlet on said peripheral envelope to a respective rotor channel outlet on said outlet end of said rotor;
   all of said respective rotor channel inlets together form a rotor inlet, and all of said respective rotor channel outlets together form a rotor outlet;
   said bounding surface of said rotor core is defined as a further surface of revolution about said rotation axis, with a radius that diminishes continuously along a curve throughout said first portion of said axial length in said first rotor stage from a maximum radius at said base end to a minimum radius at a downstream end of said first rotor stage, and that remains approximately constant at said minimum radius throughout said second portion of said axial length in said second rotor stage, such that said rotor channels have a cross-sectional area perpendicular to said axis, which cross-sectional area increases successively on successive section planes perpendicular to said axis successively along said axis in said first rotor stage;
   said rotor is configured and adapted to rotate at a target rotational peripheral speed in an operational rotation direction about said rotation axis, with said fluid flowing from said rotor inlet to said rotor outlet at a target fluid flow speed through said rotor channels;
   said bounding surfaces of said rotor core and of said rotor vanes are configured to define and follow smoothly along a respective rank of transformed streamlines extending along said bounding surfaces respectively in each one of said rotor channels from said respective rotor channel inlet to said respective rotor channel outlet thereof;

each said respective rank of transformed streamlines is based on a rotational transformation of a respective rank of stationary streamlines into a rotating reference system for rotation of said rotor at said target rotational peripheral speed by helically twisting said stationary streamlines about said rotation axis in a twist direction opposite said operational rotation direction of said rotor by twist angles that increase progressively from a zero twist at said base end to a maximum twist at said outlet end corresponding to a rotation angle through which said rotor will rotate at said target rotational peripheral speed when said fluid flows from said rotor inlet to said rotor outlet at said target fluid flow speed through said rotor channels;

each respective one of said stationary streamlines respectively has the same length as all others of said stationary streamlines from respective inlet ends thereof at said rotor inlet to respective outlet ends thereof at said rotor outlet;

said outlet ends of said stationary streamlines each respectively exit said rotor outlet parallel to said rotation axis;

respective inlet ends of said stationary streamlines and respective inlet ends of said transformed streamlines are respectively spaced uniformly from one another in said axial direction along a radially outer free edge of each respective one of said rotor vanes at said rotor inlet adjacent to said peripheral envelope;

respective outlet ends of said stationary streamlines and respective outlet ends of said transformed streamlines respectively terminate in respective annular rings of respectively equal cross-sectional area normal to said rotation axis at said outlet end of said rotor;

each said respective rank of stationary streamlines makes a smooth banked rolling turn through a respective one of said rotor channels from said rotor channel inlet to said rotor channel outlet of said respective rotor channel;

said inlet end of a first one of said transformed streamlines and said inlet end of a first one of said stationary streamlines are respectively located adjacent to said base end of said rotor;

said inlet end of a last one of said transformed streamlines and said inlet end of a last one of said stationary streamlines are respectively located adjacent to said downstream end of said first rotor stage;

said outlet end of said first one of said transformed streamlines and said outlet end of said first one of said stationary streamlines are respectively located on a radially innermost first one of said annular rings of equal cross-sectional area;

said outlet end of said last one of said transformed streamlines and said outlet end of said last one of said stationary streamlines are respectively located on a radially outermost last one of said annular rings of equal cross-sectional area;

said stationary and transformed streamlines each respectively progress from said respective inlet end thereof to said respective outlet end thereof with a radial position of said respective stationary or transformed streamline that has a respective maximum at said respective inlet end thereof and a respective minimum at said respective outlet end thereof and that monotonically decreases and/or stays constant, and never increases, along said respective stationary or transformed streamline from said inlet end to said outlet end thereof; and said respective inlet ends of said stationary streamlines enter into said rotor channel inlet at respective entry angles relative to a tangent of said peripheral envelope, said entry angles have entry angle values that decrease monotonically along said axial direction from a steepest entry angle value for said first stationary streamline adjacent to said base end of said rotor to a shallowest entry angle value for said last stationary streamline adjacent to said downstream end of said first rotor stage.

15. The turbine rotor according to claim 14, wherein said first transformed streamline has the most axial travel distance and the most radial travel distance and the least circumferential travel distance of all of said transformed streamlines from said rotor inlet to said rotor outlet, and said last transformed streamline has the least axial travel distance and the least radial travel distance and the most circumferential travel distance of all of said transformed streamlines from said rotor inlet to said rotor outlet.

16. The turbine rotor according to claim 15, wherein said last transformed streamline undergoes all of said circumferential travel distance thereof within a first two-thirds of said axial travel distance thereof from said inlet end to said outlet end thereof, and said first transformed streamline undergoes all of said radial travel distance thereof within a first two-thirds of said axial travel distance thereof from said inlet end to said outlet end thereof.

17. The turbine rotor according to claim 14, wherein said peripheral envelope is a cylindrical peripheral envelope configured as a cylindrical surface of revolution, said radially outer free edge of said respective rotor vane extends in said axial direction at a constant radial distance from said rotation axis, said inlet ends of said transformed streamlines are located along said radially outer free edge of said respective rotor vane at an inlet polar angle about said rotation axis, and said outlet ends of said transformed streamlines are located radially spaced apart from one another and all within a polar angle range of 10° about said rotation axis along an outlet edge of said respective rotor vane on said outlet end of said rotor.

18. The turbine rotor according to claim 14, wherein all of said transformed streamlines respectively subtend approximately (+/−5°) the same polar angle from said inlet ends thereof to said outlet ends thereof.

19. The turbine rotor according to claim 14, further comprising a circumferentially continuous peripheral band in said second rotor stage, which band extends continuously axially along said second portion of said axial length, and which band is closed, continuous and imperforate in a circumferential direction, and which band is connected to radially outer ends of said rotor vanes in said second rotor stage.

20. The turbine rotor according to claim 19, wherein said rotor channels each respectively have a constant cross-sectional area normal to said rotation axis throughout an axial range of said second rotor stage.

21. The turbine rotor according to claim 14, wherein an average of said entry angle values for said stationary streamlines is about 15°.

22. The turbine rotor according to claim 14, wherein a rotor outlet/inlet ratio of a cross-sectional area of said rotor outlet normal to said rotation axis relative to an effective cross-sectional area of said rotor inlet is in a range from 0.6:1 to 2:1, wherein said effective cross-sectional area of said rotor inlet is a total cross-sectional area of said rotor channel inlets taken everywhere normal to said inlet ends of said stationary streamlines at said peripheral envelope.

23. The turbine rotor according to claim 22, wherein said peripheral envelope is a cylindrical peripheral envelope configured as a cylindrical surface of revolution, said rotor outlet has a diameter of about (+/−5%) the same value as a diameter of said rotor inlet on said cylindrical peripheral envelope, and wherein said rotor outlet/inlet ratio is about (+/−5%) 1.

24. A turbine apparatus comprising said turbine rotor according to claim 14, and adapted to be immersed instream in a flowing stream of said flowing fluid so as to capture and direct a portion of said flowing fluid through said turbine rotor to rotationally drive said turbine rotor and extract power from said portion of said flowing fluid, wherein said turbine apparatus further comprises:
 an intake duct that has an intake duct inlet and an intake duct outlet, and that bounds in said intake duct an intake channel which converges continuously and smoothly from said intake duct inlet to said intake duct outlet;
 a volute casing that has a volute casing inlet connected to said intake duct outlet, and that bounds in said volute casing a volute chamber, wherein at least said first stage of said rotor is received in said volute chamber, and wherein said volute casing has a circular volute casing outlet that is located coaxially on said rotation axis of said rotor and receives said second rotor stage and/or said rotor outlet end coaxially therein; and
 an exhaust duct that has a circular exhaust duct inlet connected to said volute casing outlet and an exhaust duct outlet, and that bounds in said exhaust duct an exhaust channel which diverges continuously and smoothly from said exhaust duct inlet to said exhaust duct outlet;
wherein:
 an overall exhaust/intake area ratio of a cross-sectional area of said exhaust duct outlet relative to a cross-sectional area of said intake duct inlet is in a range from 2:1 to 10:1;
 an intake acceleration ratio of said cross-sectional area of said intake duct inlet relative to a cross-sectional area of said intake duct outlet is in a range from 1:1 to 72:1;
 an effective cross-sectional area of said rotor inlet with respect to a spiraling inward flow of fluid into said rotor inlet is approximately (+/−5%) equal to said cross-sectional area of said intake duct outlet, wherein said effective cross-sectional area of said rotor inlet is a total cross-sectional area of said rotor channel inlets taken everywhere normal to said inlet ends of said stationary streamlines at said peripheral envelope; and
 said exhaust duct inlet is coaxial with said rotation axis of said rotor, said exhaust duct outlet exhausts said portion of said flowing fluid directed downstream into the flowing stream of the flowing fluid, and said exhaust duct further includes an exhaust elbow arrangement that curves from said rotation axis of said rotor to said exhaust duct outlet and that has a cross-section which diverges smoothly and continuously throughout said exhaust elbow arrangement and transitions from a circular shape of said exhaust duct inlet to a shape of said exhaust duct outlet.

25. The turbine apparatus according to claim 24, wherein said rotor vanes are fixed and immovable relative to said rotor core, and wherein said turbine apparatus expressly excludes control gates, guide vanes, movable elements, and flow-constricting elements in said volute chamber or between said volute chamber and said peripheral envelope of said rotor.

26. The turbine apparatus according to claim 24, wherein said overall exhaust/intake area ratio is about (+/−5%) 3:1.

27. The turbine apparatus according to claim 24, wherein said intake channel, said volute chamber, and said exhaust channel are all completely bounded by channel walls of said intake duct, said volute casing, and said exhaust duct that are all non-planar curved walls.

28. The turbine apparatus according to claim 24, wherein a duct wall of said intake duct is smoothly curved in 2 or 3 dimensions.

29. The turbine apparatus according to claim 24, wherein said intake duct inlet has a non-rectangular cross-sectional shape.

30. The turbine apparatus according to claim 24, wherein said volute casing includes a radially outer casing wall and an axially outer casing wall, said volute casing inlet opens through said radially outer casing wall, said volute casing outlet opens through said axially outer casing wall, said axially outer casing wall extends normal to said rotation axis of said rotor at said volute casing outlet, a first portion of said radially outer casing wall that bounds a first side of said volute casing inlet is at a relatively greater radius and a second portion of said radially outer casing wall that bounds a second side of said volute casing inlet is at a relatively smaller radius respectively about said rotation axis of said rotor, and said radially outer casing wall transitions smoothly from said relatively greater radius to said relatively smaller radius as said radially outer casing wall progresses circumferentially about said rotor axis from said first portion circumferentially toward said second portion, and
 said intake duct is configured and adapted to accelerate a flow of fluid from said intake duct inlet to said intake duct outlet, said volute chamber is configured and adapted to direct the fluid into a spiraling flow of the fluid having at least a radial inward flow component and a circumferential tangential flow component in said volute chamber and into said rotor, and said rotor is configured and adapted to redirect the fluid in an axial direction out through said axial rotor outlet and said volute casing outlet while the fluid causes said rotor to rotate about said rotation axis of said rotor and said rotor extracts energy from the fluid.

31. The turbine apparatus according to claim 30, wherein said volute chamber has a non-rectangular cross-section bounded by said rotor, said radially outer casing wall, and said axially outer casing wall on a radial plane extending radially from and axially along said rotor axis.

32. The turbine apparatus according to claim 31, wherein said non-rectangular cross-section includes a circular, oval or elliptical shape.

33. The turbine apparatus according to claim 30, wherein said relatively smaller radius of said second portion of said radially outer casing wall is substantially equal to an outer radius of said rotor, leaving only a minimum operational radial clearance gap between said rotor and said second portion of said radially outer casing wall.

34. The turbine apparatus according to claim 30, wherein said volute chamber is configured and arranged so that the spiraling flow of the fluid in said volute chamber has only the radial inward flow component and the circumferential tangential flow component.

35. The turbine apparatus according to claim 30, wherein said volute chamber is configured and arranged so that the spiraling flow of the fluid in said volute chamber additionally has an axial flow component.

36. The turbine rotor according to claim 14, wherein said peripheral envelope of said rotor has a diameter that becomes larger progressing axially from said base end along said first rotor stage.

37. The turbine rotor according to claim 14, wherein a diameter of said rotor at said outlet end is smaller than a maximum value of a diameter of said rotor along said first rotor stage.

38. A turbine apparatus for extracting power from a water flow encaptured from a stream of water in which said apparatus is submerged, said apparatus comprising:
a volute channel around an axis;
a converging intake duct connected to a volute inlet of said volute channel;
a diverging exhaust duct connected to an axial volute outlet of said volute channel along said axis; and
a rotor rotatably arranged in said volute channel to be rotatable around said axis;
wherein:
an inlet of said converging intake duct faces upstream into the stream of water in an inlet direction and takes in said water flow, and an outlet of said diverging exhaust duct discharges said water flow downstream into the stream of water,
said axis extends transverse to said inlet direction,
said rotor comprises rotor vanes extending along and outwardly from a rotor core, and a closed peripheral band circumferentially encircling and interconnecting said rotor vanes on a first axial portion of said rotor,
said rotor has a peripheral rotor inlet around a circumference of said rotor on a second axial portion of said rotor not having said closed peripheral band, wherein said volute channel is configured and adapted to receive an encaptured inflow of the water from said converging intake duct and direct the inflow of the water into a spiraling flow of the water around and into said peripheral rotor inlet of said rotor, and wherein said peripheral rotor inlet is exposed in said volute channel to the spiraling flow of the water therein completely circumferentially around said axis,
each one of said rotor vanes respectively extends to and terminates on a respective inlet edge at said peripheral rotor inlet, and each said rotor vane at said inlet edge thereof respectively extends at an inlet vane angle relative to a tangent of a peripheral envelope of said rotor vanes, wherein said inlet vane angle of each said rotor vane varies monotonically along said inlet edge from a first axial end to a second axial end of said second axial portion of said rotor,
said rotor core has a radius that diminishes monotonically over said second axial portion of said rotor toward said first portion of said rotor, and
said rotor has an axial rotor outlet at an axial end of said rotor terminating said first axial portion, wherein said axial rotor outlet communicates through said volute outlet of said volute channel to said diverging exhaust duct.

39. The turbine apparatus according to claim 38, wherein each one of said rotor vanes respectively extends to and terminates on a respective outlet edge at said rotor outlet, and each said rotor vane at said outlet edge respectively extends at an outlet vane angle relative to a respective axial-radial reference plane which contains said axis and said respective outlet edge, wherein said outlet vane angle has a minimum value near said axis and increases to greater values radially outwardly along said outlet edge.

40. The turbine apparatus according to claim 38, wherein said volute channel is bounded within a volute casing, said volute casing includes a radially outer casing wall and an axially outer casing wall, said volute inlet opens through said radially outer casing wall, said volute outlet opens through said axially outer casing wall, said axially outer casing wall extends normal to said axis at said volute outlet, a first portion of said radially outer casing wall that bounds a first side of said volute inlet is at a relatively greater radius and a second portion of said radially outer casing wall that bounds a second side of said volute inlet is at a relatively smaller radius respectively about said axis, and said radially outer casing wall transitions smoothly from said relatively greater radius to said relatively smaller radius as said radially outer casing wall progresses circumferentially about said axis from said first portion circumferentially toward said second portion, and
said intake duct is configured and adapted to accelerate said water flow from said intake duct inlet to said volute inlet, said volute chamber is configured and adapted to direct said water flow into a spiraling flow of said water flow having at least a radial inward flow component and a circumferential tangential flow component in said volute chamber and into said rotor, and said rotor is configured and adapted to redirect said water flow in an axial direction out through said axial rotor outlet and said volute outlet while said water flow causes said rotor to rotate about said axis and said rotor extracts energy from said water flow.

41. The turbine apparatus according to claim 40, wherein said volute chamber is configured and arranged so that the spiraling flow of said water flow in said volute chamber has only the radial inward flow component and the circumferential tangential flow component.

42. The turbine apparatus according to claim 40, wherein said volute chamber is configured and arranged so that the spiraling flow of said water flow in said volute chamber additionally has an axial flow component.

43. The turbine apparatus according to claim 38, wherein said second axial end of said second axial portion of said rotor adjoins said first axial portion of said rotor, and said inlet vane angle of each said rotor vane decreases monotonically along said inlet edge from a maximum value at said first axial end to a minimum value at said second axial end of said second axial portion of said rotor.

* * * * *